(12) United States Patent
Shinke et al.

(10) Patent No.: US 11,973,253 B2
(45) Date of Patent: Apr. 30, 2024

(54) ELECTROCHEMICAL MODULE, METHOD FOR ASSEMBLING ELECTROCHEMICAL MODULE, ELECTROCHEMICAL DEVICE, AND ENERGY SYSTEM

(71) Applicant: Osaka Gas Co., Ltd., Osaka (JP)

(72) Inventors: Norihisa Shinke, Osaka (JP); Mitsuaki Echigo, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 721 days.

(21) Appl. No.: 17/043,977

(22) PCT Filed: Mar. 29, 2019

(86) PCT No.: PCT/JP2019/014374
§ 371 (c)(1),
(2) Date: Dec. 28, 2020

(87) PCT Pub. No.: WO2019/189909
PCT Pub. Date: Oct. 3, 2019

(65) Prior Publication Data
US 2021/0119238 A1    Apr. 22, 2021

(30) Foreign Application Priority Data

Mar. 30, 2018 (JP) ................................ 2018-070338

(51) Int. Cl.
*H01M 8/1226* (2016.01)
*H01M 8/04007* (2016.01)
(Continued)

(52) U.S. Cl.
CPC ..... *H01M 8/1226* (2013.01); *H01M 8/04007* (2013.01); *H01M 8/0612* (2013.01); *H01M 8/2475* (2013.01); *H01M 8/248* (2013.01)

(58) Field of Classification Search
CPC .......... H01M 8/1226; H01M 8/04007; H01M 8/0612; H01M 8/2475; H01M 8/248
See application file for complete search history.

(56) References Cited

U.S. PATENT DOCUMENTS

2005/0277012 A1* 12/2005 Inagaki ................ H01M 8/247
429/511
2006/0051653 A1*  3/2006 Lee .................... H01M 8/04201
429/511
(Continued)

FOREIGN PATENT DOCUMENTS

CA        2415388 A1 *  1/2002 ............ H01M 8/248
CN      101197453 A      7/2007
(Continued)

OTHER PUBLICATIONS

Machine Translation KR-20090041170-A (Jun. 6, 2023) (Year: 2023).*

(Continued)

*Primary Examiner* — Matthew J Merkling
(74) *Attorney, Agent, or Firm* — The Webb Law Firm

(57) ABSTRACT

A small-size and light-weight electrochemical module in which, when a stack expands the stack can be clamped appropriately. The electrochemical module includes: an electrochemical element stack obtained by stacking, in a predetermined stacking direction, a plurality of electrochemical elements having a configuration in which an electrolyte layer, and a first electrode and a second electrode that are respectively arranged on two sides of the electrolyte layer, are formed along a substrate; an elastic plate-like member arranged along at least one of a first flat face and a second flat face of the electrochemical element stack; and a clamp that includes a first clamping portion extending along the first flat face and a second clamping portion extending (Continued)

along the second flat face and clamps the electrochemical element stack via the plate-like member.

13 Claims, 20 Drawing Sheets

(51) Int. Cl.
*H01M 8/0612* (2016.01)
*H01M 8/2475* (2016.01)
*H01M 8/248* (2016.01)

(56) References Cited

U.S. PATENT DOCUMENTS

| | | | |
|---|---|---|---|
| 2008/0014489 A1 | 1/2008 | Nielsen et al. | |
| 2008/0014492 A1 | 1/2008 | Nielsen et al. | |
| 2008/0044713 A1* | 2/2008 | Fritz | H01M 8/248 |
| | | | 429/510 |
| 2009/0317688 A1* | 12/2009 | Inagaki | H01M 8/248 |
| | | | 429/465 |
| 2011/0091786 A1* | 4/2011 | Matsumoto | H01M 8/0267 |
| | | | 429/469 |
| 2011/0171554 A1 | 7/2011 | Hayashi et al. | |
| 2013/0106032 A1 | 5/2013 | Linderoth | |
| 2015/0372334 A1* | 12/2015 | Yagi | H01M 8/2432 |
| | | | 429/465 |
| 2022/0166047 A1* | 5/2022 | Naito | H01M 8/04156 |

FOREIGN PATENT DOCUMENTS

| | | | |
|---|---|---|---|
| DE | 10033898 A1 | 1/2002 | |
| DE | 102011077061 A1 | 12/2012 | |
| JP | 2002302785 A | 10/2002 | |
| JP | 2004288618 A | 10/2004 | |
| JP | 2005183358 A * | 7/2005 | ............ H01M 8/248 |
| JP | 2006114362 A | 4/2006 | |
| JP | 2006179402 A | 7/2006 | |
| JP | 2008060072 A | 3/2008 | |
| JP | 2009158381 A | 7/2009 | |
| JP | 2013531604 A | 8/2013 | |
| JP | 2015153679 A | 8/2015 | |
| JP | 201662852 A | 4/2016 | |
| JP | 2017183224 A | 10/2017 | |
| KR | 20080013818 A * | 2/2008 | |
| KR | 20090041170 A * | 4/2009 | |
| WO | WO9957781 * | 11/1999 | |

OTHER PUBLICATIONS

Machine Translation JP-2005183358-A (Jun. 6, 2023) (Year: 2023).*
Machine Translation of KR20080013818A (Jun. 6, 2023) (Year: 2023).*

* cited by examiner

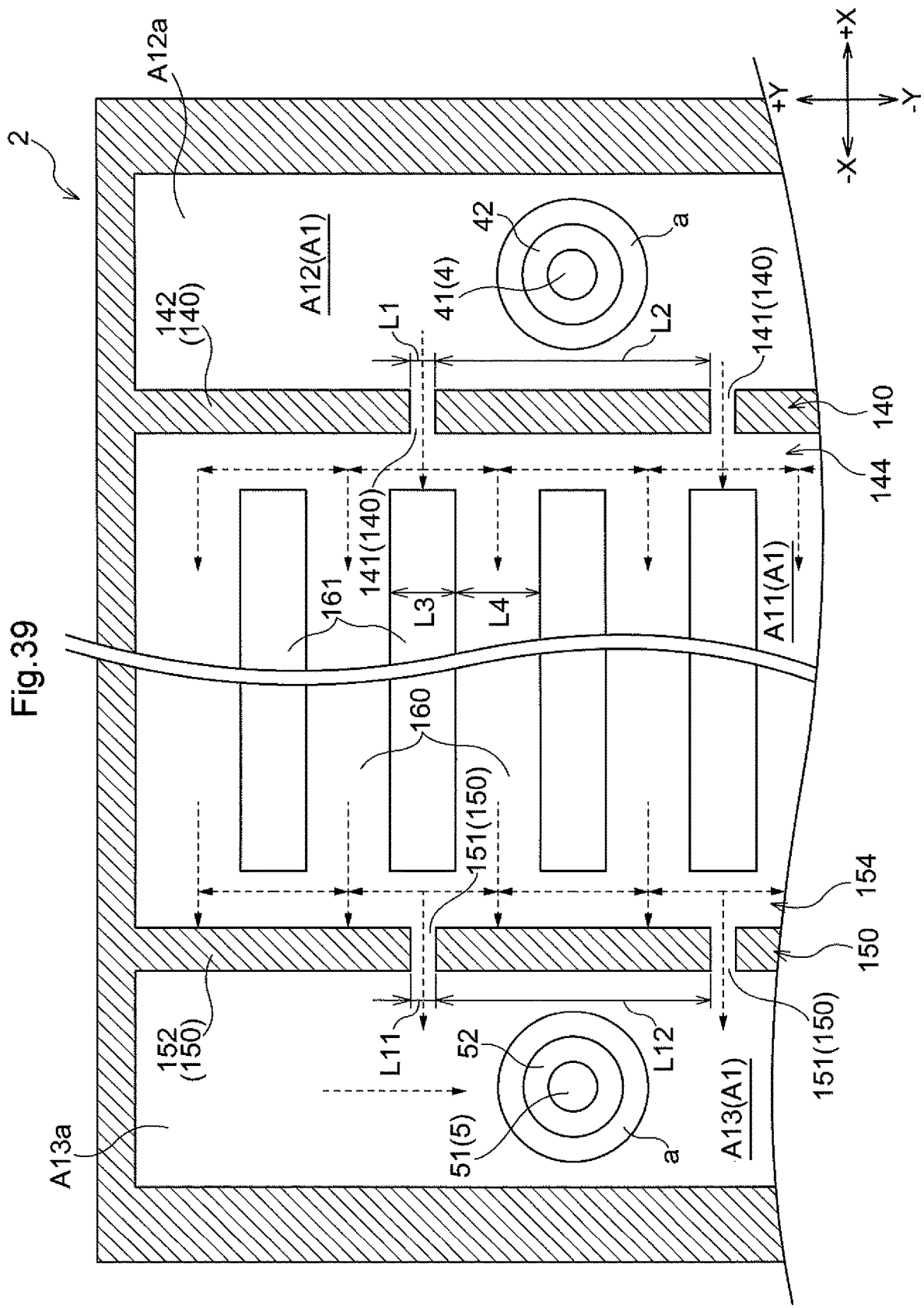

ELECTROCHEMICAL MODULE, METHOD FOR ASSEMBLING ELECTROCHEMICAL MODULE, ELECTROCHEMICAL DEVICE, AND ENERGY SYSTEM

CROSS-REFERENCE TO RELATED APPLICATIONS

This application is the United States national phase of International Application No. PCT/JP2019/014374 filed Mar. 29, 2019, and claims priority to Japanese Patent Application No. 2018-070338 filed Mar. 30, 2018, the disclosures of which are hereby incorporated by reference in their entirety.

BACKGROUND OF THE INVENTION

Field of the Invention

The present invention relates to an electrochemical module, a method for assembling an electrochemical module, an electrochemical device, and an energy system.

Description of Prior Art

A fuel cell stack as disclosed in JP 2015-153679A and JP 2016-62852A (Patent Documents 1 and 2) is configured as a stack obtained by stacking a plurality of power generating cells. The stack is sandwiched between two rectangular end plates arranged at the two ends in the stacking direction of the stack. Connection bars extending in the stacking direction of the stack are arranged between the two end plates and support each of the two end plates at four positions in the peripheral edge portion thereof. The two ends of each of the connection bars are fixed to the two end plates using bolts. Accordingly, the two end plates are supported and fixed by the connection bars that are fixed to four positions in the peripheral portion of each of the end plates, and clamp the stack sandwiched between the two end plates. Thus, clamping pressure in the stacking direction is applied to the stack, so that an increase in internal resistance and a decrease in the ability to seal in reaction gas are suppressed, and a plurality of power generating cells are formed into an integrated stack.

SUMMARY OF THE INVENTION

During power generation, a fuel cell stack as disclosed in Patent Documents 1 and 2 becomes hot, and thus the stack obtained by stacking a plurality of power generating cells expands, for example, in the stacking direction. The two end plates sandwich and clamp the stack in the stacking direction using the connection bars, and the connection bars also expand in the stacking direction due to a high temperature during power generation.

Thus, clamping pressure applied to the stack may become insufficient due to an increase in the sizes of clearances between the stack and the end plates, leading to an increase in internal resistance of the stack and a decrease in the ability to seal in reaction gas.

Therefore, a configuration is employed in which the thicknesses of the two end plates sandwiching the stack are increased, and the expansion of the stack is received by the thick end plates. Furthermore, the connection bars support the four corner portions in the peripheral portion of each of the two thick end plates, and a change due to the expansion is received using large-size tightening bolts provided with a spring.

However, in the above-mentioned configuration, the fuel cell stack is formed using two thick end plates and large-size tightening bolts provided with a spring for tightening the thick end plates. Therefore, increases in size, weight, and the like of the fuel cell stack are inevitable.

Accordingly, the present invention was achieved in light of the aforementioned problems, and an object thereof is to provide a small-size and light-weight electrochemical module in which, when a stack expands, the stack can be clamped appropriately, a method for assembling an electrochemical module, and the like.

Configuration

A characteristic configuration of an electrochemical module according to the present invention includes:

a stack obtained by stacking, in a predetermined stacking direction, a plurality of electrochemical elements having a configuration in which an electrolyte layer, and a first electrode and a second electrode that are respectively arranged on two sides of the electrolyte layer, are formed along a substrate;

an elastic plate-like member arranged along at least one of a first flat face of the stack in the stacking direction and a second flat face of the stack on a side opposite to the first flat face; and a clamp that includes a plate-like first clamping portion arranged along the first flat face and a plate-like second clamping portion arranged along the second flat face in the stacking direction, and clamps the stack via the plate-like member.

With this characteristic configuration, the plate-like member is arranged extending along the flat face of the stack and the flat face of the clamp in at least one of a location between the first flat face in the stacking direction of the stack and the first clamping portion and a location between the second flat face on a side opposite to the first flat face and the second clamping portion. That is, an elastic plate-like member is arranged extending along the flat face of the stack and the flat face of the clamp on at least one flat face side of the stack.

When at least one of the stack and the clamp expands, a clearance between the stack and the clamp may change between before and after expansion of the stack and the like. The plate-like member has elasticity, and therefore, the stack is elastically clamped between the two clamping portions due to the elasticity even if the clearance between the stack and the clamp changes.

More specifically, when a clearance between the stack and the clamp changes due to expansion of at least one of the stack and the clamp, a pressing force applied to the plate-like member also changes due to the change of the clearance. The pressing force, which has changed, is elastically received at the contact portions of the plate-like member with the stack and the clamp that are substantially uniformly scattered on the substantially entire flat face of the stack and the substantially entire flat face of the clamp.

Accordingly, even when the clearance between the stack and the clamp or the like changes due to expansion of the stack and the like, appropriate clamping pressure in the stacking direction can be substantially uniformly applied along the flat face of the stack, using the plate-like member.

Employing the simple configuration as described above in which the plate-like member is arranged extending along the flat faces of the stack and the clamp in a location between at least one of the first flat face and the second flat face of the stack and a flat face of the clamp makes it possible to form an electrochemical module in which expansion of the stack and the like is taken into consideration. Therefore, a small-size and light-weight electrochemical module in which a stack and the like can be clamped appropriately even when the stack and the like expand can be provided.

It should be noted that the configuration in which the first electrode and the second electrode are respectively arranged on the two sides of the electrolyte layer includes either a configuration in which the first electrode is arranged in contact with the electrolyte layer or a configuration in which the first electrode layer is arranged facing the electrolyte layer via an interposing layer. The same applies to the relationship between the second electrode and the electrolyte layer. Examples of the interposing layer include a reaction preventing layer and an intermediate layer.

Configuration

In another characteristic configuration of the electrochemical module according to the present invention, the plate-like member is a thermally expandable member that thermally expands.

For example, the stack, the clamp, and the like expand when shifting from a low-temperature state (e.g., about 20° C. in room-temperature atmosphere) in which the electrochemical elements do not generate power to a high-temperature state (e.g., about 650° C. to about 950° C.) in which the electrochemical elements generate power. At this time, when a difference in thermal expansion between the stack and the clamp occurs, a clearance between the stack and the clamp changes between when power is generated (high-temperature state) and when power is not generated (low-temperature state).

With this characteristic configuration, the plate-like member is a thermally expandable member, and therefore, the plate-like member also thermally expands due to high temperature of the electrochemical elements during power generation. Accordingly, even when a clearance between the stack and the clamp changes due to thermal expansion, the plate-like member applies appropriate clamping pressure to the stack with the clamp being used as a pressing face by utilizing a change of the elasticity due to thermal expansion of the plate-like member itself.

That is, by supplementing the change of a clearance between the stack and the clamp due to thermal expansion with the change of the plate-like member due to thermal expansion, appropriate clamping pressure is applied to the stack even after the above-described clearance has changed.

Since the plate-like member is arranged extending along the flat face of the stack and the flat face of the lamp, the plate-like member substantially uniformly applies appropriate clamping pressure along the flat face of the stack even after the above-described clearance has changed. Accordingly, in the electrochemical module, it is possible to suppress an increase in internal resistance and a decrease in the ability to seal in reaction gas.

Configuration

In another characteristic configuration of the electrochemical module according to the present invention, the plate-like member is in contact with at least one of a flat face of the stack and a flat face of the clamp at a plurality of positions that are scattered.

With this characteristic configuration, the plate-like member is arranged extending along the flat face of the stack and the flat face of the clamp between the flat faces of the stack and the clamp. The plate-like member and at least one of the flat face of the stack and the flat face of the clamp are in contact with each other at a plurality of positions that are scattered.

When a clearance between the stack and the clamp changes due to expansion of at least one of the stack and the clamp, a pressing force applied to the plate-like member also changes due to the change of the clearance. The pressing force, which has changed, is elastically received via the plate-like member in a state of being substantially uniformly scattered on the substantially entire flat face of the stack and the substantially entire flat face of the clamp. This is because the plate-like member is in contact with at least one of the flat face of the stack and the flat face of the clamp at a plurality of positions that are scattered. Furthermore, when the plate-like member thermally changes, the change of the clearance between the stack and the clamp is received by the thermal change of the plate-like member at the above-described positions.

Accordingly, even when the clearance between the stack and the clamp or the like changes due to expansion of the stack and the like, appropriate clamping pressure in the stacking direction can be substantially uniformly applied along the flat face of the stack due to the plate-like member. This makes it possible to suppress an increase in internal resistance and a decrease in the ability to seal in reaction gas in the electrochemical module and to reduce the size and weight of the electrochemical module.

Configuration

In another characteristic configuration of the electrochemical module according to the present invention, the elasticity of the plate-like member is utilized to receive a difference in thermal expansion between the stack and the clamp at a time when the electrochemical elements generate power and at a time when the electrochemical elements do not generate power.

For example, the stack, the clamp, and the like expand when shifting from a low-temperature state (e.g., about 20° C. in room-temperature atmosphere) in which the electrochemical elements do not generate power to a high-temperature state (e.g., about 650° C. to about 950° C.) in which the electrochemical elements generate power. At this time, when a difference in thermal expansion between the stack and the clamp occurs, a clearance between the stack and the clamp changes between when power is generated (high-temperature state) and when power is not generated (low-temperature state).

With this characteristic configuration, the plate-like member utilizes its elasticity to supplement the change of the clearance between the stack and clamp due to thermal expansion.

For example, when the plate-like member is a thermally expandable member, the plate-like member supplements the change of the clearance between the stack and the clamp due to thermal expansion by utilizing thermal expansion of the plate-like member itself.

For example, even when the plate-like member has a small thermal expansion rate, the stack, the plate-like member, the clamp, and the like are assembled together with large clamping pressure. In this case, large repulsive force is generated in the plate-like member. Accordingly, even when the clearance between the stack and the clamp increases in size, the repulsive force of the plate-like member remains to a certain degree and supplements the above-described increase in the size of the clearance.

Thus, the plate-like member substantially uniformly applies appropriate clamping pressure along the flat face of the stack even after the above-described clearance has changed. Accordingly, in the electrochemical module, it is possible to suppress an increase in internal resistance and a decrease in the ability to seal in reaction gas.

Configuration

In another characteristic configuration of the electrochemical module according to the present invention, clamping pressure corresponding to clamping pressure to be applied to the stack by the plate-like member when the electrochemical elements do not generate power is applied in advance to such an extent that a required level of the clamping pressure applied to the stack by the plate-like member can be ensured when the electrochemical elements generate power.

The stack, the clamp, and the like expand when shifting from a low-temperature state in which the electrochemical elements do not generate power to a high-temperature state in which the electrochemical elements generate power, and thus a clearance between the stack and the clamp changes.

With this characteristic configuration, the plate-like member is assembled so as to apply, to the stack, clamping pressure larger than or equal to that in the high-temperature state in which the electrochemical elements generate power, in the low-temperature state in which the electrochemical elements do not generate power.

Accordingly, even when the clearance between the stack and the clamp changes due to thermal expansion, the plate-like member substantially uniformly applies appropriate clamping pressure along the flat face of the stack. This makes it possible to suppress an increase in internal resistance and a decrease in the ability to seal in reaction gas.

Configuration

In another characteristic configuration of the electrochemical module according to the present invention, the plate-like member has a thermal expansion rate larger than the thermal expansion rates of members included in the clamp.

For example, in a case where the thermal expansion amount of the plate-like member is smaller than the thermal expansion amount of the clamp, when the clearance between the stack and the clamp increases in size due to thermal expansion, there is a case where the plate-like member cannot apply appropriate clamping pressure to the stack even by using its expansion.

With this characteristic configuration, the thermal expansion rate of the plate-like member is larger than that of the clamp. Accordingly, a clearance between the stack and the clamp that has increased in size particularly due to expansion of the clamp can be supplemented with thermal expansion of the plate-like member. That is, even when a clearance between the stack and the clamp changes due to thermal expansion in a direction in which the clearance significantly increases in size, the plate-like member thermally expands more greatly, thus making it possible to apply appropriate clamping pressure to the stack.

Configuration

In another characteristic configuration of the electrochemical module according to the present invention, the clamp is made of ferrite-based stainless steel, martensite-based stainless steel, or a complex between ceramics and the ferrite-based stainless steel or the martensite-based stainless steel.

With this characteristic configuration, the above-mentioned materials of the clamp have a relatively small thermal expansion rate. Therefore, forming the clamp using the above-mentioned material makes it possible to suppress the thermal expansion amount of the clamp to a small value, for example, in the case where the clamp becomes hot during power generation. Thus, an increase in the size of a clearance between the stack and the clamp due to thermal expansion can be suppressed. Accordingly, even when the plate-like member does not have a relatively large thermal expansion rate, appropriate clamping pressure can be applied to the stack after the above-described clearance has changed.

In addition, the clamp has a small thermal expansion amount, thus making it possible to suppress the locational shifting, breakage, and the like of the substrates, etc. of the electrochemical elements caused by expansion of the clamp.

Configuration

In another characteristic configuration of the electrochemical module according to the present invention, the plate-like member is made of austenite-based stainless steel.

With this characteristic configuration, the above-mentioned material of the plate-like member has a relatively large thermal expansion rate. Accordingly, even when a clearance between the stack and the clamp changes due to thermal expansion, the plate-like member thermally expands more greatly, thus making it possible to supplement the above-described change of the clearance and apply appropriate clamping pressure to the stack.

Configuration

In another characteristic configuration of the electrochemical module according to the present invention, the plate-like member has a wavelike shape as viewed in a direction intersecting the stacking direction of the stack.

With this characteristic configuration, the plate-like member has a wavelike shape, thus making it possible to impart appropriate elasticity to the plate-like member. In addition, the plate-like member comes into contact with the stack and the clamp at a plurality of positions that are scattered, thus making it possible to apply clamping pressure to the stack in a state in which the clamping pressure is substantially uniformly scattered.

Configuration

In another characteristic configuration of the electrochemical module according to the present invention, at least one of the first clamping portion and the second clamping portion is a portion of a housing that surrounds the stack.

With this characteristic configuration, a portion of the housing serves as at least one of the first and second clamping portions, thus making it easy to form an integrated electrochemical module by surrounding at least one side of the stack.

Configuration

In another characteristic configuration of the electrochemical module according to the present invention, the electrochemical elements are solid oxide fuel cells.

With this characteristic configuration, the electrochemical elements are solid oxide fuel cells, and the temperature thereof is as high as, for example, about 650° C. to about 950° C. during power generation. Therefore, the stack, the clamp, and the like are exposed to a high temperature and thus expand. At this time, when a difference in thermal expansion between the stack and the clamp occurs, a clearance between the stack and the clamp changes between when power is generated and when power is not generated.

The plate-like member utilizes its elasticity to apply appropriate clamping pressure to the stack in a state of being located between the stack and the clamp even when the clearance between the stack and clamp changes due to thermal expansion. This makes it possible to suppress an increase in internal resistance and a decrease in the ability to seal in reaction gas in the electrochemical module.

Configuration

In another characteristic configuration of the electrochemical module according to the present invention, the electrochemical elements are solid oxide electrolytic (electrolysis) cells.

With the above-mentioned characteristic configuration, the electrochemical elements that have excellent durability, reliability, and performance serve as solid oxide electrolytic cells and can generate gas through electrolytic reaction, and thus highly durable and high-performance solid oxide electrolytic cells can be obtained.

Configuration

A characteristic configuration of a method for assembling an electrochemical module according to the present invention includes:

arranging a plate-like member along at least one of a first flat face of a stack in a predetermined stacking direction and a second flat face of the stack on a side opposite to the first flat face, the stack being obtained by stacking a plurality of electrochemical elements in the stacking direction, the electrochemical elements having a configuration in which an electrolyte layer, and a first electrode and a second electrode that are respectively arranged on two sides of the electrolyte layer, are formed along a substrate;

arranging a plate-like first clamping portion along the first flat face and a plate-like second clamping portion along the second flat face; and pressing the first clamping portion and the second clamping portion in the stacking direction such that clamping pressure applied to the stack by the plate-like member when the electrochemical elements do not generate power is greater than or equal to clamping pressure applied to the stack by the plate-like member when the electrochemical elements generate power.

With this characteristic configuration, the plate-like member is assembled so as to apply, to the stack, clamping pressure larger than or equal to that in the high-temperature state in which the electrochemical elements generate power, in the low-temperature state in which the electrochemical elements do not generate power. Accordingly, even when the clearance between the stack and the clamp changes due to thermal expansion, the plate-like member substantially uniformly applies appropriate clamping pressure along the flat face of the stack. This makes it possible to suppress an increase in internal resistance and a decrease in the ability to seal in reaction gas.

It should be noted that the configuration in which the first electrode and the second electrode are respectively arranged on the two sides of the electrolyte layer includes either a configuration in which the first electrode is arranged in contact with the electrolyte layer or a configuration in which the first electrode layer is arranged facing the electrolyte layer via an interposing layer. The same applies to the relationship between the second electrode and the electrolyte layer. Examples of the interposing layer include a reaction preventing layer and an intermediate layer.

Configuration

A characteristic configuration of an electrochemical device according to the present invention includes at least the above-mentioned electrochemical module and a fuel converter, and includes a fuel supply unit that allows reducing component gas to flow from the fuel converter to the electrochemical module or from the electrochemical module to the fuel converter.

With the above-mentioned characteristic configuration, the electrochemical device includes the electrochemical module and the fuel converter and includes the fuel supply unit that allows the fuel gas containing a reducing component to flow between the electrochemical module and the fuel converter. Therefore, in the case of operating the electrochemical module as a fuel cell, employing a configuration in which hydrogen is generated using a fuel converter such as a reformer from natural gas or the like supplied using an existing raw fuel supply infrastructure such as city gas makes it possible to realize an electrochemical device including an electrochemical module that has excellent durability, reliability, and performance. Also, it is easier to construct a system that recycles unused fuel gas discharged from the electrochemical module, thus making it possible to realize a highly efficient electrochemical device.

In the case of operating the electrochemical module as an electrolytic cell, gas containing water vapor and carbon dioxide flows to an electrode layer, and a voltage is applied between the electrode layer and a counter electrode layer. As a result, in the electrode layer, electrons $e^-$ react with water molecules $H_2O$ and carbon dioxide molecules $CO_2$ to produce hydrogen molecules $H_2$, and carbon monoxide CO and oxygen ions $O^{2-}$. The oxygen ions $O^{2-}$ move to the counter electrode layer through the electrolyte layer. In the counter electrode layer, the oxygen ions $O^{2-}$ release electrons and oxygen molecules $O_2$ are produced. Through the reactions above, water molecules $H_2O$ are electrolyzed into hydrogen molecules $H_2$ and oxygen molecules $O_2$, and in the case where gas containing carbon dioxide molecules $CO_2$ flows, carbon dioxide molecules $CO_2$ are electrolyzed into carbon monoxide molecules CO and oxygen $O_2$.

In the case where gas containing water vapor and carbon dioxide molecules $CO_2$ flows, a fuel converter that synthesizes various compounds such as hydrocarbons from hydrogen, carbon monoxide, and the like generated through the above-mentioned electrolysis in the electrochemical module can be provided. With the fuel supply unit, hydrocarbon and the like produced by this fuel converter can flow to the electrochemical module or can be extracted from the system and the device and separately used as fuel or a chemical raw material.

Configuration

A characteristic configuration of an electrochemical device according to the present invention includes at least the above-mentioned electrochemical module and a power converter that extracts power from the electrochemical module or supplies power to the electrochemical module.

With the above-mentioned characteristic configuration, the power converter extracts power generated by the electrochemical module or supplies power to the electrochemical module. Thus, as mentioned above, the electrochemical module serves as a fuel cell or an electrolytic cell. Accordingly, with the above-mentioned configuration, it is possible to provide an electrochemical module and the like that can improve the efficiency of converting chemical energy such as fuel into electric energy or can improve the efficiency of converting electric energy into chemical energy such as fuel.

It should be noted that it is preferable to use an inverter as the power converter, for example, because the inverter can be used to boost electrical output obtained from the electrochemical module that has excellent durability, reliability, and performance, and to convert a direct current into an alternating current, thus making it easy to use the electrical output obtained from the electrochemical module.

Configuration

A characteristic configuration of an energy system according to the present invention includes:

the above-mentioned electrochemical device, and a waste heat utilization system that reuses heat discharged from the electrochemical device or a fuel converter.

The above-mentioned characteristic configuration includes the electrochemical device and the waste heat utilization system that reuses heat discharged from the electrochemical device or the fuel converter, thus making it possible to realize an energy system that has excellent durability, reliability, and performance as well as excellent energy efficiency. It should be noted that it is also possible to realize a hybrid system that has excellent energy efficiency by combination with a power generation system that generates power with use of combustion heat from unused fuel gas discharged from the electrochemical device or the fuel converter.

BRIEF DESCRIPTION OF THE DRAWINGS

FIG. 39 is an explanatory diagram of a supply structure and a discharge structure.

DESCRIPTION OF THE INVENTION

Embodiment

Hereinafter, an electrochemical module M and a method for assembling an electrochemical module M according to an embodiment of the present invention will be described. It should be noted that when the positional relationship between layers and the like are described, an electrolyte layer side is referred to as "upper portion" or "upper side", and a first plate-like body side is referred to as "lower portion" or "lower side", with respect to an electrode layer, for example. The effect of the present invention in the case where the electrochemical module M is arranged extending in the vertical direction is the same as that in the case where the electrochemical module M is arranged extending in the horizontal direction, and therefore, "upper" and "lower" may be read as "left" and "right", respectively.

(1) Overall Configuration of Electrochemical Module M

Figure 1:
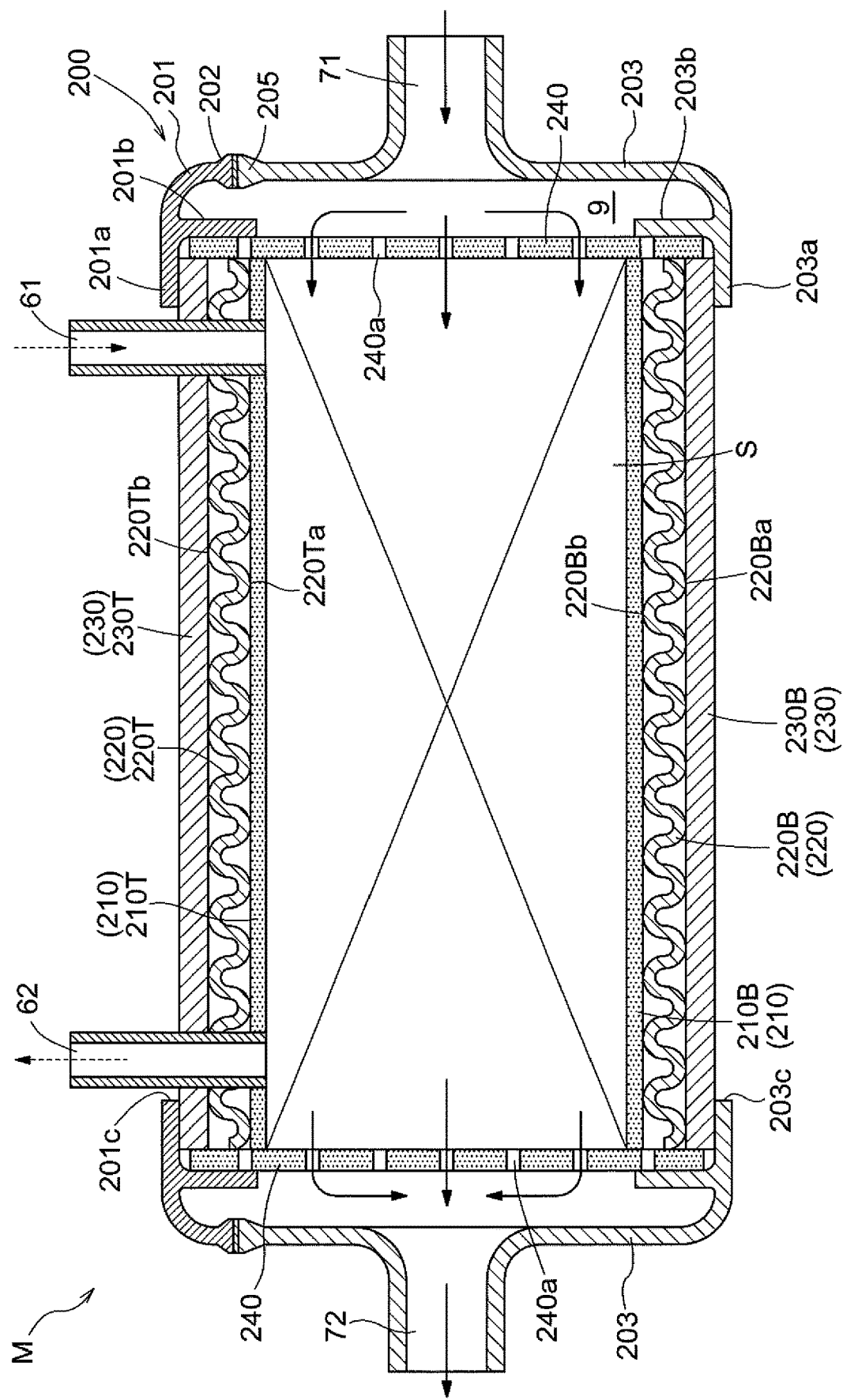
FIG. 1 is a cross-sectional view of an electrochemical module.

The following is a description of the overall configuration of the electrochemical module M. As shown in FIG. 1, the electrochemical module M includes an electrochemical element stack (stack) S, and a container (a housing, a first clamping portion, a second clamping portion) 200 that has a substantially rectangular parallelepiped shape and is internally provided with the electrochemical element stack S. An electrochemical element A (FIG. 4) is an element for generating power and is formed in a plate shape extending from the front side to the back side in the cross-sectional view shown in FIG. 1. The electrochemical element stack S has a configuration in which a plurality of plate-like electrochemical elements A are stacked in a vertical stacking direction in the cross-sectional view shown in FIG. 1. In the description of this embodiment, a SOFC (Solid Oxide Fuel Cell) is used as an example of the electrochemical element A.

The electrochemical module M also includes a first gas supply portion 61 for supplying first gas to the electrochemical element stack S from the outside of the container 200, and a first gas discharge portion 62 for discharging the first gas used in a reaction in the electrochemical element stack S.

Figure 2:
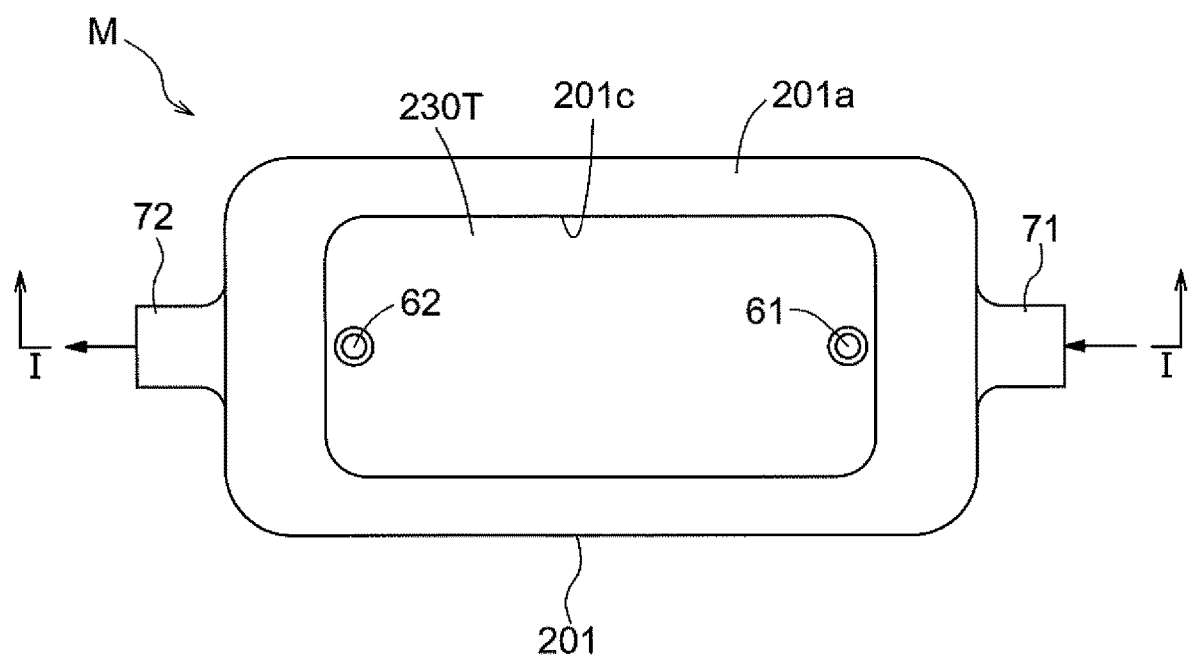
FIG. 2 is a top view of the electrochemical module.
Figure 3:
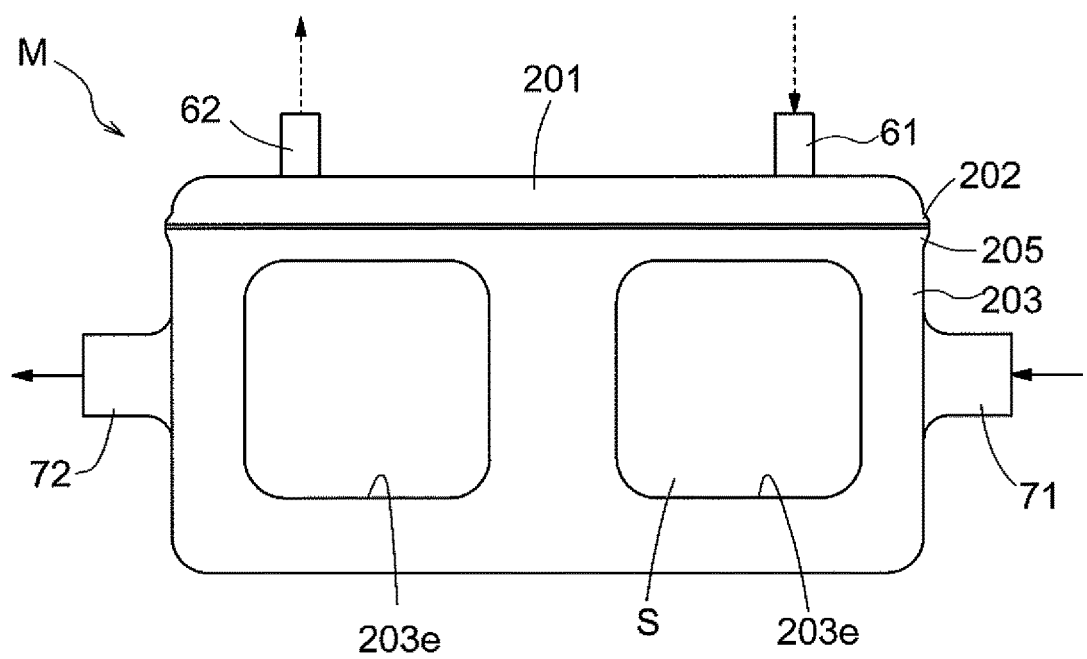
FIG. 3 is a side view of the electrochemical module.

As shown in FIGS. 1 to 3, the container 200 is provided with a second gas supply portion 71 for supplying second gas to the electrochemical element stack S from the outside of the container 200. The second gas used in a reaction in the electrochemical element stack S is discharged from a second gas discharge portion 72 provided in the container 200 to the outside.

Here, for example, the first gas is reducing component gas such as fuel gas, and the second gas is oxidative component gas such as air.

The electrochemical module M includes perforated plate members 240 on the two side faces of the electrochemical element stack S in the cross-sectional view shown in FIG. 1. Each of the perforated plate members 240 is a plate-like member that corresponds to the two side faces of the electrochemical element stack S and extends in the direction in which the electrochemical elements A are stacked, and is preferably made of an insulating material such as mica for the purpose of preventing electric short (short circuit) in the electrochemical module M. The perforated plate member 240 is provided with a plurality of holes 240a that pass through the perforated plate member 240 in the plane direction of the electrochemical element stack S.

Accordingly, the electrochemical element stack S is configured such that fuel gas is supplied from the first gas supply portion 61, air is supplied from the second gas supply portion 71 through the holes 240a of the perforated plate member 240, and power is generated through an electrochemical reaction between the fuel gas and oxygen in the air. The fuel gas used in the electrochemical reaction is discharged from the first gas discharge portion 62 to the outside. The air used in the electrochemical reaction is introduced into the second gas discharge portion 72 through the holes 240a of the perforated plate member 240, and is discharged from the second gas discharge portion 72 to the outside.

It should be noted that, here, the perforated plate members 240 are provided adjacent to the two side faces of the electrochemical element stack S, but this configuration is not essential, and configurations are also possible in which only one of them is provided, or in which both of them are omitted.

The electrochemical module M includes, on the upside of the electrochemical element stack S, an upper insulator 210T, an upper plate-like member 220T, and an upper plate (first clamping portion) 230T, which are arranged in the stated order from the electrochemical element stack S side toward the outside. Similarly, the electrochemical module M includes, on the underside of the electrochemical element stack S, a lower insulator 210B, a lower plate-like member 220B, and a lower plate (second clamping portion) 230B, which are arranged in the stated order from the electrochemical element stack S side toward the outside.

The electrochemical element stack S will be described in detail later.

(2) Insulator, Plate-Like Member, Plate, and Container

The following is a further description of insulators (upper insulator 210T and lower insulator 210B) 210, plate-like members (upper plate-like member 220T and lower plate-like member 220B) 220, plates (upper plate 230T and lower plate 230B) 230, and the container 200.

The upper insulator 210T is a plate-like member and is arranged so as to cover the top flat face (first flat face) of the electrochemical element stack S. The upper insulator 210T is made of, for example, hard mica, and electrically insulates the electrochemical element stack S from the outside.

The upper plate-like member 220T is arranged on the top of upper insulator 210T. The upper plate-like member 220T is an elastic member, and is formed, for example, in a wavelike shape in the cross-sectional view shown in FIG. 1 in this embodiment. The wavelike shape extends along the flat face of the electrochemical element stack S. Accordingly, the upper plate-like member 220T is arranged such that top portions 220Ta of the wavelike shape are in contact with the upper insulator 210T.

The upper plate-like member 220T having a wavelike shape has, for example, a thickness of about 0.1 mm to 1 mm. The amplitude (height) of the wavelike shape is, for example, about 1 mm to 10 mm, but is not limited thereto.

The role of the upper plate-like member 220T will be described later.

The upper plate 230T is a plate-like member, is arranged on the top of the upper plate-like member 220T, and is made of a ceramics-based material such as 99 alumina that has a high flexural strength at a high temperature. The upper plate 230T is in contact with at least a portion of the upper plate-like member 220T. In this embodiment, top portions 220Tb of the wavelike shape of the upper plate-like member 220T are in contact with the upper plate 230T.

The electrochemical element stack S, a pair of the upper insulator 210T and the lower insulator 210B, and a pair of the upper plate-like member 220T and the lower plate-like member 220B are sandwiched between the upper plate 230T and the lower plate 230B with predetermined clamping pressure applied by the container 200. Here, the clamping pressure refers to, for example, pressure per unit area such as 1 mm$^2$.

The lower insulator 210B is arranged so as to cover the bottom flat face (second flat face) of the electrochemical element stack S. The lower plate-like member 220B is arranged on the underside of the lower insulator 210B, and the lower plate 230B is arranged on the underside of the lower plate-like member 220B. The lower insulator 210B, the lower plate-like member 220B, and the lower plate 230B are similar to the upper insulator 210T, the upper plate-like member 220T, and the upper plate 230T, respectively. It should be noted that top portions 220Ba of the wavelike shape of the lower plate-like member 220B are in contact with the lower plate 230B, and top portions 220Bb thereof are in contact with the lower insulator 210B.

As shown in FIGS. 1 to 3, the container 200 that is internally provided with the electrochemical element stack S has a substantially rectangular parallelepiped shape. The container 200 includes an upper cover (first clamping portion) 201 having a box shape whose bottom portion is open, and a lower cover (second clamping portion) 203 whose top portion is open. A coupling portion 202 is provided on the end face of the upper cover 201 that is opposed to the lower cover 203, and a coupling portion 205 is provided on the end face of the lower cover 203 that is opposed to the upper cover 201. The upper cover 201 and the lower cover 203 are coupled to each other by, for example, welding the coupling portion 202 and the coupling portion 205 to each other, and thus a space having a rectangular parallelepiped shape is formed therein.

In this embodiment, as shown in FIG. 1, the depth of the lower cover 203 in the vertical direction (direction in which the electrochemical elements A are stacked) is larger than the depth of the upper cover 201. However, it is sufficient that the upper cover 201 and the lower cover 203 can form a space therein when integrated, and the relationship between their depths is not limited to the above-mentioned relationship. For example, the depth of the upper cover 201 may be larger than that of the lower cover 203.

As shown in FIGS. 1 to 3, at the center in the vertical direction of the container 200, the second gas supply portion 71 and the second gas discharge portion 72 are respectively formed in the two side walls of the lower cover 203 that are opposed to each other.

It should be noted that, here, the lower cover 203 is provided with the second gas supply portion 71 and the second gas discharge portion 72. However, the positions at which the second gas supply portion 71 and the second gas discharge portion 72 are formed are not limited to the above-mentioned positions, and they may be formed at any positions on the container 200. For example, the upper cover 201 may be provided with the second gas supply portion 71 and the second gas discharge portion 72.

As shown in FIGS. 1 and 2, the upper cover 201 is provided with an opening 201c that is slightly smaller in size than the area surrounded by the outer edge of the upper cover 201. In the cross-sectional view shown in FIG. 1, the end portion on the inner side that is adjacent to the opening 201c and faces the electrochemical element stack S branches into a first end portion 201a and a second end portion 201b. The first end portion 201a extends by a predetermined length toward the inside of the container 200 in the plane direction, and second end portion 201b branches off from the first end portion 201a and extends by a predetermined length toward the lower portion of the container 200. The first end portion 201a and the second end portion 201b form an angle of substantially 90° in the cross-sectional view and form an L-shaped corner portion. This L-shaped corner portion is formed along the outer edge on the inner side of the outer edge in the top view of the upper cover 201 shown in FIG. 2. Accordingly, as shown in FIGS. 1 and 2, the opening 201c that is slightly smaller in size than the area surrounded by the outer edge of the upper cover 201 is formed by the end of the first end portion 201a in the top face of the upper cover 201.

In the same manner as in the upper cover 201, the lower cover 203 includes a first end portion 203a and a second end portion 203b that form an angle of substantially 90° and form an L-shaped corner portion in the cross-sectional view shown in FIG. 1. As shown in FIG. 1, an opening 203c that is slightly smaller in size than the area surrounded by the outer edge of the lower cover 203 is formed by the end of the first end portion 203a.

As shown in FIG. 1, the upper ends of the two perforated plate members 240, the upper insulator 210T, the upper plate-like member 220T, and the upper plate 230T are fitted onto the L-shaped corner portion formed by the first end portion 201a and the second end portion 201b of the upper cover 201. Specifically, the top face of the outer peripheral end portion of the upper plate 230T extending in the plane direction of the electrochemical element stack S is in contact with bottom face of the first end portion 201a (a portion of the inner face of the L-shaped corner portion) and is supported thereby. The outer face of the upper end portion of each of the perforated plate members 240 extending along the side face of the electrochemical element stack S is in contact with the inner side face of the second end portion 201b (a portion of the inner face of the L-shaped corner portion) and is supported thereby. The upper plate-like member 220T and the upper insulator 210T are supported by the L-shaped corner portion formed by the first end portion 201a and the second end portion 203b, via the upper plate 230T and the perforated plate members 240.

Similarly, the lower ends of the two perforated plate members 240, the lower insulator 210B, the lower plate-like member 220B, and the lower plate 230B are fitted onto a pair of L-shaped corner portions that are opposed to each other in the plane direction of the lower cover 203.

The top face of the electrochemical element stack S is supported by the upper cover 201 via the upper plate 230T, the upper plate-like member 220T, and the upper insulator 210T. The bottom face of the electrochemical element stack S is supported by the lower cover 203 via the lower plate 230B, the lower plate-like member 220B, and the lower insulator 210B.

The upper cover 201 and the lower cover 203 having these configurations are coupled to each other by, for example, welding the coupling portion 202 and the coupling portion 205 to each other in the state in which the electrochemical element stack S, the upper insulator 210T, the lower insulator 210B, the upper plate-like member 220T, the lower plate-like member 220B, the upper plate 230T, the lower plate 230B, and the like are sandwiched between the upper cover 201 and the lower cover 203 from above and below. While the upper cover 201 and the lower cover 203 are coupled to each other, predetermined clamping pressure is applied to the electrochemical element stack S and the like. That is, in the state in which the upper cover 201 and the lower cover 203 are coupled to each other, predetermined clamping pressure is applied to the electrochemical element stack S, the upper insulator 210T, the lower insulator 210B, the upper plate-like member 220T, the lower plate-like member 220B, the upper plate 230T, and the lower plate 230B.

It should be noted that, as shown in FIG. 3, openings 203e are formed in the side face of the lower cover 203. Accordingly, portions of the side face of the electrochemical element stack S are exposed from the openings 203e. Providing the container 200 with the above-described openings 201c and 203c and the openings 203e makes it possible to reduce the weight of the container 200 and reduce the amount of the material necessary for the container 200. It should be noted that, when electric short (short circuit) may occur due to contact between the side face of the electrochemical element stack S and one or both of the upper cover 201 and the lower cover 203, a side insulator 245 made of a material such as mica is provided between the electrochemical element stack S and the side face of the upper cover 201 or lower cover 203.

(3) Configurations and Functions of Plate-Like Members and Related Members

Next, the configurations and functions of the plate-like members (upper plate-like member 220T and lower plate-like member 220B) 220 and related members will be further described.

As described above, in the state in which the upper cover 201 and the lower cover 203 are coupled to each other, the electrochemical element stack S, the upper insulator 210T, and the lower insulator 210B are clamped between the upper plate 230T and the lower plate 230B while predetermined clamping pressure is applied to the electrochemical element stack S, the upper insulator 210T, and the lower insulator 210B via the upper plate-like member 220T and the lower plate-like member 220B.

(3-1) Configurations of Plate-Like Members and Related Members

In this embodiment, the plate-like members 220 are constituted by thermally expandable members that thermally expand. It is preferable that the plate-like members 220 have a thermal expansion rate larger than the thermal expansion rates of members included in the electrochemical element stack S, the container 200, and the like. An example of the material of such plate-like members 220 is austenite-based stainless steel.

Austenite-based stainless steel has a relatively large thermal expansion rate. For example, aluminum has a thermal expansion rate of about $23.8 \times 10^{-6}/°$ C., and austenite-based stainless steel has a thermal expansion rate as large as the thermal expansion rates of aluminum and the like. Regarding the thermal expansion rate of austenite-based stainless steel, SUS303 and SUS304 have a thermal expansion rate of about $17.3 \times 10^{-6}/°$ C., and SUS316 has a thermal expansion rate of about $16 \times 10^{-6}/°$ C. However, the material of the plate-like members 220 is not limited thereto, and it is preferable to select members that have a thermal expansion rate larger than those of the container 200 and the like and have excellent corrosion resistance.

It is preferable that the container 200 has a thermal expansion rate smaller than the thermal expansion rates of the plate-like members 220. The container 200 is arranged adjacent to the plate-like members 220 via the plates 230. The lower cover 203 and the upper cover 201 of the container 200 are linked to each other and thus apply clamping pressure to the electrochemical element stack S via the plate-like members 220. Examples of the material of such a container 200 include ferrite-based stainless steel, martensite-based stainless steel, and complexes between ceramics and the above-mentioned stainless steel. These materials have thermal expansion rates smaller than that of austenite-based stainless steel. Regarding the thermal expansion rate of ferrite-based stainless steel, SUS430 has a thermal expansion rate of about $11 \times 10^{-6}/°$ C. Regarding the thermal expansion rate of martensite-based stainless steel, SUS403 and SUS420J1 have a thermal expansion rate of about $10.4 \times 10^{-6}/°$ C., and SUS410 and SUS440C have a thermal expansion rate of about $10.1 \times 10^{-6}/°$ C. However, the container 200 is not limited thereto, and it is preferable to select a material that has a thermal expansion rate smaller than those of the plate-like members 220 and has excellent corrosion resistance.

It is preferable that a material of the electrochemical element stack S is similar to the material of the container 200. In other words, it is preferable that a material of the electrochemical element stack S has a thermal expansion rate as large as that of the material of the container 200. In this case, the substrates of the electrochemical element stack S and the container 200 thermally expand to the same degree, for example, at the time of power generation when the electrochemical elements A become hot. Accordingly, it is possible, for example, to reduce a difference in thermal expansion between the substrates of the electrochemical elements A and the container 200 and suppress damage or the like on the substrates.

(3-2) Method for Assembling Electrochemical Module M and Compressional Deformation of Plate-Like Members During Assembly (a) Method for Assembling Electrochemical Module M Next, a method for assembling the above-mentioned electrochemical module M will be described.

The electrochemical element stack S is prepared by stacking a plurality of electrochemical elements A. The configuration of the electrochemical element stack S, and a method for manufacturing the electrochemical element stack S will be described later.

The container 200 for housing the electrochemical element stack S is also prepared. The container 200 can be manufactured using, for example, a lost-wax casting method, but the manufacturing method is not limited thereto. When the lost-wax casting method is used, a model corresponding to the external shape of the container 200 is manufactured using, for example, a thermoplastic substance such as beeswax or pine resin. A fire-resistant material made of silica sand, lime powder, and the like is used to cover this model. Thereafter, the model covered by the fire-resistant material is heated, and thus the model made of the thermoplastic substance is melted and removed. Accordingly, a cavity corresponding to the model having the shape of the container 200 is formed inside the fire-resistant material. The material of the container 200 is injected into this cavity and solidified, and then the fire-resistant substance is removed. Accordingly, the container 200 including the upper cover 201 and the lower cover 203 is manufactured using the lost-wax casting method. It should be noted that the upper cover 201 and the lower cover 203 may be separately manufactured.

Next, for example, the two perforated plate members 240 are arranged on the two side faces of the electrochemical element stack S, and the insulator 210, the plate-like member 220, and the plate 230 are arranged one by one on each of the top flat face and the bottom flat face of the electrochemical element stack S, and these members are housed in the lower cover 203 while this state is maintained. The lower cover 203 is covered by the upper cover 201, positional adjustment is performed such that predetermined clamping pressure is applied to the electrochemical element stack S, and then the lower cover 203 and the upper cover 201 are linked to each other through welding or the like. The electrochemical module M is thus assembled.

When the container 200 is manufactured using the lost-wax casting method as mentioned above, the cost can be reduced due to a reduction in thickness, manufacturing accuracy, and mass production.

In this embodiment, forming the box-shaped container 200 makes it possible to provide a space for a manifold for supplying air from the second gas supply portion 71 to the electrochemical element stack S.

(b) Compressional Deformation of Plate-Like Members During Assembly

During the above-mentioned assembly of the electrochemical module M, predetermined clamping pressure is applied to the electrochemical element stack S when the lower cover 203 and the upper cover 201 are linked to each other. This clamping pressure is applied by causing predetermined compressional deformation L of the plate-like members 220.

The following is a description of the compressional deformation L.

In the following description, it is supposed that the container 200 is made of a predetermined material A, the main portions of the electrochemical element stack S, such as the substrates, are made of a predetermined material B, and the plate-like members 220 are made of a predetermined material C. The material C has a thermal expansion rate larger than the thermal expansion rates of the materials A and B.

Here, the spring constant of each of the plate-like members 220 at room temperature (20° C.) is taken as $K_2O$. The spring constant $K_2O$ is calculated using, for example, the thickness, the amplitude (height) of the wavelike shape, the pitch of the wave, and the like of the plate-like member 220.

In addition, the spring constant at a temperature (e.g., 700° C.) during power generation by the electrochemical element A is taken as K700. It should be noted that K700 is, for example, about 75% of $K_2O$.

Here, clamping pressure per unit area required for the electrochemical element stack S during power generation (e.g., at 700° C.) is taken as P. Here, P is, for example, about 1 to 3 kgf/cm², but is not limited thereto. When the area of the electrochemical element stack S is taken as SB, an applied force F is represented as follows: F=P×SB.

When the temperature rises from room temperature (20° C.) to a high temperature (e.g., 700° C.) during power generation, the thermal expansion lengths of the container 200, the electrochemical element stack S, and the plate-like member 220 in the application direction (here, a direction in which the electrochemical elements A are stacked) are taken as LA, LB, and LC, respectively.

A difference ΔG in the thermal expansion length between the container 200 and the electrochemical element stack S is expressed as follows: ΔG=LA−LB. Here, a difference in the thermal expansion length between the container 200, and the electrochemical element stack S and plate-like member 220 may be calculated as the difference ΔG in the thermal expansion length. In this case, ΔG is expressed as follows: ΔG=LA−(LB+LC). In the following description, the expression ΔG=LA−LB is used such that, by supposing that the plate-like members 220 do not thermally expand, appropriate clamping pressure can be more reliably applied due to the compressional deformation L of the plate-like members 220 during assembly even after the container 200 and the like thermally expand.

Here, the compressional deformation L of the plate-like members 220 at room temperature (20° C.) to keep the clamping pressure P per unit area at a high temperature (e.g., 7000C) during power generation is calculated using the following expression.

$$L=P\times SB/(K700)+\Delta G$$

As described above, after the electrochemical element stack S, the plate-like members 220, and the like are housed in the container 200, the linkage distance between the lower cover 203 and the upper cover 201, and the like are adjusted such that the compressional deformation L calculated as mentioned above is caused in the plate-like members 220, and then the lower cover 203 and the upper cover 201 are sealed through welding or the like. This makes it possible to apply predetermined clamping pressure to the electrochemical element stack S.

(3-3) Functions of Plate-Like Members

As mentioned above, the plate-like members 220 constituted by thermally expandable members are arranged on the top flat face and the bottom flat face of the electrochemical element stack S, and elastically support the electrochemical element stack S due to the upper and lower plates 230 applying predetermined clamping pressure thereto.

Here, for example, at least one of the electrochemical element stack S, the container 200, and the like expands when shifting from a low-temperature state (e.g., about 20° C. in room-temperature atmosphere) in which the electrochemical elements A do not generate power to a high-temperature state (e.g., about 650° C. to about 950° C.) in which the electrochemical elements A generate power. At this time, if a difference in thermal expansion between the electrochemical element stack S and the container 200 occurs, a clearance between the electrochemical element stack S and the container 200 changes between when power is generated (high-temperature state) and when power is not generated (low-temperature state).

With the above-mentioned configuration, the plate-like members 220 are thermally expandable members, and therefore, the plate-like members 220 also thermally expand due to high temperature of the electrochemical elements A during power generation. Accordingly, even when a clearance between the electrochemical element stack S and the container 200 changes due to thermal expansion, the plate-like members 220 apply appropriate clamping pressure to the electrochemical element stack S with the plates 230 being used as pressing faces by utilizing the elasticity due to thermal expansion of the plate-like members 220 themselves and the elasticity due to the compressional deformation L caused in advance.

That is, the change of a clearance between the electrochemical element stack S and the container 200 due to thermal expansion can be supplemented with the change of the plate-like members 220 due to thermal expansion. Accordingly, appropriate clamping pressure is applied to the electrochemical element stack S even after the above-described clearance has changed. For example, the plate-like members 220 thermally expand and supplement a clearance between the electrochemical element stack S and the container 200 that has increased in size due to thermal expansion, and thus appropriate clamping pressure is applied to the electrochemical element stack S.

Since the plate-like members 220 are arranged extending along the flat faces of the electrochemical element stack S and the flat faces of the plates 230, the plate-like members 220 substantially uniformly apply appropriate clamping pressure along the flat faces of the electrochemical element stack S even after the above-described clearance has changed. Accordingly, in the electrochemical module M, it is possible to suppress a decrease in contact areas between the electrochemical elements A and to reduce internal resistance. In addition, since the electrochemical elements A can be brought into appropriate contact with each other to maintain gastightness, it is possible to suppress leakage of fuel gas and the like to the outside of the electrochemical elements A and a decrease in the ability to seal in reaction gas.

As described above, a small-size, light-weight, and low-cost electrochemical module in which the electrochemical element stack S and the like can be clamped appropriately even when the electrochemical element stack S and the like expand can be achieved.

In particular, in the above-mentioned embodiment, the plate-like members 220 have a thermal expansion rate larger than the thermal expansion rates of the members included in the container 200. To achieve this relationship, for example, austenite-based stainless steel is employed as the material of the plate-like members 220, and ferrite-based stainless steel, martensite-based stainless steel, a complex between the above-mentioned stainless steel and ceramics, or the like is employed as the material of the container 200. In addition, the same material as the material of the container 200 is employed as the material of the electrochemical element stack S.

Here, as described above, when the electrochemical element stack S shifts from a low-temperature state in which power is not generated to a high-temperature state in which power is generated, at least one of the electrochemical element stack S and the container 200 thermally expands, and a difference in the thermal expansion amount between the electrochemical element stack S and the container 200 occurs. As a result, a clearance between the electrochemical element stack S and the container 200 increases in size in the high-temperature state compared with the low-temperature state. For example, when the thermal expansion amount of the container 200 is relatively large, the clearance between the electrochemical element stack S and the container 200 further increases in size.

In this embodiment, as described above, the plate-like members 220 have a thermal expansion rate larger than the thermal expansion rates of the members included in the container 200. Accordingly, a clearance between the electrochemical element stack S and the container 200 that has increased in size particularly due to expansion of the container 200 can be supplemented with thermal expansion of the plate-like members 220. That is, even when the clearance between the electrochemical element stack S and the container 200 changes due to thermal expansion in a direction in which the clearance significantly increases in size, the above-described clearance can be supplemented with the plate-like members 220 that thermally expand more greatly. Accordingly, even after this clearance has changed, appropriate clamping pressure can be substantially uniformly applied along the flat faces of the electrochemical element stack S by utilizing the elasticity due to the compressional deformation caused in the plate-like members 220 in advance and the elasticity due to thermal expansion of the plate-like members 220 themselves.

It should be noted that, when the container 200 has a relatively small thermal expansion rate, the thermal expansion amount of the container 200 can be suppressed to a small value, for example, in the case where the container 200 becomes hot during power generation. Thus, an increase in the size of the clearance between the electrochemical element stack S and the container 200 due to thermal expansion can be suppressed. Accordingly, even when the plate-like members 220 have a relatively small thermal expansion rate, appropriate clamping pressure can be substantially uniformly applied along the flat faces of the electrochemical element stack S after the above-described clearance has changed.

In addition, when the thermal expansion amount of the container 200 is small, the locational shifting, breakage, and the like of the substrates, etc. of the electrochemical elements A caused by expansion of the container 200 can be suppressed.

In the above-mentioned embodiment, the plate-like members 220 are formed in a wavelike shape. Accordingly, the top portions of the wavelike shape of each of the plate-like members 220 are in contact alternately with the flat face of the plate 230 and the flat face of the electrochemical element stack S via the insulator 210, at a plurality of positions that are scattered.

When the clearance between the electrochemical element stack S and the container 200 changes due to expansion of at least one of the electrochemical element stack S and the container 200, a pressing force applied to the plate-like members 220 also changes due to the change of the clearance. The pressing force, which has changed, is elastically received via the plate-like members 220 in a state of being substantially uniformly scattered on the substantially entire flat faces of the electrochemical element stack S and the substantially entire flat faces of the plates 230. This is because the plate-like members 220 are in contact with the flat faces of the electrochemical element stack S and the flat faces of the plates 230 at a plurality of positions that are scattered as described above. Furthermore, when the plate-like members 220 thermally changes, the change of the clearance between the electrochemical element stack S and the container 200 is received by the thermal expansion and the elasticity of the plate-like members 220 themselves at the above-described positions.

Accordingly, even when the clearance between the electrochemical element stack S and the container 200 changes due to expansion of the electrochemical element stack S and the like, appropriate clamping pressure in the stacking direction can be substantially uniformly applied along the flat faces of the electrochemical element stack S due to the plate-like members 220. This makes it possible to suppress an increase in internal resistance and a decrease in the ability to seal in reaction gas in the electrochemical module M and to reduce the size and weight of the electrochemical module M.

In this embodiment, the electrochemical element stack S includes SOFCs, which are electrochemical elements. The temperature of the SOFC is as high as, for example, about 650° C. to about 950° C. during power generation. Therefore, the expansion amounts of the electrochemical element stack S, the container 200, and the like increase due to these members shifting from the low-temperature state (e.g., about 20° C. in room-temperature atmosphere) in which power is not generated to the high-temperature state (e.g., about 650° C. to about 950° C.) in which power is generated. In this embodiment, the plate-like members 220 can apply appropriate clamping pressure to the electrochemical element stack S with the plates 230 being used as pressing faces by utilizing a change of the elasticity due to thermal expansion of the plate-like members 220 themselves. Accordingly, even when SOFCs that generate power in a high-temperature range are used, this embodiment can be employed to apply appropriate clamping pressure to the electrochemical element stack S.

A reduction in size of the electrochemical module M will be further described. For example, in a case of a configuration in which the peripheral portions of two thick clamping plates are fastened to apply clamping pressure to the electrochemical element stack S, large-size tightening bolts provided with a spring need to be provided, as tightening members, on the outside of the electrochemical module M. However, with the above-mentioned embodiment, it is sufficient that the plate-like members 220 are arranged inside the electrochemical module M, and thus the size of the electrochemical module M can be reduced.

In a case where protruding objects such as large-size tightening bolts are arranged on the outside of the electrochemical module M, heat is likely to be dissipated through such protruding objects of the electrochemical module M during power generation. Since the plate-like members 220 of this embodiment are arranged inside the electrochemical module M, heat dissipation faces can be reduced, thus making it possible to improve the power generation efficiency of the electrochemical module M.

In this embodiment, the clamping pressure is adjusted by the plate-like members 220, and therefore, compared with the case where the clamping pressure applied to the electrochemical element stack S is adjusted using a plurality of large-size tightening bolts or the like, time required to adjust the clamping pressure can be significantly reduced. For example, in a case where the electrochemical element stack S is clamped using a plurality of large-size tightening bolts, it is necessary to adjust the pressure while controlling the torque of the bolts. However, when the plate-like members 220 of this embodiment are used, the plate-like members 220 substantially uniformly apply clamping pressure to the flat faces of the electrochemical element stack S, and therefore, complex torque control as described above is not needed.

(4) Specific Configuration of Electrochemical Module M

Next, the specific configuration of the electrochemical module M will be described with reference to FIGS. 1 and 4. Details of the electrochemical element stack S shown in FIG. 1 is shown in FIG. 4.

Figure 4:
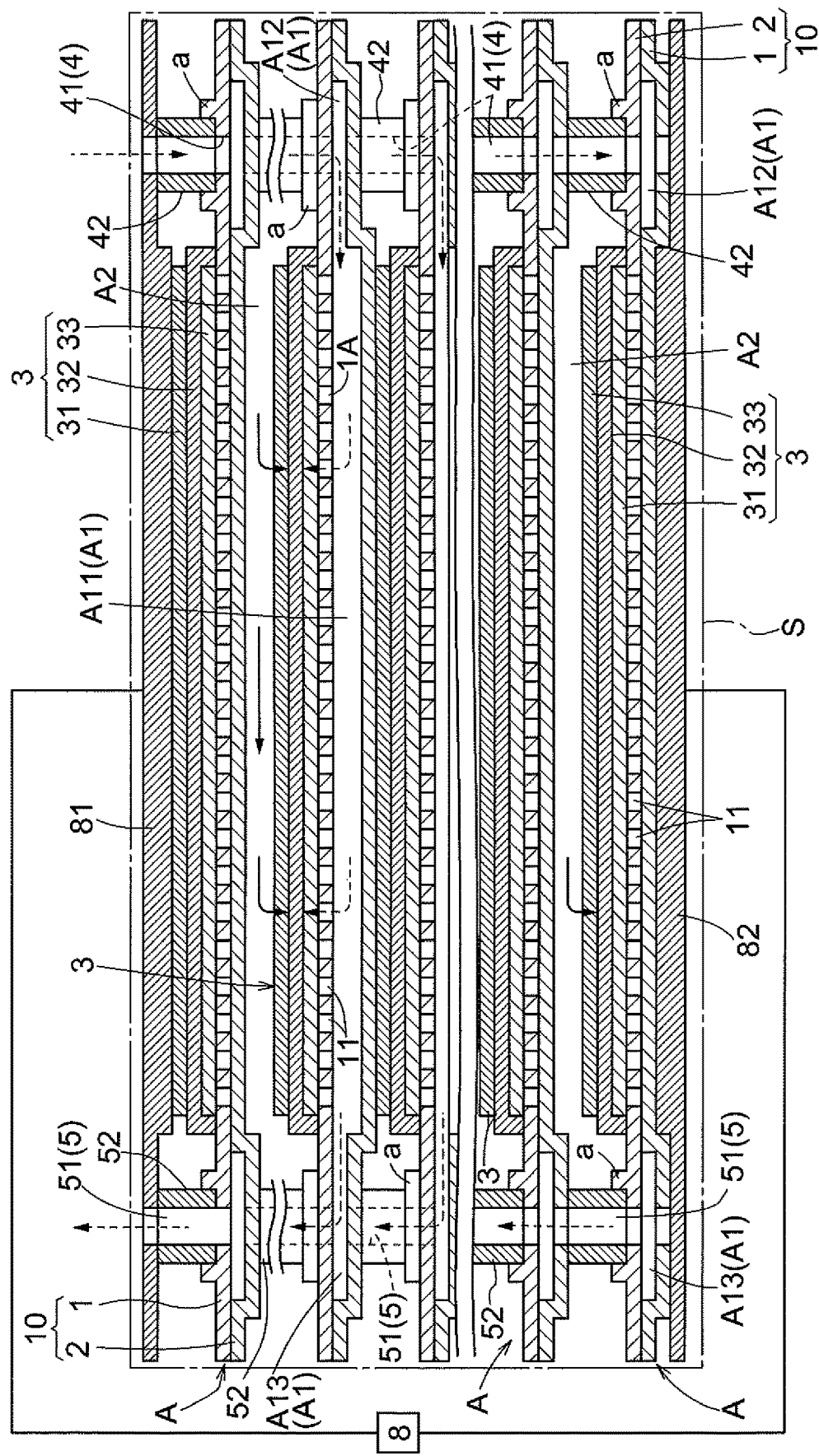
FIG. 4 is a schematic view of the electrochemical module.

As shown in FIGS. 1 and 4, the electrochemical module M includes: the container 200 (the upper cover 201 and the lower cover 203) that is internally provided with the electrochemical element stack S; the first gas supply portion 61 for supplying first gas from the outside of the container 200 to internal passage A1 via a supply passage 4; the first gas discharge portion 62 for discharging the first gas used in a reaction; the second gas supply portion 71 for supplying second gas from the outside of the container 200 to flowing portions A2; the second gas discharge portion 72 for discharging the second gas used in a reaction; and an output portion 8 to which output generated by an electrochemical reaction in the electrochemical reaction portion 3 is provided, wherein a distribution chamber 9 for distributing and supplying the second gas supplied from the second gas supply portion 71, to the flowing portions A2 is provided inside the container 200.

The distribution chamber 9 is a space located on a side for supplying second gas to the electrochemical element stack S with respect to the electrochemical element stack S, and openings are formed on the space side and the flowing portions A2 are in communication with the space therethrough.

Ina state of being held between two collectors 81 and 82, the electrochemical element stack S is provided inside the container 200. The output portion 8 extends from the collectors 81 and 82 and is connected to a power supply target provided outside the container 200 so as to freely supply power thereto. Furthermore, the electrochemical element stack S is housed in the container 200 such that at least one of the collectors 81 and 82 is electrically insulated from the container 200 and the container 200 is hermetically sealed against the first gas.

Accordingly, in the electrochemical module M, the fuel gas is supplied from the first gas supply portion 61 and air is supplied from the second gas supply portion 71, so that the fuel gas enters as indicated by dashed arrows and air enters as indicated by solid arrows as shown in FIGS. 1 and 4.

The fuel gas supplied from the first gas supply portion 61 is introduced into the supply passage 4 through a first penetrated portion 41 of the topmost electrochemical element A of the electrochemical element stack S, and flows from the supply passage 4 partitioned by first annular sealing portions 42 into the internal passage A1 in all of the electrochemical elements A. Moreover, the air supplied from the second gas supply portion 71 temporarily flows into the distribution chamber 9, and then flows into the flowing portions A2 formed between the electrochemical elements A.

Incidentally, when a second plate-like body 2 (a portion of a plate-like support 10) is considered as a base, the internal passage A1 is formed between a first plate-like body 1 (a portion of the plate-like support 10) and the second plate-like body 2 at a position at which a portion of the second plate-like body 2 with a wavelike plate-like shape bulges from the first plate-like body 1, and such a portion comes into contact with the electrochemical reaction portion 3 of the adjacent electrochemical element A and can be electrically connected thereto. On the other hand, a portion of the second plate-like body 2 with a wavelike plate-like shape that is in contact with the first plate-like body 1 is electrically connected to the first plate-like body 1, and the flowing portion A2 is formed between the second plate-like body 2 and the electrochemical reaction portion 3 of the adjacent electrochemical element A.

Figure 11:
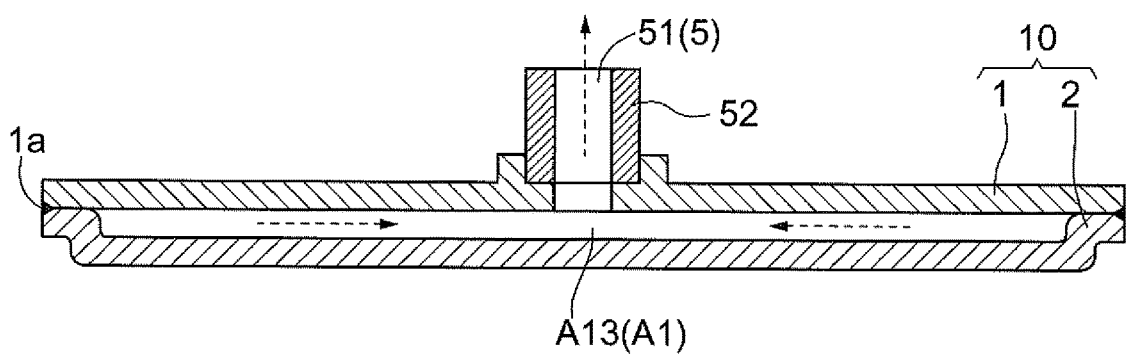
FIG. 11 is a cross-sectional view taken along line XI-XI in FIG. 9.
Figure 12:
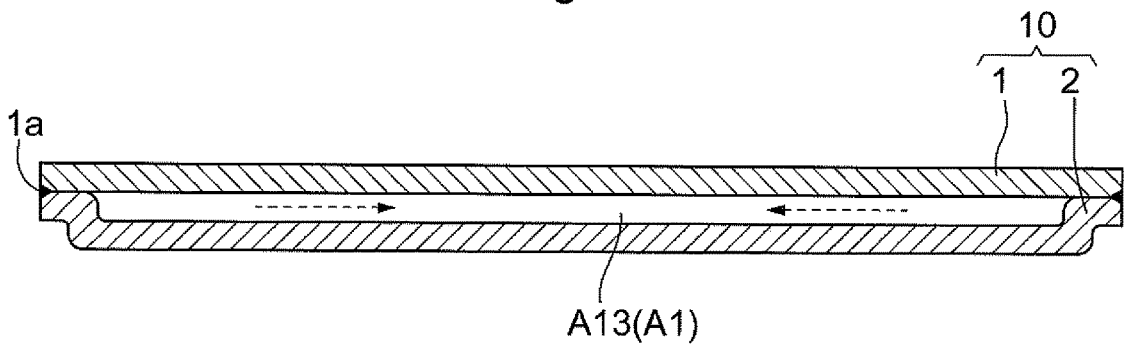
FIG. 12 is a cross-sectional view taken along line XII-XII in FIG. 9.
Figure 15:
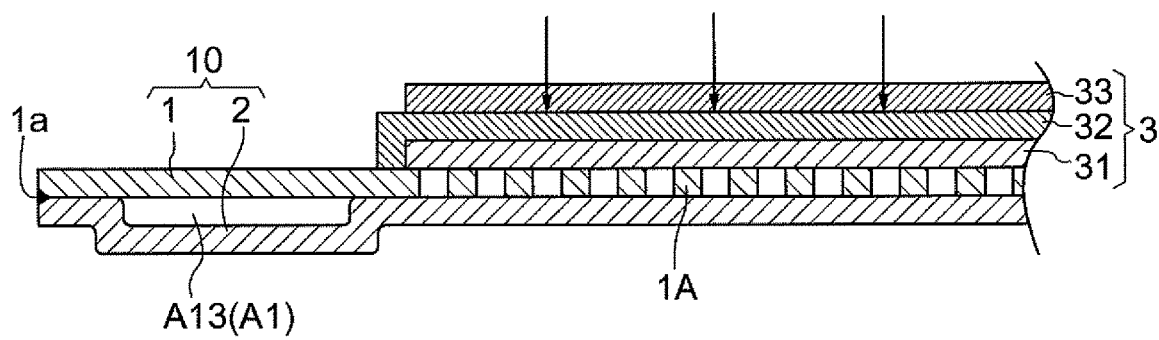
FIG. 15 is a cross-sectional view taken along line XV-XV in FIG. 9.
Figure 16:
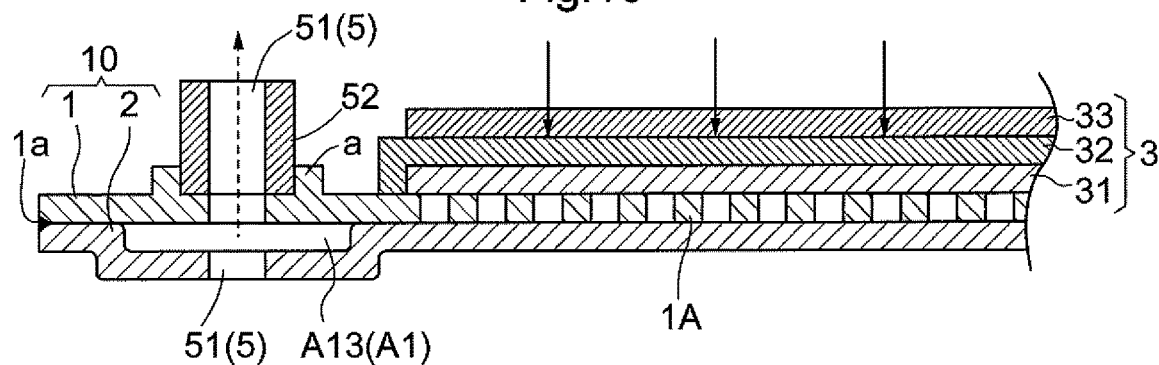
FIG. 16 is a cross-sectional view taken along line XVI-XVI in FIG. 9.
Figure 17:
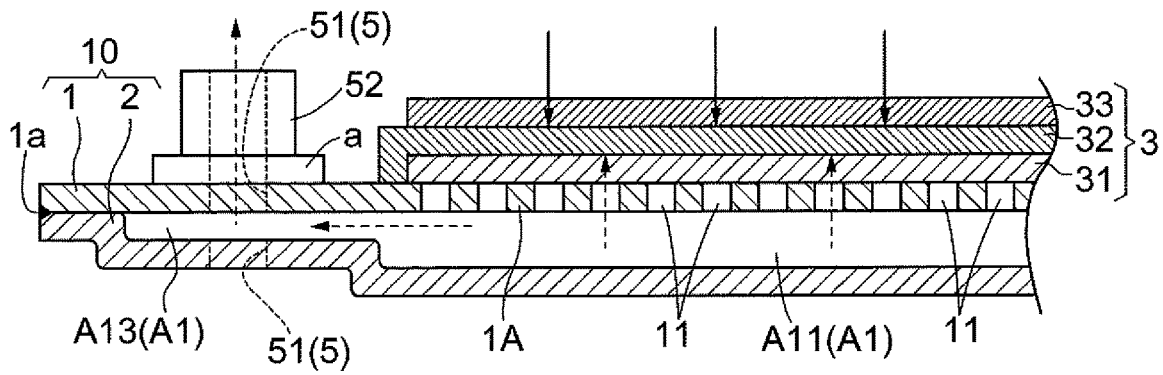
FIG. 17 is a cross-sectional view taken along line XVII-XVII in FIG. 9.
Figure 18:
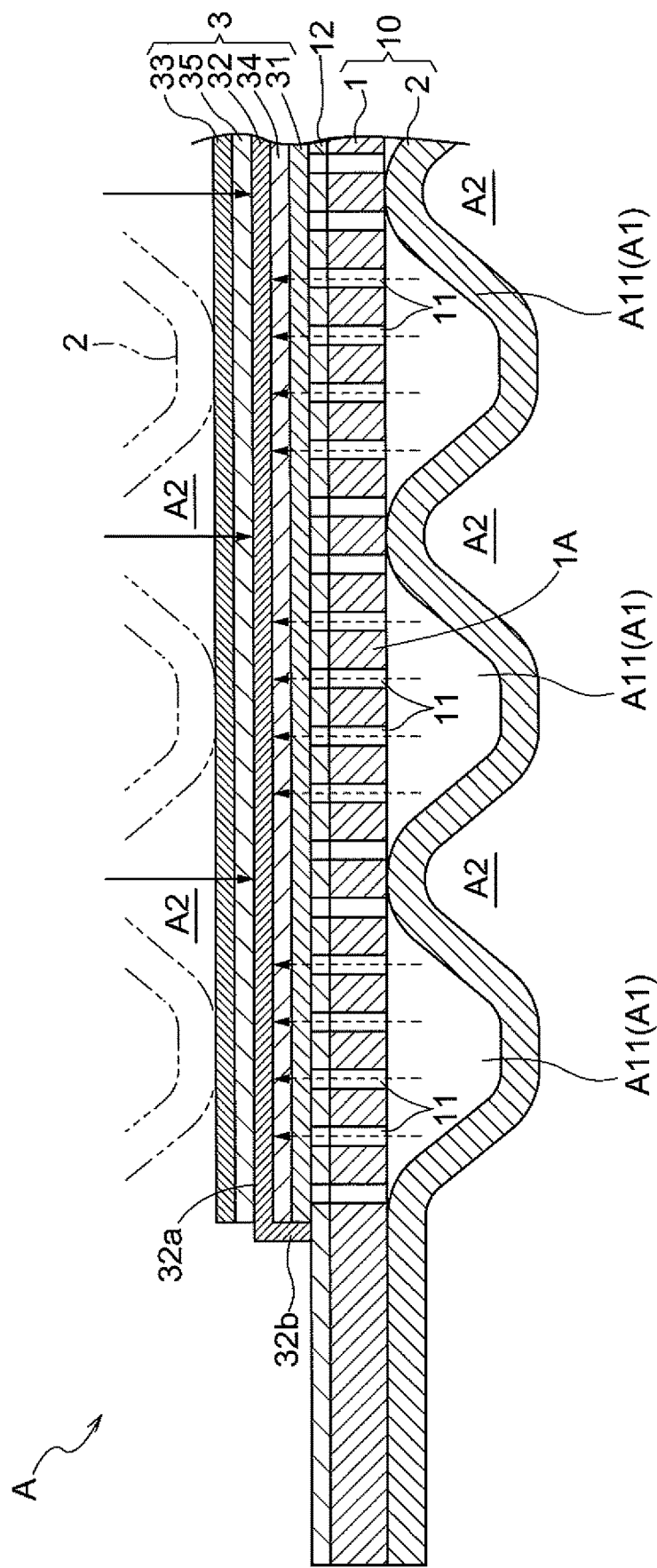
FIG. 18 is an enlarged view of a relevant portion of an electrochemical reaction portion.

A portion of FIG. 18 shows a cross section of an electrochemical element A including the internal passage A1 and a cross section of an electrochemical element A including the flowing portion A2 that are aligned for the sake of convenience. The fuel gas supplied from the first gas supply portion 61 reaches a distribution portion A12 (see FIGS. 9, 12, and 15), flows and spreads in the width direction of one end portion via the distribution portion A12, and reaches auxiliary passages A11 of the internal passage A1 (see FIGS. 9, 11, and 15). In this case, the first gas can be equally distributed from the distribution portion A12 to the auxiliary passages A11, thus making it possible to allow the electrochemical elements to equally generate electrochemical output.

Then, the fuel gas that has entered the internal passage A1 can enter the electrode layers 31 and the electrolyte layers 32 via a gas-permeable portion 1A. Moreover, the fuel gas further flows in the internal passage A1 together with the fuel gas used in an electrochemical reaction to a discharge passage 5 formed by second annular sealing portions 52 via confluence portions A13 and a second penetrated portion 51, and is discharged from the first gas discharge portion 62 to the outside of the container 200, together with the fuel gas that was used in an electrochemical reaction and flows from other electrochemical elements A.

On the other hand, the air supplied from the second gas supply portion 71 enters the flowing portions A2 via the distribution chamber 9, and then can enter the counter electrode layers 33 and the electrolyte layers 32. Moreover, the air further flows in the flowing portions A2 along the electrochemical reaction portions 3 together with air used in an electrochemical reaction, and is discharged from the second gas discharge portion 72 to the outside of the container 200.

With this configuration, the electrochemical elements A are connected in series between the collectors 81 and 82 due to the contact between the second plate-like body 2 and the electrochemical reaction portion 3 of the adjacent electrochemical elements A, and thus power generated following the fuel gas flow and the air flow in the electrochemical reaction portions 3 is extracted from the output portion 8 as composite output.

The configuration of the electrochemical element stack S will be described later in detail.

(5) Modified Examples of Plate-Like Member (a) In the description above, the plate-like members 220 are thermally expandable members that thermally expand. However, the plate-like members 220 are not limited to thermally expandable members as long as members that can substantially uniformly apply clamping pressure to the flat faces of the electrochemical element stack S when the electrochemical element stack S, the container 200, and the like expand and contract, for example, are used. For example, the plate-like members 220 may be members that have a small thermal expansion rate but have a certain level of elasticity.

The elastic plate-like members 220 are arranged on the top flat face and the bottom flat face of the electrochemical element stack S and extend along these flat faces. The plate-like members 220 elastically support the electrochemical element stack S due to the container 200 applying predetermined clamping pressure thereto via the upper and lower plates 230.

When at least one of the electrochemical element stack S and the container 200 expands, a clearance between the electrochemical element stack S and the container 200 may change between before and after expansion of the electrochemical element stack S and the like. The plate-like members 220 have elasticity, and therefore, the electrochemical element stack S is elastically clamped between the plate-like members 220 due to their elasticity in the container 200 even if the clearance between the electrochemical element stack S and the container 200 changes. That is, clamping pressure is applied to the plate-like members 220 from the container 200, and thus the electrochemical element stack S is elastically clamped between the two plates 230.

More specifically, when a clearance between the electrochemical element stack S and the container 200 changes due to expansion of at least one of the electrochemical element stack S and the container 200, a pressing force applied to the plate-like members 220 also changes due to the change of the clearance. The pressing force, which has changed, is elastically received by the plate-like members 220 arranged along the flat faces of the electrochemical element stack S and the flat faces of the plates 230 in a state of being substantially uniformly scattered on the substantially entire flat faces of the electrochemical element stack S and the substantially entire flat faces of the plates 230.

Accordingly, even when the clearance between the electrochemical element stack S and the container 200 changes due to expansion of the electrochemical element stack S and the like, appropriate clamping pressure in the stacking direction can be substantially uniformly applied along the flat faces of the electrochemical element stack S due to the plate-like members 220.

Employing the simple configuration as described above in which the plate-like members 220 are arranged extending along the flat faces of the electrochemical element stack S and the plates 230 in a location between the flat faces of the electrochemical element stack S and the flat faces of the plates 230 and housed in the container 200 makes it possible to form the electrochemical module M in which expansion of the electrochemical element stack S and the like is taken into consideration.

It should be noted that, in the case where the plate-like members 220 are members having a small thermal expansion rate, it is preferable to apply larger clamping pressure when the plate-like members 220, the electrochemical element stack S, and the like are housed in the container 200 and assembled together, compared with the case where the plate-like members 220 are members having a large thermal expansion rate. In this case, during assembly, large repulsive force is generated in the plate-like members 220 due to large clamping pressure. Accordingly, even when the clearance between the electrochemical element stack S and the container 200 increases in size due to expansion of the electrochemical element stack S and the like, and thus the clamping pressure decreases to a certain degree, appropriate clamping pressure can be applied to the electrochemical element stack S.

(b) In the description above, the upper plate-like member 220T and the lower plate-like member 220B are provided, but configurations are also possible in which only one of the plate-like members 220 is provided. However, when the upper plate-like member 220T and the lower plate-like member 220B are provided, clamping pressure can be applied to the electrochemical element stack S from above and below using the plate-like members 220, and thus clamping pressure can be more uniformly applied to the flat faces of the electrochemical element stack S. Accordingly, such a configuration is preferable.

(c) In the description above, the plate-like members 220 are formed in a wavelike shape, but there is no limitation to this shape, and other configurations can also be employed in which the plate-like members 220 are in contact with the electrochemical element stack S, the plates 230, and the like at a plurality of positions that are scattered. For example, the plate-like members 220 may also be formed in a metal honeycomb shape.

The plate-like members 220 may also be in contact with either of the flat faces of the electrochemical element stack S or the flat faces of the plates 230 at a plurality of positions that are scattered.

For example, it is also possible that the plate-like members 220 are in contact with the flat faces of the electrochemical element stack S at a plurality of positions that are scattered, and are in surface contact with the flat faces of the plates 230. In this case, force applied due to expansion of the electrochemical element stack S and the like is scattered and received by the portions of the plate-like members 220 that are in contact with the electrochemical element stack S.

Moreover, for example, it is also possible that the plate-like members 220 are in surface contact with the flat faces of the electrochemical element stack S, and are in contact with the flat faces of the plates 230 at a plurality of positions. In this case, force applied due to expansion of the electrochemical element stack S and the like is scattered and received by the portions of the plate-like members 220 that are in contact with the flat faces of the plates 230.

(d) In the description above, the plate-like members 220 have a thermal expansion rate larger than the thermal expansion rates of the members included in the container 200. However, there is no limitation to such a relationship between the thermal expansion rates as long as a clearance between the electrochemical element stack S and the container 200 formed due to thermal expansion can be supplemented with expansion of the plate-like members 220.

For example, the plate-like members 220 may have a thermal expansion rate similar to, or smaller than, the thermal expansion rates of the members included in the container 200.

(e) In the description above, the plate-like members 220 are used to adjust a change of the clearance between the electrochemical element stack S and the container 200 due to expansion. However, the plate-like members 220 can also be employed to adjust a change of the clearance between the electrochemical element stack S and the container 200 due to contraction.

(f) The above-mentioned plate-like members 220 can receive expansion and contraction of the electrochemical element stack S, the container 200, and the like caused by a change of the temperature due to power generation as well as changes of, for example, vibration, external pressure, humidity, and outside air temperature that act on the electrochemical module M.

(g) In the description above, the electrochemical module M is provided with functional layers such as the insulators 210 having insulating properties. The electrochemical module M may also be provided with separate functional layers in addition to, or instead of, the above-mentioned functional layers.

(h) In the description above, the lower cover 203 and the upper cover 201 are linked to each other through welding. However, the technique for linking the lower cover 203 and the upper cover 201 to each other is not limited to welding, and the lower cover 203 and the upper cover 201 may be linked to each other using, for example, bolts or the like.

(6) Other Embodiments of Electrochemical Module M

Hereinafter, embodiments of the electrochemical module M that are different from the above-mentioned embodiment will be described using another embodiment 1 and another embodiment 2 as examples.

(6-1) Another Example 1

An electrochemical module M1 according to another embodiment 1 will be described with reference to FIG. 5. The electrochemical module M1 according to another embodiment 1 is different from the electrochemical module M shown in FIG. 1 in that plate-like members 320 are provided in addition to the plate-like members 220. That is, the electrochemical module M1 according to another embodiment 1 is provided with two types of plate-like members 220 and 320.

Figure 5:
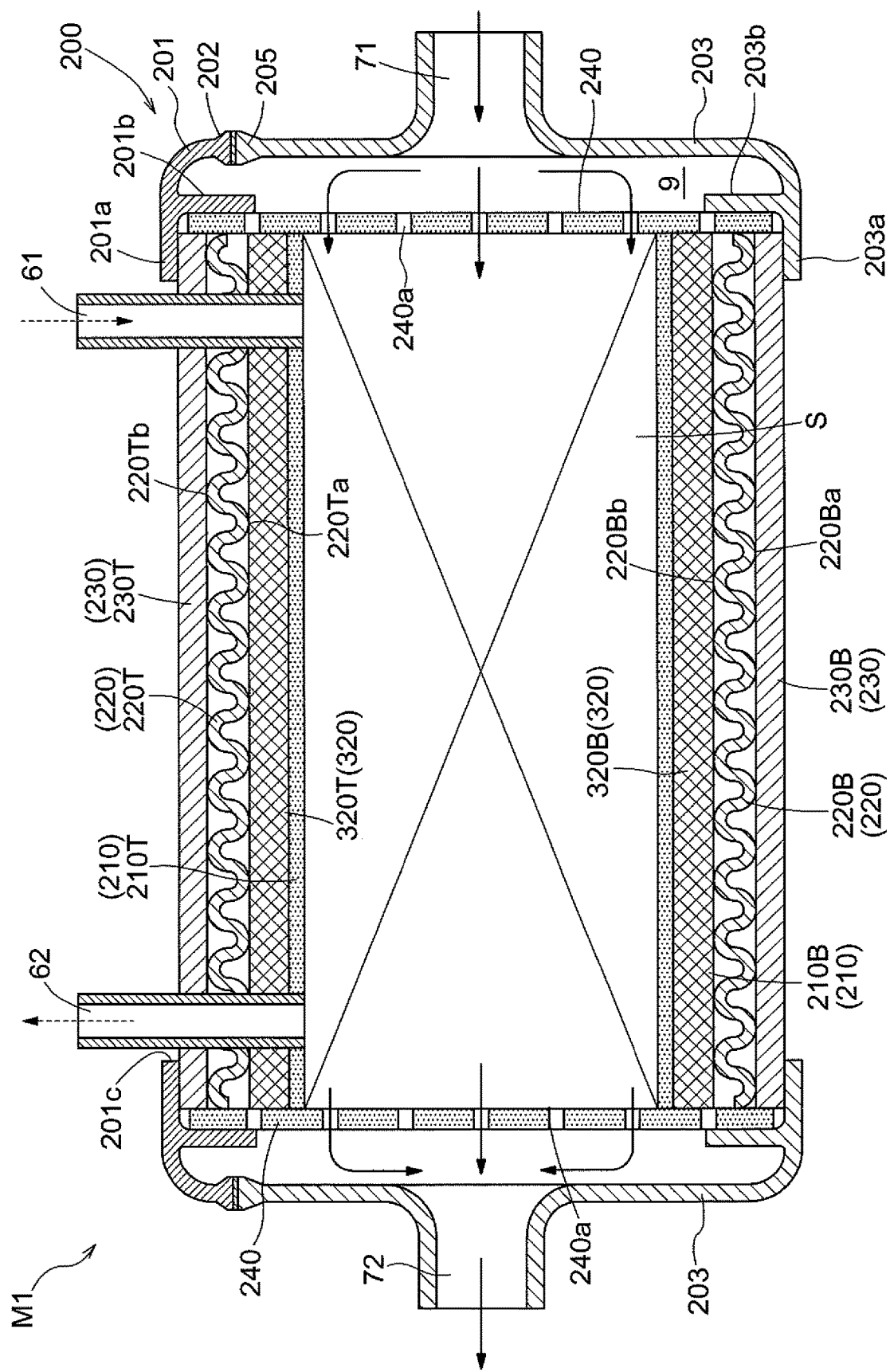
FIG. 5 is a cross-sectional view of an electrochemical module according to another embodiment 1.

As shown in FIG. 5, the electrochemical module M1 includes, on the upside of the electrochemical element stack S, the upper insulator 210T, an upper plate-like member 320T, the upper plate-like member 220T, and the upper plate 230T, which are arranged in the stated order from the electrochemical element stack S side toward the outside. Similarly, the electrochemical module M1 includes, on the underside of the electrochemical element stack S, the lower insulator 210B, a lower plate-like member 320B, the lower plate-like member 220B, and the lower plate 230B, which are arranged in the stated order from the electrochemical element stack S side toward the outside.

In FIG. 5, the plate-like members 320 (upper plate-like member 320T and lower plate-like member 320B) are plate-like members having, for example, a metal honeycomb shape. On the other hand, the plate-like members 220 (upper plate-like member 220T and lower plate-like member 220B) are plate-like members having, for example, a wavelike shape. The functions and effects of the electrochemical module M1 provided with the plate-like members 320 and the plate-like members 220 are the same as those of the electrochemical module M shown in FIG. 1. The other configurations of the electrochemical module M1 are the same as those of the electrochemical module M shown in FIG. 1, and the descriptions thereof are omitted.

It should be noted that the electrochemical module M1 shown in FIG. 5 may have a configuration in which the plate-like members 320 are plate-like members having a wavelike shape, and the plate-like members 220 are plate-like members having a metal honeycomb shape.

(6-2) Another Embodiment 2

An electrochemical module M2 according to another embodiment 2 will be described with reference to FIG. 6. The electrochemical module M2 according to another embodiment 2 is mainly different from the electrochemical module M1 shown in FIG. 5 in that the container 200 is provided with atop face portion 201d and a bottom face portion 203d, and the upper plate 230T and the lower plate 230B are omitted.

Figure 7:
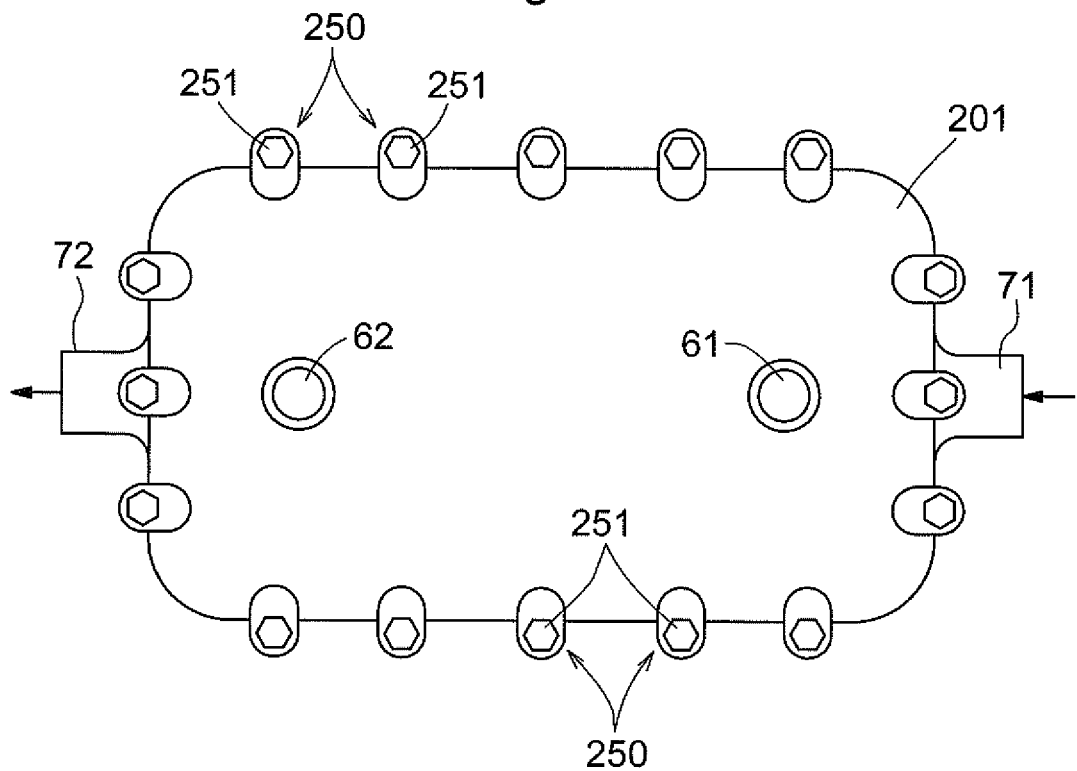
FIG. 7 is a top view of the electrochemical module shown in FIG. 6.
Figure 8:
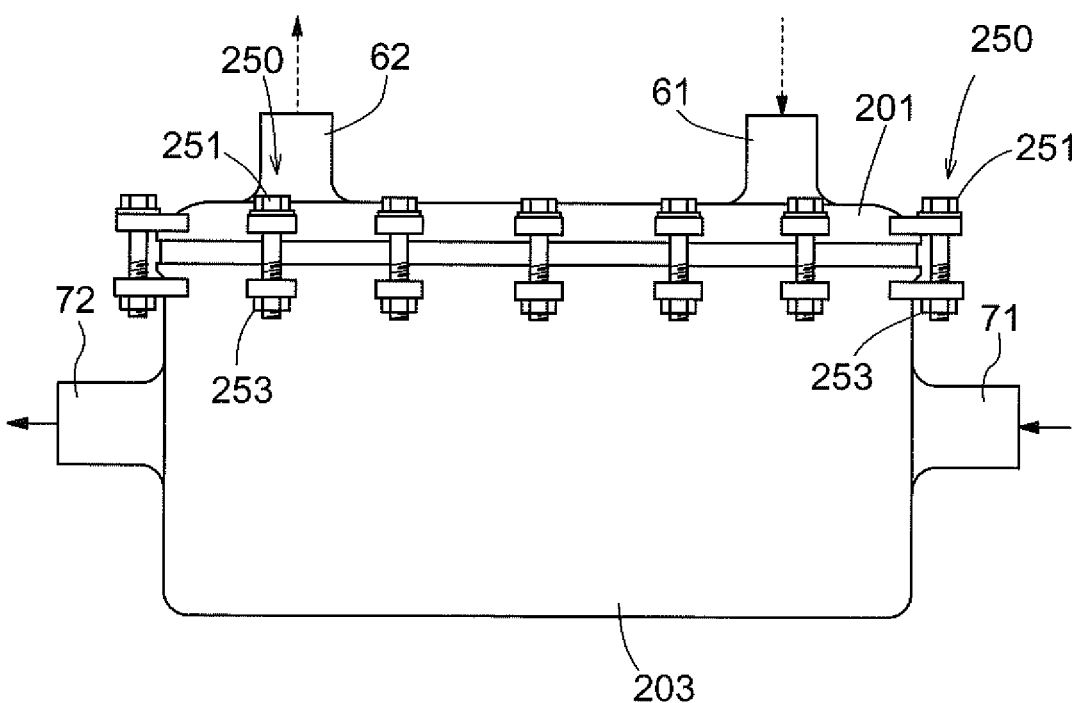
FIG. 8 is a side view of the electrochemical module shown in FIG. 6.

Furthermore, the electrochemical module M2 is different from the electrochemical module M1 shown in FIG. 5 in that the lower cover 203 and the upper cover 201 are linked to each other using bolts as shown in FIGS. 7 and 8. Specifically, the edge portion of the lower cover 203 and the edge portion of the upper cover 201 are opposed to each other, and a plurality of fastening members 250 are fastened to the edge portions at a plurality of positions. Each of the fastening members 250 includes a bolt 251 including a head portion and a shaft portion, and a nut 253. The shaft portion of the bolt 251 is inserted through holes provided in the edge portion of the lower cover 203 and the edge portion of the upper cover 201, and the nut 253 is fastened to the bolt 251. Thus, the edge portion of the lower cover 203 and the upper cover 201 are linked to each other.

However, the lower cover 203 and the upper cover 201 may also be linked to each other through welding in the same manner as shown in FIG. 5.

Figure 6:
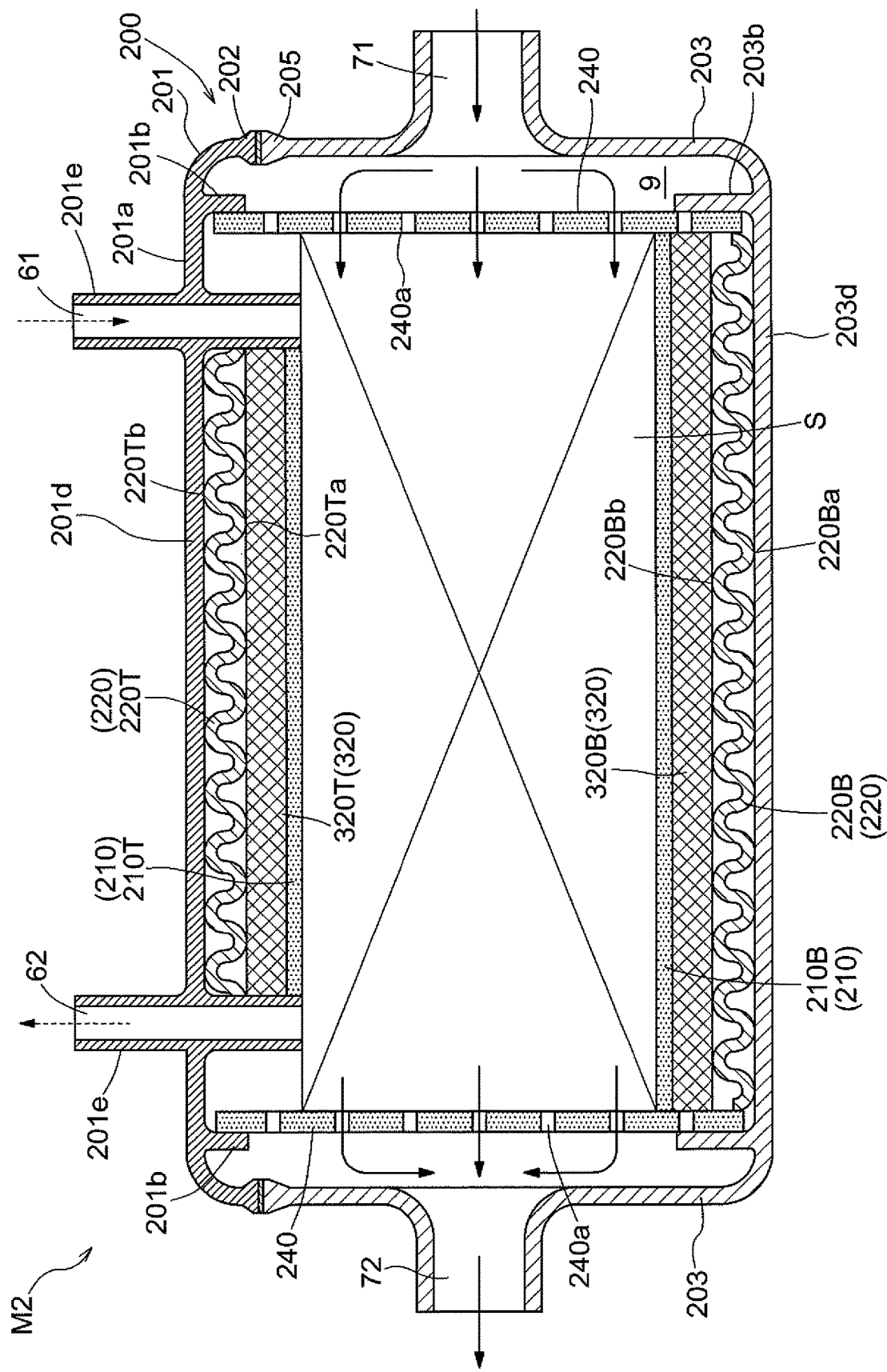
FIG. 6 is a cross-sectional view of an electrochemical module according to another embodiment 2.

The following is a further description of FIG. 6. The upper cover 201 includes the top face portion 201d extending in the plane direction of the electrochemical element stack S. Similar to the upper cover 201 shown in FIG. 5, the upper cover 201 includes the first end portions 201a and the second end portions 201b. The top face portion 201d continuously extends from the ends on the inner sides of the first end portions 201a. As shown in FIGS. 6 to 8, tubular portions 201e that respectively form the first gas supply portion 61 and the first gas discharge portion 62 are provided at predetermined positions between the first end portions 201a and the top face portion 201d. The other configurations of the upper cover 201 shown in FIG. 6 are the same as those of the upper cover 201 shown in FIG. 5.

On the other hand, the lower cover 203 includes the bottom face portion 203d extending in the plane direction of the electrochemical element stack S. The other configurations of the lower cover 203 shown in FIG. 8 are the same as those of the lower cover 203 shown in FIG. 7.

The electrochemical module M2 includes, on the upside of the electrochemical element stack S, the upper insulator 210T, the upper plate-like member 320T having, for example, a metal honeycomb shape, and the upper plate-like member 220T having, for example, a wavelike shape, which are arranged in the stated order from the electrochemical element stack S side toward the outside. In this case, the upper insulator 210T, the upper plate-like member 320T, and the upper plate-like member 220T are not arranged in a space surrounded by the tubular portions 201e, the first end portions 201a, and the top face portion 201d.

The electrochemical module M2 also includes, on the underside of the electrochemical element stack S, the lower insulator 210B, the lower plate-like member 320B having, for example, a metal honeycomb shape, and the lower plate-like member 220B having, for example, a wavelike shape, which are arranged in the stated order from the electrochemical element stack S side toward the outside.

The top face portion 201d of the upper cover 201 is opposed to the top flat face of the electrochemical element stack S, and the bottom face portion 203d of the lower cover 203 is opposed to the bottom flat face of the electrochemical element stack S. By linking the upper cover 201 and the lower cover 203 to each other, clamping pressure is substantially uniformly applied to the electrochemical element stack S along the flat faces thereof from the top face portion 201d and the bottom face portion 203d via the plate-like members 220 and 320.

It should be noted that a configuration may also be employed in which at least one of the upper and lower plate-like members 320 and the upper and lower plate-like members 220 is provided. A configuration may also be employed in which the upper insulator 210T, the upper plate-like member 320T, and the upper plate-like member 220T are also arranged in a space surrounded by the tubular portions 201e, the first end portions 201a, and the top face portion 201d.

(7) Specific Configuration of Electrochemical Element Stack S

Next, the specific configuration of the electrochemical element stack S will be described. The electrochemical element stack S is formed by stacking a plurality of electrochemical elements A.

The electrochemical element A will be described with reference to FIGS. 9 to 18.

Electrochemical Element

As shown in FIGS. 9 to 17, the electrochemical element A includes the plate-like support 10 provided with the internal passage A1 formed between the faces of the conductive first plate-like body 1 and the conductive second plate-like body 2 that are opposed to each other, wherein the plate-like support 10 includes the gas-permeable portion 1A through which gas is permeable between the internal passage A1, which is located inside the plate-like support 10, and the outside at one or more portions of the first plate-like body 1 and the second plate-like body 2 included in the plate-like support 10, and the electrochemical reaction portion 3 that entirely or partially covers the gas-permeable portion 1A and includes the film-like electrode layer 31, the film-like electrolyte layer 32 and the film-like counter electrode layer 33 in the stated order (see FIGS. 13 to 17). Moreover, the first penetrated portion 41 forming the supply passage 4 for supplying first gas that is one of reducing component gas such as fuel gas and oxidative component gas such as air from the outside in the surface penetration direction to the internal passage A1 is provided at one end portion of the plate-like support 10, and the second penetrated portion 51 forming the discharge passage 5 for discharging the first gas flowing in the internal passage A1 to the outside in the surface penetration direction of the plate-like support is provided at the other end portion of the plate-like support 10 (see FIGS. 9, 11, 16, and 17; it is understood that the supply passage 4 and the like and the discharge passage 5 and the like are symmetrical to each other and have a similar structure).

Plate-Like Support

The first plate-like body 1 serves to maintain the strength of the electrochemical element A by supporting the electrochemical reaction portion 3 including the electrode layer 31, the electrolyte layer 32, and the counter electrode layer 33. A material that has excellent electron conductivity, thermal resistance, oxidation resistance, and corrosion resistance is used as the material of the first plate-like body 1. Examples thereof include ferrite-based stainless steel, austenite-based stainless steel, and a nickel-based alloy. In particular, an alloy containing chromium is favorably used. In this embodiment, the first plate-like body 1 is made of a Fe—Cr based alloy that contains Cr in an amount of 18 mass % or more and 25 mass % or less, but a Fe—Cr based alloy that contains Mn in an amount of 0.05 mass % or more, a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, a Fe—Cr based alloy that contains Ti and Zr, a total content of Ti and Zr being 0.15 mass % or more and 1.0 mass % or less, and a Fe—Cr based alloy that contains Cu in an amount of 0.10 mass % or more and 1.0 mass % or less are particularly favorable.

The plate-like support 10 is formed by welding and integrating peripheral portions 1a of the second plate-like body 2 and the first plate-like body 1 in a state in which the second plate-like body 2 and the first plate-like body 1 are stacked (see FIGS. 10 to 17). The second plate-like body 2 may be divided into a plurality of portions with respect to the first plate-like body 1. On the contrary, the first plate-like body 1 may be divided into a plurality of portions with respect to the second plate-like body 2. Another means such as bonding or fitting can be employed as the integrating means instead of welding. Portions other than the peripheral portions 1a may be integrated as long as the internal passage can be formed separate from the outside.

The first plate-like body 1 includes the gas-permeable portion 1A obtained by forming a large number of through holes 11 that penetrate the surface on the front side and the surface on the back side (see FIGS. 13 to 17). It should be noted that the through holes 11 can be formed in the first plate-like body 1 by, for example, laser processing or the like. The through holes 11 have a function of transmitting gas from the surface on the back side of the first plate-like member 1 to the surface on the front side thereof. It is preferable that the gas-permeable portion 1A is provided in a region of the first plate-like body 1 that is smaller than the region in which the electrode layer 31 is provided.

A metal oxide layer 12 (which will be described later: see FIG. 18) serving as a diffusion suppressing layer is provided on the surface of the first plate-like body 1. That is, the diffusion suppressing layer is formed between the first plate-like body 1 and the electrode layer 31, which will be described later. The metal oxide layer 12 is provided not only on the surface of the first plate-like body 1 exposed to the outside but also the surface (interface) that is in contact with the electrode layer 31. The metal oxide layer 12 can also be provided on the inner faces of the through holes 11. Element interdiffusion that occurs between the first plate-like body 1 and the electrode layer 31 can be suppressed due to this metal oxide layer 12. For example, when ferrite-based stainless steel containing chromium is used in the first plate-like body 1, the metal oxide layer 12 is mainly made of a chromium oxide. The metal oxide layer 12 containing the chromium oxide as the main component suppresses diffusion of chromium atoms and the like of the first plate-like body 1 to the electrode layer 31 and the electrolyte layer 32. The metal oxide layer 12 need only have such a thickness that allows both high diffusion preventing performance and low electric resistance to be achieved.

The metal oxide layer 12 can be formed using various techniques, but it is favorable to use a technique of oxidizing the surface of the first plate-like body 1 to obtain a metal oxide. Also, the metal oxide layer 12 may be formed on the surface of the first plate-like body 1 by using a spray coating technique (a technique such as thermal spraying technique, an aerosol deposition technique, an aerosol gas deposition technique, a powder jet deposition technique, a particle jet deposition technique, or a cold spraying technique), a PVD technique such as a sputtering technique or PLD technique, or a CVD technique, or may be formed by plating and oxidation treatment. Furthermore, the metal oxide layer 12 may also contain a spinel phase that has high electrical conductivity, or the like.

When a ferrite-based stainless steel material is used to form the first plate-like body 1, its thermal expansion coefficient is close to that of YSZ (yttria-stabilized zirconia), GDC (gadolinium-doped ceria; also called CGO), or the like, which is used as the material of the electrode layer 31 and the electrolyte layer 32. Accordingly, even if low and high temperature cycling is repeated, the electrochemical element A is not likely to be damaged. Therefore, this is preferable due to being able to realize an electrochemical element A that has excellent long-term durability. It should be noted that the first plate-like body 1 is provided with a plurality of through holes 11 that penetrate the surface on the front side and the surface on the back side. It should be noted that the through holes 11 can be provided in the first plate-like body 1 through, for example, mechanical, chemical, or optical piercing processing. The through holes 11 have a function of transmitting gas from the surface on the back side of the first plate-like body 1 to the surface on the front side thereof. Porous metal can also be used to impart gas permeability to the first plate-like body 1. For example, a metal sintered body, a metal foam, or the like can also be used as the first plate-like body 1.

Figure 9:
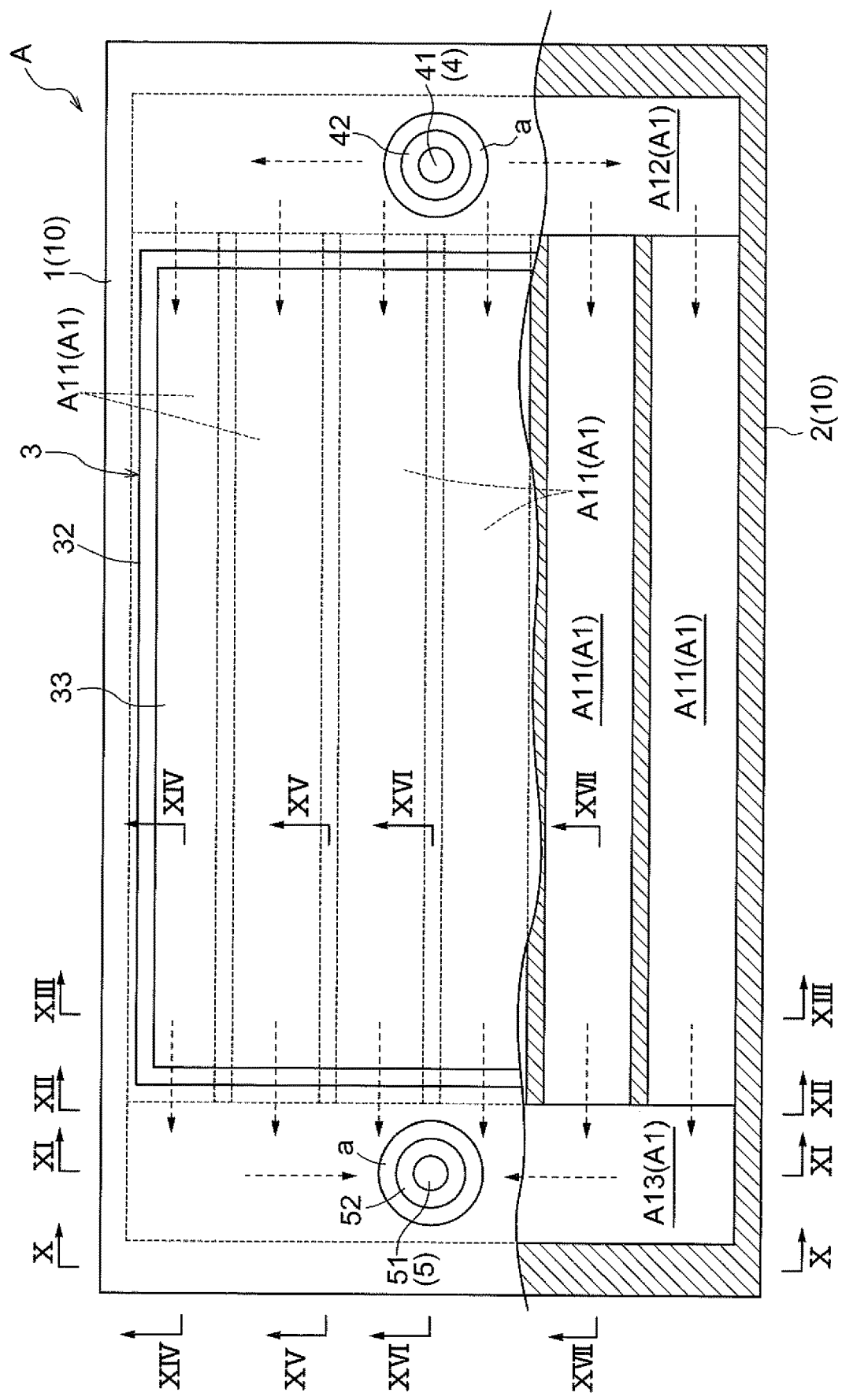
FIG. 9 is a schematic view of an electrochemical element.
Figure 10:
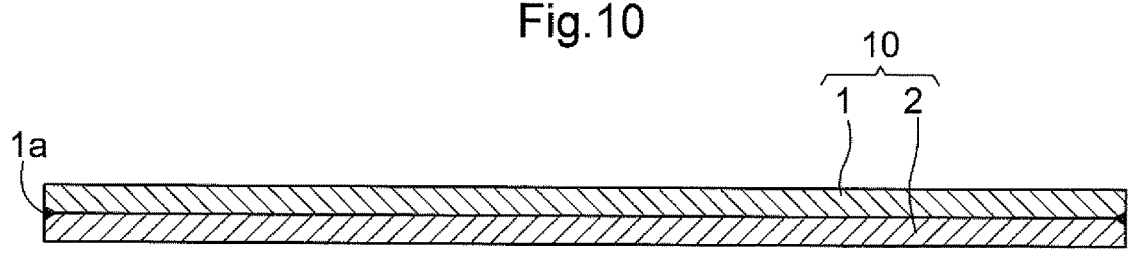
FIG. 10 is a cross-sectional view taken along line X-X in FIG. 9.
Figure 13:
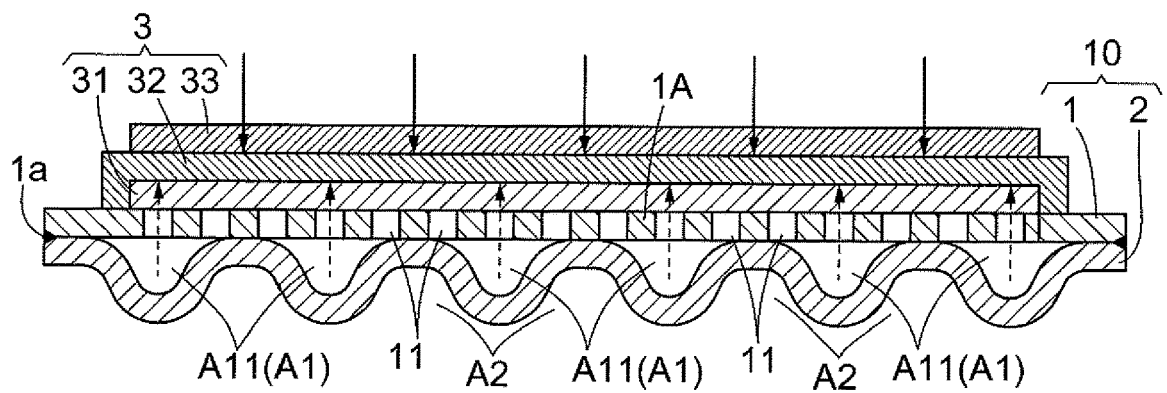
FIG. 13 is a cross-sectional view taken along line XIII-XIII in FIG. 9.
Figure 14:
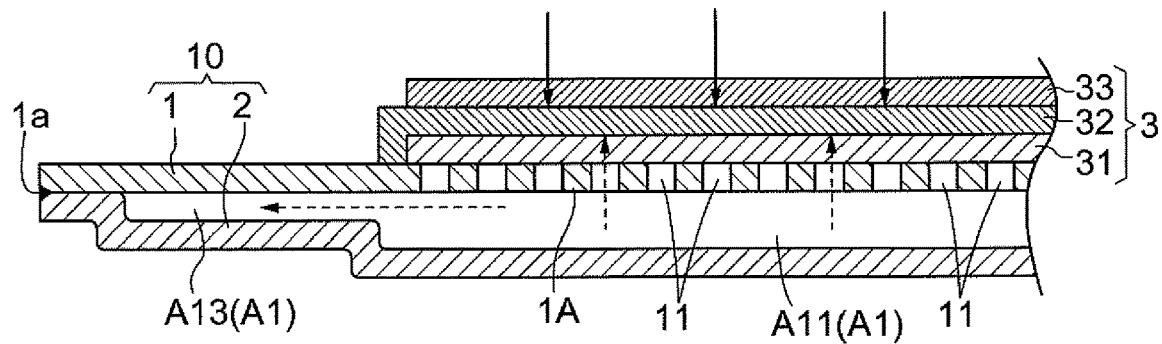
FIG. 14 is a cross-sectional view taken along line XIV-XIV in FIG. 9.

The second plate-like body 2 is formed in a wavelike shape such that the internal passage A1 including a plurality of auxiliary passages A11 leading from one end side to the other end side is formed in the region opposed to the gas-permeable portion 1A of the first plate-like body 1 (see FIGS. 9 and 13). Both faces on the front side and the back side of the second plate-like body 2 are formed in a wavelike shape. A face on a side opposite to the face that delimits and forms the internal passage A1 is electrically connected to the electrochemical reaction portion 3 of the adjacent electrochemical element A, and passages formed near the portions of the wavelike second plate-like body 2 that are in contact with the first plate-like body 1 function as the flowing portion A2. The plurality of auxiliary passages A11 are provided extending in parallel along the long side of the rectangular plate-like support 10, and form the internal passage A1 extending from the supply passage 4 provided at one end portion to the discharge passage 5 provided at the other end portion. A connection portion where the first penetrated portion 41 and the internal passage A1 are connected to each other is provided with the distribution portion A12 that is formed by bulging the second plate-like body 2 downward from the portion thereof in contact with the first plate-like body 1 and distributes first gas supplied from the first penetrated portion 41 to the auxiliary passages A11 (see FIG. 9), and a connection portion where the second penetrated portion 51 and the internal passage A1 are connected to each other is provided with the confluence portion A13 that is formed by bulging the second plate-like body 2 downward from the portion thereof in contact with the first plate-like body 1, and collects the first gas flowing in the auxiliary passages A11 and introduces it into the second penetrated portion 51 (see FIGS. 9, 11, 12, and 14 to 17; it is understood that the supply passage 4 and the like and the discharge passage 5 and the like are symmetrical to each other and have a similar structure). The material of the second plate-like body 2 is preferably a heat resistant metal, and more preferably the same material as that of the first plate-like body 1 from the viewpoint of reducing a difference in thermal expansion between the second plate-like body 2 and the first plate-like body 1 and ensuring the reliability of the joining state due to welding or the like.

Electrochemical Reaction Portion
Electrode Layer

As shown in FIGS. 13 to 18, the electrode layer 31 can be provided as a thin layer in a region that is larger than the region provided with the through holes 11, on the front face of the first plate-like body 1. When it is provided as a thin layer, the thickness can be set to, for example, approximately 1 μm to 100 μm, and preferably 5 μm to 50 μm. This thickness makes it possible to ensure sufficient electrode performance while also achieving cost reduction by reducing the used amount of expensive electrode layer material. The region provided with the through holes 11 is entirely covered by the electrode layer 31. That is, the through holes 11 are formed inside the region of the first plate-like body 1 in which the electrode layer 31 is formed. In other words, all the through holes 11 are provided facing the electrode layer 31.

The inside and the surface of the electrode layer 31 are provided with a plurality of pores in order to impart gas permeability to the electrode layer 31.

That is, the electrode layer 31 is formed as a porous layer. The electrode layer 31 is formed, for example, to have a denseness of 30% or more and less than 80%. Regarding the size of the pores, a size suitable for smooth progress of an electrochemical reaction can be selected as appropriate. It should be noted that the "denseness" is a ratio of the material of the layer to the space and can be represented by a formula "1−porosity", and is equivalent to relative density.

For example, a composite material such as NiO-GDC, Ni-GDC, NiO—YSZ, Ni—YSZ, CuO—$CeO_2$, or Cu—$CeO_2$ can be used as the material of the electrode layer 31. In these examples, GDC, YSZ, and $CeO_2$ can be called the aggregate of the composite material. It should be noted that it is preferable to form the electrode layer 31 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these processes that can be used in a low temperature range, a favorable electrode layer 31 is obtained, for example, without using calcining in a high temperature range of higher than 1100° C. Therefore, this is preferable due to being able to prevent damage to the first plate-like body 1, suppress element interdiffusion between the first plate-like body 1 and the electrode layer 31, and realize an electrochemical element A that has excellent durability. Furthermore, using low-temperature calcining makes it possible to facilitate handling of raw materials and is thus more preferable.

Intermediate Layer

An intermediate layer 34 can be formed as a thin layer on the electrode layer 31 so as to cover the electrode layer 31. When it is formed as a thin layer, the thickness can be set to, for example, approximately 1 μm to 100 μm, preferably approximately 2 μm to 50 μm, and more preferably approximately 4 μm to 25 μm. This thickness makes it possible to ensure sufficient performance while also achieving cost reduction by reducing the used amount of expensive material of the intermediate layer 34. YSZ (yttria-stabilized zirconia), SSZ (scandia-stabilized zirconia), GDC (gadolinium-doped ceria), YDC (yttrium-doped ceria), SDC (samarium-doped ceria), or the like can be used as the material of the intermediate layer 34. In particular, ceria-based ceramics are favorably used.

It is preferable to form the intermediate layer 34 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an intermediate layer 34 is obtained, for example, without using calcining in a high temperature range of higher than 1100° C. Therefore, it is possible to prevent damage to the first plate-like body 1, suppress element interdiffusion between the first plate-like body 1 and the electrode layer 31, and realize an electrochemical element A that has excellent durability. Furthermore, using low-temperature calcining makes it possible to facilitate handling of raw materials and is thus more preferable.

It is preferable that the intermediate layer 34 has oxygen ion (oxide ion) conductivity. It is more preferable that the intermediate layer 34 has both oxygen ion (oxide ion) conductivity and electron conductivity, namely mixed conductivity. The intermediate layer 34 that has these properties is suitable for application to the electrochemical element A.

Electrolyte Layer

As shown in FIGS. 13 to 18, the electrolyte layer 32 is formed as a thin layer on the intermediate layer 34 so as to cover the electrode layer 31 and the intermediate layer 34. The electrolyte layer 32 can also be formed as a thin layer having a thickness of 10 μm or less. Specifically, the electrolyte layer 32 is provided on both the intermediate layer 34 and the first plate-like body 1 (spanning the intermediate layer 34 and the first plate-like body 1). Configuring the electrolyte layer 32 in this manner and joining the electrolyte layer 32 to the first plate-like body 1 make it possible to allow the electrochemical element to have excellent toughness as a whole.

Also, as shown in FIG. 13, the electrolyte layer 32 is provided in a region that is larger than the region provided with the through holes 11, on the front face of the first plate-like body 1. That is, the through holes 11 are formed inside the region of the first plate-like body 1 in which the electrolyte layer 32 is formed.

The leakage of gas from the electrode layer 31 and the above-mentioned intermediate layer (not shown) can be suppressed in the vicinity of the electrolyte layer 32. A description of this will be given. When the electrochemical element A is used as a constituent element of a SOFC, gas is supplied from the back side of the first plate-like body 1 through the through holes 11 to the electrode layer 31 during the operation of the SOFC. In a region where the electrolyte layer 32 is in contact with the first plate-like body 1, leakage of gas can be suppressed without providing another member such as a gasket. It should be noted that although the entire vicinity of the electrode layer 31 is covered by the electrolyte layer 32 in this embodiment, a configuration in which the electrolyte layer 32 is provided on the electrode layer 31 and the above-mentioned intermediate layer 34 and a gasket or the like is provided in its vicinity may also be adopted.

Electrolyte materials having oxygen ion conductivity such as YSZ (yttria-stabilized zirconia), SSZ (scandia-stabilized zirconia), GDC (gadolinium-doped ceria), YDC (yttrium-doped ceria), SDC (samarium-doped ceria), LSGM (strontium- and magnesium-doped lanthanum gallate), and the like, and electrolyte materials having hydrogen ion conductivity such as perovskite oxides can be used as the material of the electrolyte layer 32. In particular, zirconia-based ceramics are favorably used. Using zirconia-based ceramics for the electrolyte layer 32 makes it possible to increase the operation temperature of the SOFC in which the electrochemical element A is used compared with the case where ceria-based ceramics and various materials having hydrogen ion conductivity are used. For example, when the electrochemical element A is used in the SOFC, by adopting a system configuration in which a material such as YSZ that can exhibit high electrolyte performance even in a high temperature range of approximately 650° C. or higher is used as the material of the electrolyte layer 32, a hydrocarbon-based raw fuel material such as city gas or LPG is used as the raw fuel for the system, and the raw fuel material is reformed into anode gas of the SOFC through steam reforming or the like, it is thus possible to construct a high-efficiency SOFC system in which heat generated in a cell stack of the SOFC is used to reform raw fuel gas.

It is preferable to form the electrolyte layer 32 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD (chemical vapor deposition) technique, or the like. Due to these film formation processes that can be used in a low temperature range, an electrolyte layer 32 that is dense and has high gas-tightness and gas barrier properties is obtained, for example, without using calcining in a high temperature range of higher than 1100° C. Therefore, it is possible to prevent damage to the first plate-like body 1, suppress element interdiffusion between the first plate-like body 1 and the electrode layer 31, and realize an electrochemical element A that has excellent performance and durability. In particular, using low-temperature calcining, a spray coating technique, or the like makes it possible to realize a low-cost element and is thus preferable. Furthermore, using a spray coating technique makes it easy to obtain, in a low temperature range, an electrolyte layer that is dense and has high gas-tightness and gas barrier properties, and is thus more preferable.

The electrolyte layer 32 is given a dense configuration in order to block gas leakage of anode gas and cathode gas and exhibit high ion conductivity. The electrolyte layer 32 preferably has a denseness of 90% or more, more preferably 95% or more, and even more preferably 98% or more. When the electrolyte layer 32 is formed as a uniform layer, the denseness is preferably 95% or more, and more preferably 98% or more. When the electrolyte layer 32 has a multilayer configuration, at least a portion thereof preferably includes a layer (dense electrolyte layer) having a denseness of 98% or more, and more preferably a layer (dense electrolyte layer) having a denseness of 99% or more. The reason for this is that an electrolyte layer that is dense and has high gas-tightness and gas barrier properties can be easily formed due to such a dense electrolyte layer being included as a portion of the electrolyte layer even when the electrolyte layer has a multilayer configuration.

Reaction Preventing Layer

A reaction preventing layer 35 can be formed as a thin layer on the electrolyte layer 32. When it is formed as a thin layer, the thickness can be set to, for example, approximately 1 μm to 100 μm, preferably approximately 2 μm to 50 μm, and more preferably approximately 3 μm to 15 μm. This thickness makes it possible to ensure sufficient performance while also achieving cost reduction by reducing the used amount of expensive reaction preventing layer material. The material of the reaction preventing layer need only be capable of preventing reactions between the component of the electrolyte layer 32 and the component of the counter electrode layer 33. For example, a ceria-based material or the like is used. Materials that contain at least one element selected from the group consisting of Sm, Gd, and Y are favorably used as the material of the reaction preventing layer 35. It is preferable that at least one element selected from the group consisting of Sm, Gd, and Y is contained, and the total content of these elements is 1.0 mass % or more and 10 mass % or less. Introducing the reaction preventing layer 35 between the electrolyte layer 32 and the counter electrode layer 33 effectively suppresses reactions between the material constituting the counter electrode layer 33 and the material constituting the electrolyte layer 32 and makes it possible to improve long-term stability in the performance of the electrochemical element A. Forming the reaction preventing layer 35 using, as appropriate, a method through which the reaction preventing layer 35 can be formed at a treatment temperature of 1100° C. or lower makes it possible to suppress damage to the first plate-like body 1, suppress element interdiffusion between the first plate-like body 1 and the electrode layer 31, and realize an electrochemical element A that has excellent performance and durability, and is thus preferable. For example, the reaction preventing layer 35 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

Counter Electrode Layer

As shown in FIGS. 13 to 18, the counter electrode layer 33 can be formed as a thin layer on the electrolyte layer 32 or the reaction preventing layer 35. When it is formed as a thin layer, the thickness can be set to, for example, approximately 1 μm to 100 μm, and preferably approximately 5 μm to 50 μm. This thickness makes it possible to ensure sufficient electrode performance while also achieving cost reduction by reducing the used amount of expensive counter electrode layer material. For example, a complex oxide such as LSCF or LSM, or a ceria-based oxide, or a mixture thereof can be used as the material of the counter electrode layer 33, for example. In particular, it is preferable that the counter electrode layer 33 includes a perovskite oxide containing two or more elements selected from the group consisting of La, Sr, Sm, Mn, Co, and Fe. The counter electrode layer 33 constituted by the above-mentioned material functions as a cathode.

It should be noted that forming the counter electrode layer 33 using, as appropriate, a method through which the counter electrode layer 33 can be formed at a treatment temperature of 1100° C. or lower makes it possible to suppress damage to the first plate-like body 1, suppress element interdiffusion between the first plate-like body 1 and the electrode layer 31, and realize an electrochemical element A that has excellent performance and durability, and is thus preferable. For example, the counter electrode layer 33 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

By configuring the electrochemical reaction portion 3 as described above, the electrochemical element A can be used as a power generating cell for a solid oxide fuel cell when the electrochemical reaction portion 3 is allowed to function as a fuel cell (electrochemical power generating cell). For example, fuel gas containing hydrogen serving as first gas is supplied from the back face of the first plate-like body 1 through the through holes 11 to the electrode layer 31, air serving as second gas is supplied to the counter electrode layer 33 serving as a counter electrode of the electrode layer 31, and the temperature is maintained at the operation temperature of, for example, approximately 700° C. Accordingly, the oxygen $O_2$ included in air reacts with electrons $e^-$ in the counter electrode layer 33, thus producing oxygen ions $O^{2-}$. The oxygen ions $O^{2-}$ move through the electrolyte layer 32 to the electrode layer 31. In the electrode layer 31, the hydrogen $H_2$ included in the supplied fuel gas reacts with the oxygen ions $O^{2-}$, thus producing water $H_2O$ and electrons $e^-$.

When the electrolyte layer 32 is made of an electrolyte material having hydrogen ion conductivity, hydrogen $H_2$ included in the fuel gas flowing in the electrode layer 31 releases electrons $e^-$, thus producing hydrogen ions $H^+$. The hydrogen ions $H^+$ move to the counter electrode layer 33 through the electrolyte layer 32. In the counter electrode layer 33, oxygen $O_2$ included in air, hydrogen ions $H^+$, and electrons $e^-$ react with each other to produce water $H_2O$.

With these reactions, electromotive force as electrochemical output is generated between the electrode layer 31 and the counter electrode layer 33. In this case, the electrode layer 31 functions as a fuel electrode (anode) of the fuel cell, and the counter electrode layer 33 functions as an air electrode (cathode).

Although omitted in FIGS. 13 to 17, the intermediate layer 34 is provided between the electrode layer 31 and the electrolyte layer 32 of the electrochemical reaction portion 3 of this embodiment as shown in FIG. 18. Furthermore, the reaction preventing layer 35 is provided between the electrolyte layer 32 and the counter electrode layer 33.

Method for Manufacturing Electrochemical Reaction Portion Next, a method for manufacturing the electrochemical reaction portion 3 will be described. It should be noted that the description will be given mainly with reference to FIG. 18 since the intermediate layer 34 and the reaction preventing layer 35 are omitted in the FIGS. 13 to 17.

Electrode Layer Forming Step

In an electrode layer forming step, the electrode layer 31 is formed as a thin film in a region that is broader than the region provided with the through holes 11, on the front face of the first plate-like body 1. The through holes 11 of the first plate-like body 1 can be provided through laser processing or the like. As described above, the electrode layer 31 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1.

The following is a specific example of the case where low-temperature calcining is performed as the electrode layer forming step. First, a material paste is produced by mixing powder of the material of the electrode layer 31 and a solvent (dispersion medium), and is applied to the front face of the first plate-like body 1. Then, calcining is performed at a temperature of 800° C. to 1100° C.

Diffusion Suppressing Layer Forming Step

The metal oxide layer 12 (diffusion suppressing layer) is formed on the surface of the first plate-like body 1 during the calcining step in the above-described electrode layer forming step. It should be noted that it is preferable that the above-mentioned calcining step includes a calcining step in which the calcining atmosphere satisfies the atmospheric condition that the oxygen partial pressure is low because a high-quality metal oxide layer 12 (diffusion suppressing layer) that has a high element interdiffusion suppressing effect and has a low resistance value is formed. In a case where a coating method that does not include calcining is performed as the electrode layer forming step, for example, a separate diffusion suppressing layer forming step may also be included. In any case, it is desirable to perform these steps at a temperature of 1100° C. or lower such that damage to the first plate-like body 1 can be suppressed.

Intermediate Layer Forming Step

In an intermediate layer forming step, the intermediate layer 34 is formed as a thin layer on the electrode layer 31 so as to cover the electrode layer 31. As described above, the intermediate layer 34 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1.

The following is a specific example of the case where low-temperature calcining is performed as the intermediate layer forming step.

First, a material paste is produced by mixing powder of the material of the intermediate layer 34 and a solvent (dispersion medium), and is applied to the front face of the first plate-like body 1. Then, the intermediate layer 34 is obtained through compression molding (intermediate layer smoothing step) and calcining at a temperature of 1100° C. or lower (intermediate layer calcining step). Examples of rolling of the intermediate layer 34 include CIP (Cold Isostatic Pressing) molding, roll pressing molding, and RIP (Rubber Isostatic Pressing) molding. It is favorable to perform calcining of the intermediate layer 34 at a temperature of 800° C. or higher and 1100° C. or lower. The reason for this is that this temperature makes it possible to form an intermediate layer 34 that has high strength while suppressing damage to and deterioration of the first plate-like body 1. It is more preferable to perform calcining of the intermediate layer 34 at a temperature of 1050° C. or lower, and more preferably 1000° C. or lower. The reason for this is that the lower the calcining temperature of the intermediate layer 34 is, the more likely it is to further suppress damage to and deterioration of the first plate-like body 1 when forming the electrochemical element A. The order in which the intermediate layer smoothing step and the intermediate layer calcining step are performed can be changed.

It should be noted that lapping molding, leveling treatment, surface cutting treatment, surface polishing treatment, or the like can also be performed as the intermediate layer smoothing step.

Electrolyte Layer Forming Step

In an electrolyte layer forming step, the electrolyte layer 32 is formed as a thin layer on the intermediate layer 34 so as to cover the electrode layer 31 and the intermediate layer 34. The electrolyte layer 32 may also be formed as a thin film having a thickness of 10 μm or less. As described above, the electrolyte layer 32 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1.

It is desirable to perform a spray coating technique as the electrolyte layer forming step in order to form a high-quality electrolyte layer 32 that is dense and has high gas-tightness and gas barrier properties in a temperature range of 1100° C. or lower. In this case, the material of the electrolyte layer 32 is sprayed onto the intermediate layer 34 on the first plate-like body 1, and the electrolyte layer 32 is thus formed.

Reaction Preventing Layer Forming Step

In a reaction preventing layer forming step, the reaction preventing layer 35 is formed as a thin layer on the electrolyte layer 32. As described above, the reaction preventing layer 35 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1. It should be noted that, for example, leveling treatment, surface cutting treatment, or surface polishing treatment may be performed after the formation of the reaction preventing layer 35, or pressing processing may be performed after wet formation and before calcining, in order to flatten the top face of the reaction preventing layer 35.

Counter Electrode Layer Forming Step

In a counter electrode layer forming step, the counter electrode layer 33 is formed as a thin layer on the reaction preventing layer 35. As described above, the counter electrode layer 33 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1.

In this manner, the electrochemical reaction portion 3 can be manufactured.

It should be noted that a configuration in which the electrochemical reaction portion 3 does not include both or either of the intermediate layer 34 and the reaction preventing layer 35 is also possible. That is, a configuration in which the electrode layer 31 and the electrolyte layer 32 are in contact with each other, or a configuration in which the electrolyte layer 32 and the counter electrode layer 33 are in contact with each other is also possible. In this case, in the above-described manufacturing method, the intermediate layer forming step and the reaction preventing layer forming step are omitted. It should be noted that it is also possible to add a step of forming another layer or to form a plurality of layers of the same type one on top of another, but in any case, it is desirable to perform these steps at a temperature of 1100° C. or lower.

Electrochemical Element Stack

As shown in FIG. 4, the electrochemical element stack S includes a plurality of electrochemical elements A, and the electrochemical elements A are stacked and arranged such that the plate-like support 10 included in one of the adjacent electrochemical elements A is opposed to the plate-like support 10 included in the other, the outer face of the second plate-like body 2, which is different from the first plate-like body 1 on which the electrochemical reaction portion 3 is arranged, in the plate-like support 10 included in one of the adjacent electrochemical elements A is electrically connected to the outer face of the first plate-like body 1 in the plate-like support 10 included in the other, and the flowing portion A2 through which the second gas flows along the two outer faces is formed between the two outer faces. As a method for electrically connecting the two outer faces, a method for simply bringing electroconductive surfaces into contact with each other, a method for applying contact pressure to the contact faces, a method for reducing contact resistance by providing a highly electroconductive material therebetween, or the like can be employed.

Specifically, the above-mentioned configuration is obtained by lining up the rectangular electrochemical elements in the state in which the first penetrated portions 41 at one end and the second penetrated portions 51 at the other end are respectively aligned and the electrochemical reaction portions of the electrochemical elements face upward, and stacking the electrochemical elements with the first annular sealing portions being provided between the first penetrated portions 41 and the second annular sealing portions being provided between the second penetrated portions 51.

The first penetrated portion 41 forming the supply passage 4 for supplying first gas that is one of reducing component gas and oxidative component gas from the outside in the surface penetration direction to the internal passage A1 is provided at one end in the longitudinal direction of the rectangular plate-like support 10, the first annular sealing portion 42 serving as an annular sealing portion for separating the first penetrated portion 41 that are formed on each of the two outer faces of the plate-like member 10 from the flowing portion A2 is provided in the flowing portion A2, and the supply passage 4 for supplying the first gas to the internal passage A1 is formed by the first penetrated portion 41 and the first annular sealing portion 42 in the plate-like support 10. It should be noted that an annular bulging portion a is provided around a portion of the first plate-like body 1 with which the first annular sealing portion 42 is in contact, on a face of the first plate-like body 1 on a side opposite to the internal passage A1, thus making it easy to position the first annular sealing portion 42 in the direction extending along the face of the first plate-like body 1.

Moreover, the other end side of the plate-like support 10 is provided with the second penetrated portion 51 forming the discharge passage 5 for discharging the first gas flowing in the internal passage A1 to the outside in the surface penetration direction is provided, the second penetrated portion 51 has a configuration in which the first gas flows therein in the state of being separated from the second gas, the second annular sealing portion 52 serving as an annular sealing portion for separating the second penetrated portion 51 that are formed on each of the two outer faces of the plate-like support 10 from the flowing portion A2 is provided in the flowing portion A2, and the discharge passage 5 for discharging the first gas flowing in the internal passage A1 is formed by the second penetrated portion 51 and the second annular sealing portion 52.

The first annular sealing portion 42 and the second annular sealing portion 52 are made of insulation material such as a ceramics material (e.g. alumina), mica, or metal covered by the ceramics material or mica, and function as insulating sealing portions that electrically insulate the adjacent electrical elements from each other.

(8) Energy System, Electrochemical Device

Figure 19:
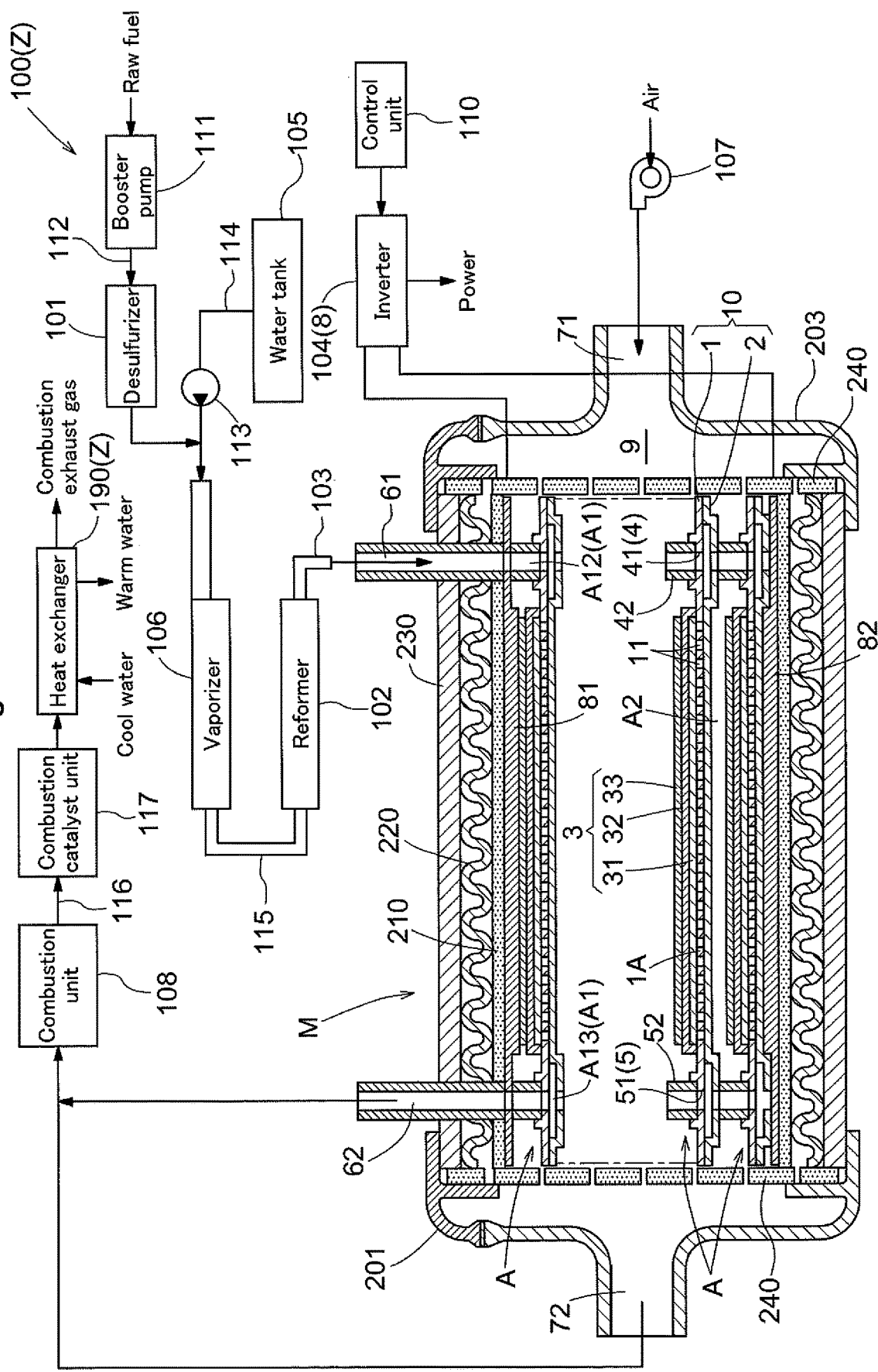
FIG. 19 is a schematic view of an energy system.

Next, an energy system and an electrochemical device will be described with reference to FIG. 19.

An energy system Z includes an electrochemical device 100, and a heat exchanger 190 serving as a waste heat utilization system that reuses heat discharged from the electrochemical device 100.

The electrochemical device 100 includes the electrochemical module M, a fuel supply unit 103 that includes a fuel converter including a desulfurizer 101 and a reformer 102 and supplies fuel gas containing a reducing component to the electrochemical module M, and an inverter (an example of a power converter) 104 serving as the output portion 8 for extracting power from the electrochemical module M.

Specifically, the electrochemical device 100 includes the desulfurizer 101, a water tank 105, a vaporizer 106, the reformer 102, a blower 107, a combustion unit 108, the inverter 104, a control unit 110, and the electrochemical module M.

The desulfurizer 101 removes sulfur compound components contained in a hydrocarbon-based raw fuel such as city gas (i.e., performs desulfurization). When a sulfur compound is contained in the raw fuel, the inclusion of the desulfurizer 101 makes it possible to suppress an adverse influence that the sulfur compound has on the reformer 102 or the electrochemical elements A. The vaporizer 106 produces water vapor (steam) from water supplied from the water tank 105. The reformer 102 uses the water vapor (steam) produced by the vaporizer 106 to perform steam reforming of the raw fuel desulfurized by the desulfurizer 101, thus producing reformed gas containing hydrogen.

The electrochemical module M generates power by causing an electrochemical reaction to occur with use of the reformed gas supplied from the reformer 102 and air supplied from the blower 107. The combustion unit 108 mixes the reaction exhaust gas discharged from the electrochemical module M with air, and burns combustible components in the reaction exhaust gas.

The inverter 104 adjusts the power output from the electrochemical module M to obtain the same voltage and frequency as power received from a commercial system (not shown). The control unit 110 controls the operation of the electrochemical device 100 and the energy system Z.

The reformer 102 performs reforming process on the raw fuel with use of combustion heat produced by the combustion of reaction exhaust gas in the combustion unit 108.

The raw fuel is supplied to the desulfurizer 101 via a raw fuel supply passage 112, due to operation of a booster pump 111. The water in the water tank 105 is supplied to the vaporizer 106 via a water supply passage 114, due to operation of a water pump 113. The raw fuel supply passage 112 merges with the water supply passage 114 at a location on the downstream side of the desulfurizer 101, and the water and the raw fuel, which have been merged outside of the container 200, are supplied to the vaporizer 106.

The water is vaporized by the vaporizer 106 to produce water vapor. The raw fuel, which contains the water vapor produced by the vaporizer 106, is supplied to the reformer 102 via a water vapor-containing raw fuel supply passage 115. In the reformer 102, the raw fuel is subjected to steam reforming, thus producing reformed gas that includes hydrogen gas as a main component (first gas including a reducing component). The reformed gas produced in the reformer 102 is supplied to the electrochemical module M via the fuel supply unit 103.

The reaction exhaust gas is burned in the combustion unit 108, and combustion exhaust gas is sent from a combustion exhaust gas discharge passage 116 to the heat exchanger 190. A combustion catalyst unit 117 (e.g., a platinum-based catalyst) is provided in the combustion exhaust gas discharge passage 116, and reducing components such as carbon monoxide and hydrogen contained in the combustion exhaust gas are removed by combustion.

The heat exchanger 190 uses supplied cool water to perform heat exchange on the combustion exhaust gas produced by combustion in the combustion unit 108, thus producing warm water. In other words, the heat exchanger 190 operates as a waste heat utilization system that reuses heat discharged from the electrochemical device 100.

It should be noted that instead of the waste heat utilization system, it is possible to provide a reaction exhaust gas using unit that uses the reaction exhaust gas that is discharged from (not burned in) the electrochemical module M. At least a portion of the reaction exhaust gas flowing from the first gas discharge portion 62 to the outside of the container 200 may be returned to one of the members 100, 101, 103, 106, 112, 113, and 115 shown in FIG. 19 and recycled. The reaction exhaust gas contains remaining hydrogen gas that was not used in the reaction in the electrochemical elements A. In the reaction exhaust gas using unit, the remaining hydrogen gas is used to perform heat utilization through combustion or power generation by a fuel cell and so on, thus achieving effective energy utilization.

Other Embodiments

The configuration disclosed in the embodiment described above (including the other embodiments; the same applies to the following) can be applied in combination with configurations disclosed in the other embodiments as long as no contradiction arises. Also, the embodiments disclosed in this specification are illustrative, embodiments of the present invention are not limited to the disclosed embodiments, and appropriate modifications can be made without departing from the object of the present invention.

(1) In the above-mentioned embodiments, the plate-like members 220 are applied to the electrochemical module M in which the electrochemical elements A are SOFCs. However, the above-mentioned plate-like members 220 can also be applied to SOECs (Solid Oxide Electrolyzer Cells), secondary cells, and the like.

(2) Although the electrochemical elements A are used in a solid oxide fuel cell serving as the electrochemical device 100 in the above-mentioned embodiments, the electrochemical elements A can also be used in a solid oxide electrolytic (electrolysis) cell, an oxygen sensor using a solid oxide, and the like. The electrochemical elements A can also be used alone as well as used in combination of two or more for the electrochemical element stack S or the electrochemical module M.

That is, in the above-mentioned embodiments, a configuration that can improve the efficiency of converting chemical energy such as fuel into electric energy is described.

In other words, in the above-mentioned embodiments, the electrochemical elements A and the electrochemical module M are operated as fuel cells, and hydrogen gas flows to the electrode layer 31 and oxygen gas flows to the counter electrode layer 33. Accordingly, oxygen molecules $O_2$ react with electrons $e^-$ to produce oxygen ions $O^{2-}$ in the counter electrode layer 33. The oxygen ions $O^{2-}$ move to the electrode layer 31 through the electrolyte layer 32. In the electrode layer 31, hydrogen molecules $H_2$ react with oxygen ions $O^{2-}$ to produce water $H_2O$ and electrons $e^-$. With these reactions, electromotive force is generated between the electrode layer 31 and the counter electrode layer 33, and power is generated.

On the other hand, when the electrochemical elements A and the electrochemical module M are operated as electrolytic cells, gas containing water vapor and carbon dioxide flows to the electrode layer 31, and a voltage is supplied between the electrode layer 31 and the counter electrode layer 33. As a result, in the electrode layer 31, electrons $e^-$ react with water molecules $H_2O$ and carbon dioxide molecules $CO_2$ to produce hydrogen molecules $H_2$, and carbon monoxide CO and oxygen ions $O^{2-}$. The oxygen ions $O^{2-}$ move to the counter electrode layer 33 through the electrolyte layer 32. In the counter electrode layer 33, the oxygen ions $O^{2-}$ release electrons and oxygen molecules $O_2$ are produced. Through the reactions above, water molecules $H_2O$ are electrolyzed into hydrogen molecules $H_2$ and oxygen molecules $O_2$, and in the case where gas containing carbon dioxide molecules $CO_2$ flows, carbon dioxide molecules $CO_2$ are electrolyzed into carbon monoxide molecules CO and oxygen $O_2$.

In the case where gas containing water vapor and carbon dioxide molecules $CO_2$ flows, a fuel converter 25 (FIG. 21) that synthesizes various compounds such as hydrocarbons from hydrogen, carbon monoxide, and the like generated through the above-mentioned electrolysis in the electrochemical elements A and the electrochemical module M can be provided. With the fuel supply unit (not shown), hydrocarbon and the like produced by this fuel converter 25 can flow to the electrochemical elements A and the electrochemical module M or can be extracted from the system and the device and separately used as fuel or a chemical raw material.

Figure 21:
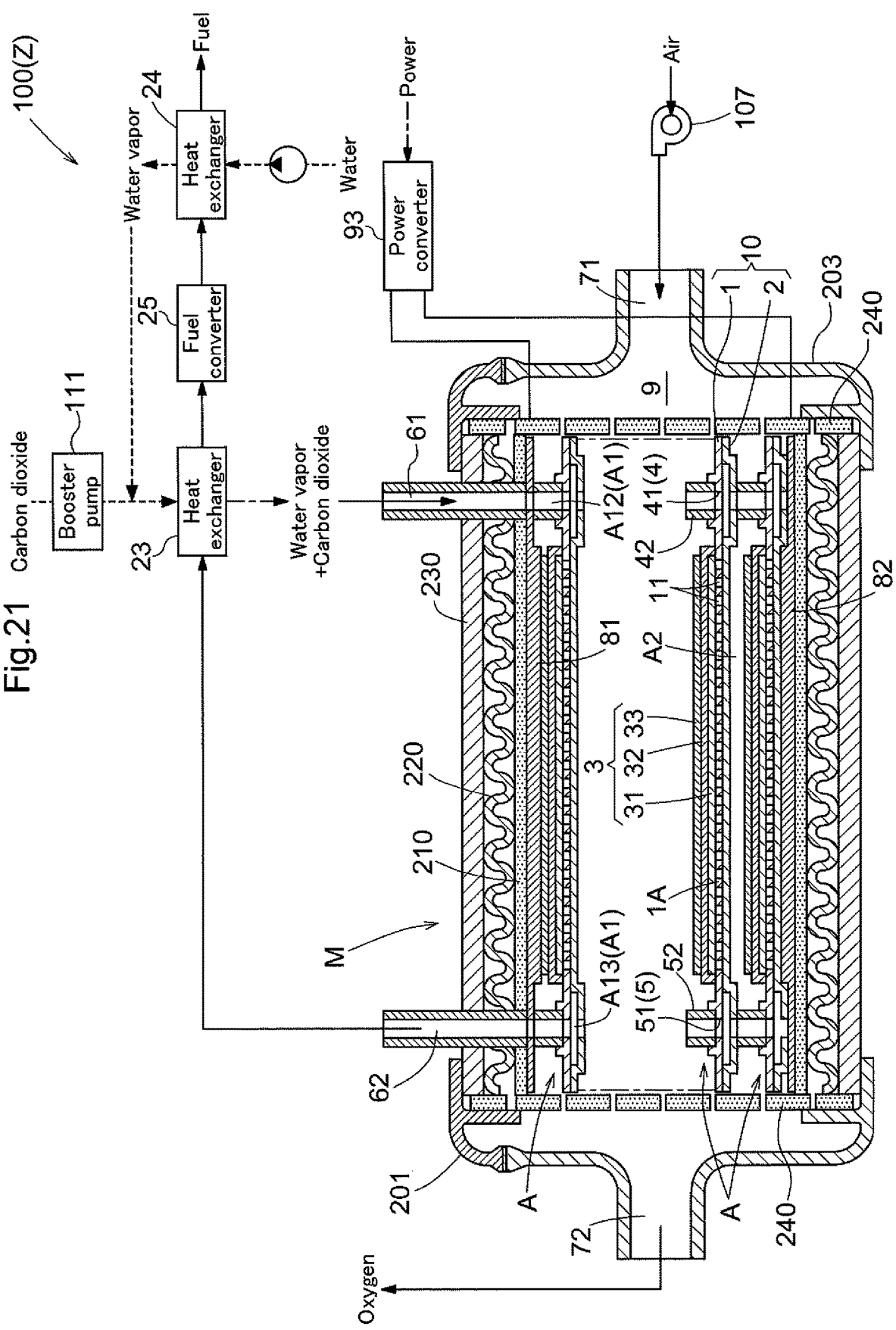
FIG. 21 is a schematic view of another energy system.

FIG. 21 shows examples of the energy system Z and the electrochemical device 100 in the case where the electrochemical reaction portions 3 are operated as electrolytic cells. In this system, supplied water and carbon dioxide are electrolyzed in the electrochemical reaction portion 3 to produce hydrogen, carbon monoxide, and the like. Furthermore, in the fuel converter 25, hydrocarbons and the like are synthesized. By employing the configuration in which the heat exchanger 24 shown in FIG. 21 is operated as a waste heat utilization system that performs heat exchange between the water and the reaction heat produced by the reaction in the fuel converter 25 to vaporize the water, and the heat exchanger 23 shown in FIG. 21 is operated as a waste heat utilization system that performs heat exchange between water vapor and carbon dioxide, and waste heat produced by the electrochemical elements A to preheat the water vapor and the carbon dioxide, the energy efficiency can be improved.

Moreover, a power converter 93 supplies power to the electrochemical elements A. Accordingly, as mentioned above, the electrochemical elements A function as electrolytic cells.

Therefore, with the above-mentioned configuration, an electrochemical device 100, an energy system Z, and the like that can improve the efficiency of converting electric energy into chemical energy such as fuel can be provided.

(3) In the above-described embodiments, a composite material such as NiO-GDC, Ni-GDC, NiO—YSZ, Ni—YSZ, CuO—CeO$_2$, or Cu—CeO$_2$ is used as the material of the electrode layer 31, and a complex oxide such as LSCF or LSM is used as the material of the counter electrode layer 33. With this configuration, the electrode layer 31 serves as a fuel electrode (anode) when hydrogen gas is supplied thereto, and the counter electrode layer 33 serves as an air electrode (cathode) when air is supplied thereto, thus making it possible to use the electrochemical element A as a cell for a solid oxide fuel cell. It is also possible to change this configuration and thus configure an electrochemical element A such that the electrode layer 31 can be used as an air electrode and the counter electrode layer 33 can be used as a fuel electrode. That is, a complex oxide such as LSCF or LSM is used as the material of the electrode layer 31, and a composite material such as NiO-GDC, Ni-GDC, NiO—YSZ, Ni—YSZ, CuO—CeO$_2$, or Cu—CeO$_2$ is used as the material of the counter electrode layer 33. With this configuration, the electrode layer 31 serves as an air electrode when air is supplied thereto, and the counter electrode layer 33 serves as a fuel electrode when hydrogen gas is supplied thereto, thus making it possible to use the electrochemical element A as a cell for a solid oxide fuel cell.

(4) In the above-described embodiments, the electrode layer 31 is arranged between the first plate-like body 1 and the electrolyte layer 32, and the counter electrode layer 33 is arranged on the opposite side of the first plate-like body 1 from the perspective of the electrolyte layer 32. A configuration is also possible in which the electrode layer 31 and the counter electrode layer 33 are provided in an inversed arrangement. Specifically, a configuration is also possible in which the counter electrode layer 33 is arranged between the first plate-like body 1 and the electrolyte layer 32, and the electrode layer 31 is arranged on the opposite side of the first plate-like body 1 from the perspective of the electrolyte layer 32. In this case, a change also needs to be made regarding the supply of gas to the electrochemical elements A.

That is, regarding the order of the electrode layer 31 and the counter electrode layer 33, and which is employed a configuration in which the first gas is reducing component gas and the second gas is oxidative component gas or a configuration in which the first gas is oxidative component gas and the second gas is reducing component gas, various aspects can be employed as long as the electrode layer 31 and the counter electrode layer 33 are arranged such that the first gas and the second gas are supplied thereto so as to appropriately react with each other.

(5) Although the electrochemical reaction portion 3 is provided on a side of the first plate-like body 1 opposite to the second plate-like body 2 so as to cover the gas-permeable portion 1A in the above-described embodiments, the electrochemical reaction portion 3 may also be provided on the second plate-like body 2 side of the first plate-like body 1. That is, the present invention can be achieved even when a configuration is employed in which the electrochemical reaction portion 3 is arranged in the internal passage A1.

(6) Although the first penetrated portion 41 and the second penetrated portion 51 are provided as a pair at the two end portions of the rectangular plate-like support in the above-mentioned embodiments, there is no limitation to the configuration in which they are provided at the two end portions. A configuration may also be employed in which two or more pairs are provided. The first penetrated portion 41 and the second penetrated portion 51 need not be provided as a pair. Accordingly, one or more first penetrated portion 41 and one or more second penetrated portion 51 can be provided.

Furthermore, the shape of the plate-like support is not limited to a rectangular shape, and various shapes such as a square shape and a circular shape can be employed.

(7) There is no limitation on the shapes of the first annular sealing portion 42 and the second annular sealing portion 52 as long as a configuration is obtained in which the first penetrated portion 41 and the second penetrated portion 51 are in communication with each other and leakage of gas can be prevented. That is, it is sufficient that the first annular sealing portion 42 and the second annular sealing portion 52 has an endless shape provided with an opening portion that is in communication with the penetrated portion therein, and is configured to seal a gap between the adjacent electrochemical elements A. The first annular sealing portion 42 and the second annular sealing portion 52 have, for example, an annular shape. The annular shape may be any of an annular circle, an annular ellipse, an annular square, an annular polygon, and the like.

Figure 20:
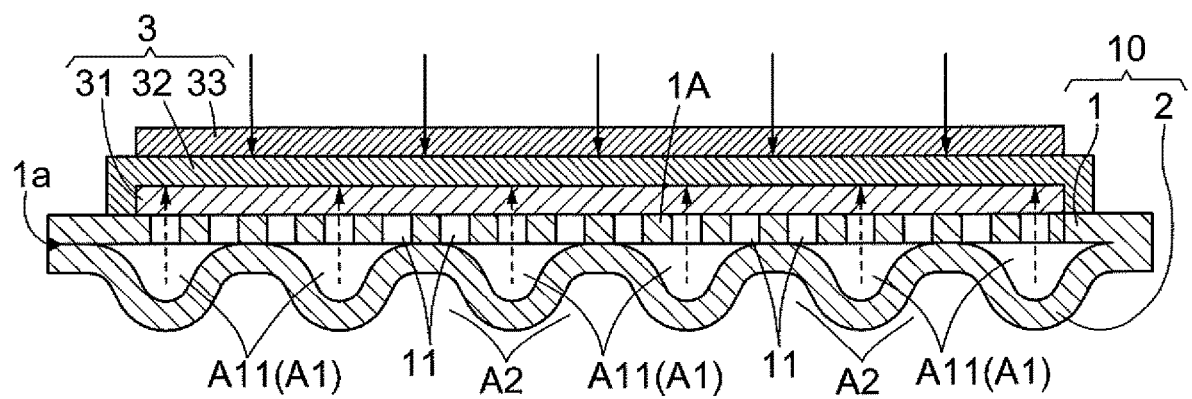
FIG. 20 is an explanatory diagram of an electrochemical module according to another embodiment.

(8) In the description above, the plate-like support 10 includes the first plate-like body 1 and the second plate-like body 2. Separate plate-like bodies may be used to form the first plate-like body 1 and the second plate-like body 2, or a single plate-like body as shown in FIG. 20 may be used to form the first plate-like body 1 and the second plate-like body 2. In the case shown in FIG. 20, the first plate-like body 1 and the second plate-like body 2 are stacked by folding a single plate-like body. The first plate-like body 1 and the second plate-like body 2 are integrated by, for example, welding the peripheral portions 1a. It should be noted that a continuous seamless plate-like body may be used to form the first plate-like body 1 and the second plate-like body 2 and may be folded to be shaped as shown in FIG. 20.

Moreover, as described later, the second plate-like body 2 may be constituted by a single member or two or more members. Similarly, the first plate-like body 1 may be constituted by a single member or two or more members.

(9) The above-mentioned second plate-like body 2 forms the internal passage A1 together with the first plate-like body 1. The internal passage A1 includes the distribution portion A12, a plurality of auxiliary passages A11, and the confluence portion A13. As shown in FIG. 9, the first gas supplied to the distribution portion A12 is distributed and supplied to the plurality of auxiliary passages A11, and merges in the confluence portion A13 after leaving the auxiliary passages A11 through the exits. Accordingly, the first gas flows in a gas-flowing direction from the distribution portion A12 toward the confluence portion A13.

The plurality of auxiliary passages A11 is formed by shaping the portion of the second-plate like body 2 other than the portions corresponding to the distribution portion A12 and the confluence portion A13 into a wavelike shape. As shown in FIG. 13, the plurality of auxiliary passages A11 form a wavelike shape in a cross-sectional view taken in a flow-intersection direction that intersects the direction in which the first gas flows. The plurality of auxiliary passages A11 are formed by extending the wavelike plate in the gas flowing direction shown in FIG. 9. The plurality of auxiliary passages A11 may be formed of a continuous wavelike plate-like body or two or more wavelike plate-like bodies between the distribution portion A12 and the confluence portion A13. For example, the plurality of auxiliary passages A11 may be formed of two or more wavelike plate-like bodies that are separate from each other in a direction extending in the gas flowing direction, or two or more wavelike plate-like bodies that are separate from each other in a direction extending in the flow-intersection direction.

As shown in FIG. 13, the plurality of auxiliary passages A11 form a wavelike shape by repeatedly forming crests and troughs with the same shape. However, the second plate-like body 2 may include a plate-like portion in the region provided with the plurality of auxiliary passages A11. For example, the plurality of auxiliary passages A11 may be formed by forming plate-like portions and protruding portions alternately. The protruding portions can be used as portions in which a fluid such as the first gas flows.

(10) The portion of the above-mentioned second plate-like body 2 corresponding to the plurality of auxiliary passages A11 need not be formed in a wavelike shape as a whole, and it is sufficient that at least a portion thereof is formed in a wavelike shape. For example, the second plate-like body 2 may be formed such that a portion in the gas flowing direction has a flat shape and the portion other than the flat portion has a wavelike shape, between the distribution portion A12 and the confluence portion A13. The second plate-like body 2 may also be formed such that a portion in the flow-intersection direction has a flat shape and the portion other than the flat portion has a wavelike shape.

(11) A structure that can improve the power generation efficiency can be provided in the above-mentioned internal passage A1. The following is a description of such a configuration. A description of portions that are the same as those of the above-mentioned embodiments is simplified or omitted.

(I) Specific Configuration of Electrochemical Module M

Next, the specific configuration of the electrochemical module M will be described with reference to FIGS. 22 to 39 and the like. The electrochemical module M includes the electrochemical element stack S shown in FIG. 4.

As shown in FIGS. 22 to 39 and the like, the stacking direction of the electrochemical element stack S includes the +Z direction and −Z direction (Z direction). The direction in which the first gas flows between the first plate-like body 1 and the second plate-like body 2 from the first gas supply portion 61 side toward the first gas discharge portion 62 side, and, similarly, the direction in which the second gas flows between the first plate-like body 1 and the second plate-like body 2 from the second gas supply portion 71 side toward the second gas discharge portion 72 side include the +X direction and −X direction (X direction) intersecting the +Z direction and −Z direction (Z direction). The direction that intersects the +Z direction and −Z direction (Z direction) and the +X direction and −X direction (X direction) includes the +Y direction and −Y direction (Y direction). The XZ plane, the XY plane, and the YZ plane are substantially orthogonal to one another.

Figure 22:
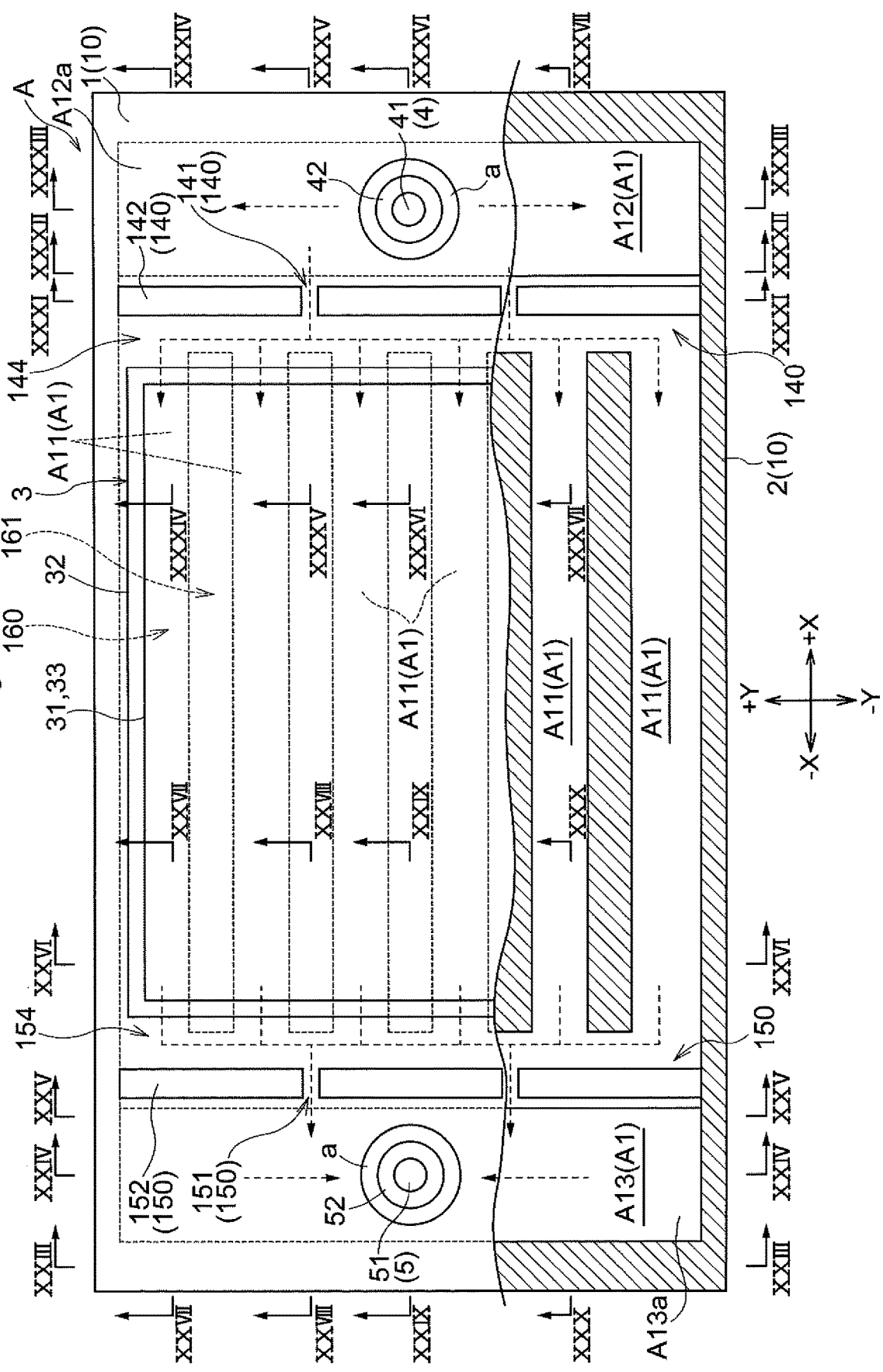
FIG. 22 is a schematic view of another electrochemical element.
Figure 23:
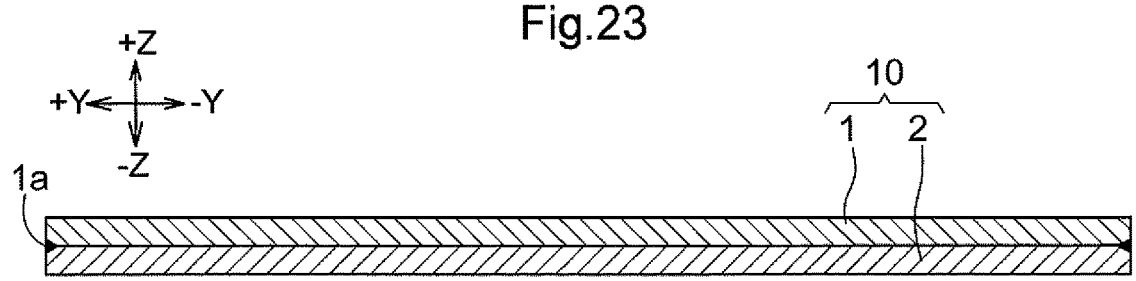
FIG. 23 is a cross-sectional view taken along line XXIII-XXIII in FIG. 22.
Figure 24:
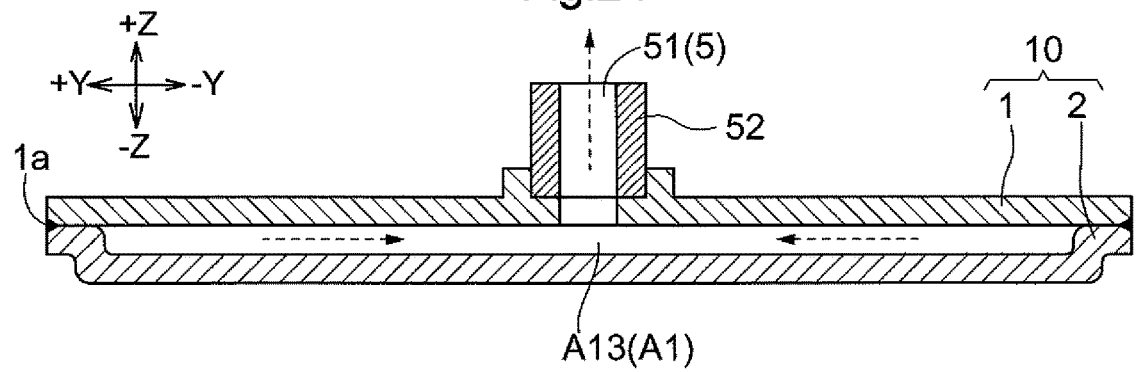
FIG. 24 is a cross-sectional view taken along line XXIV-XXIV in FIG. 22.
Figure 25:
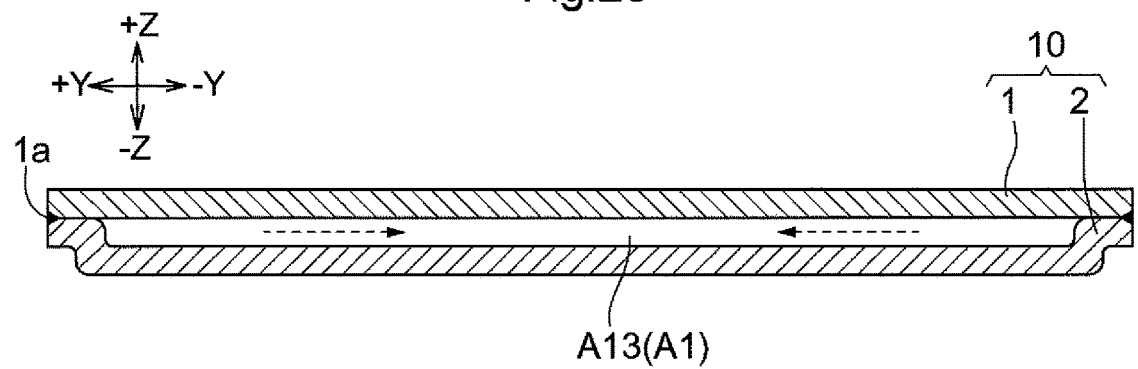
FIG. 25 is a cross-sectional view taken along line XXV-XXV in FIG. 22.
Figure 26:
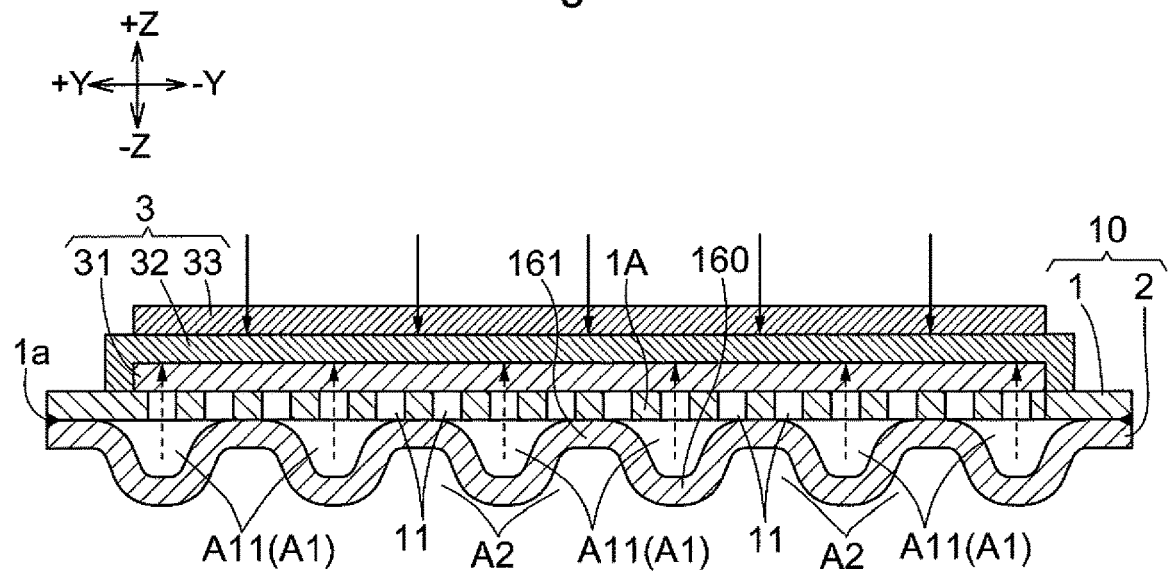
FIG. 26 is a cross-sectional view taken along line XXVI-XXVI in FIG. 22.

As shown in FIGS. 4, 22, and the like, the electrochemical module M includes: the first gas supply portion 61 for supplying first gas to the internal passages A1 via the supply passage 4; the first gas discharge portion 62 for discharging the first gas used in a reaction; the second gas supply portion 71 for supplying second gas from the outside to the flowing portions A2; the second gas discharge portion 72 for discharging the second gas used in a reaction; and an output portion 8 to which output generated by an electrochemical reaction in the electrochemical reaction portion 3 is provided, wherein the distribution chamber 9 for distributing and supplying the second gas supplied from the second gas supply portion 71, to the flowing portions A2 is provided inside the container 200.

Accordingly, in the electrochemical module M, the fuel gas (also referred to as the "first gas") is supplied from the first gas supply portion 61 and air (also referred to as the "second gas") is supplied from the second gas supply portion 71, so that the fuel gas enters as indicated by dashed arrows and the air enters as indicated by solid arrows as shown in FIGS. 4, 22, and the like.

The fuel gas supplied from the first gas supply portion 61 is introduced into the supply passage 4 through the first penetrated portion 41 of the topmost electrochemical element A of the electrochemical element stack S, and flows from the supply passage 4 partitioned by the first annular sealing portions 42 into the internal passage A1 in all of the electrochemical elements A. Moreover, the air supplied from the second gas supply portion 71 temporarily flows into the distribution chamber 9, and then flows into the flowing portions A2 formed between the electrochemical elements A. In this embodiment, the flowing direction in which the fuel gas flows in the internal passage A1 along the flat face of the plate-like support 10 is a direction extending from the +X side toward the −X side. Similarly, the flowing direction in which the air flows in the flowing portion A2 along the flat face of the plate-like support 10 is a direction extending from the +X side toward the −X side.

Incidentally, when the second plate-like body 2 (a portion of a plate-like support 10) is considered as a base, the internal passage A1 is formed between the first plate-like body 1 (a portion of the plate-like support 10) and the second plate-like body 2 at a position at which a portion of the second plate-like body 2 with a wavelike plate-like shape bulges from the first plate-like body 1, and such a portion comes into contact with the electrochemical reaction portion 3 of the adjacent electrochemical element A and can be electrically connected thereto. On the other hand, a portion of the second plate-like body 2 with a wavelike plate-like shape that is in contact with the first plate-like body 1 is electrically connected to the first plate-like body 1, and the flowing portion A2 is formed between the second plate-like body 2 and the electrochemical reaction portion 3 of the adjacent electrochemical element A.

Figure 38:
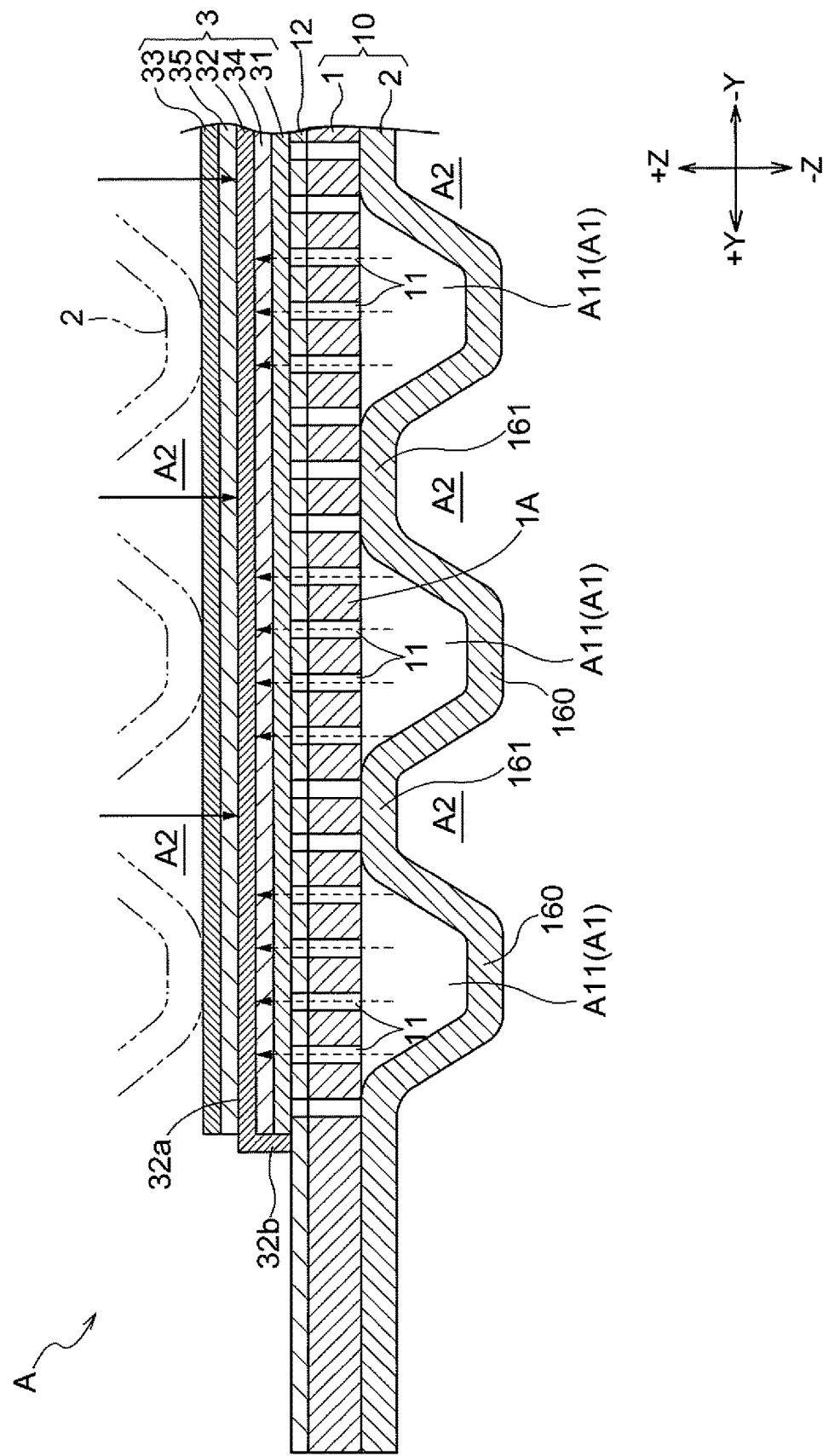
FIG. 38 is an enlarged view of a relevant portion of an electrochemical reaction portion.

Portions of FIG. 38 and the like show a cross section of an electrochemical element A including the internal passage A1 and a cross section of an electrochemical element A including the flowing portion A2 that are aligned for the sake of convenience. The fuel gas supplied from the first gas supply portion 61 reaches the distribution portion A12 (see FIGS. 22 to 25 and the like), flows and spreads in the width direction of one end portion via the distribution portion A12, and reaches auxiliary passages A11 of the internal passage A1 (see FIGS. 22 to 25 and the like).

As shown in FIG. 22 and the like, the internal passage A1 includes the distribution portion A12, the plurality of auxiliary passages A11, and the confluence portion A13, which will be described later. The internal passage A1 further includes a supply buffer portion 144 provided between the distribution portion A12 and the plurality of auxiliary passages A11, and a discharge buffer portion 154 provided between the plurality of auxiliary passages A11 and the confluence portion A13.

The internal passage A1 is formed by a space formed between the first plate-like body 1 and the second plate-like body 2, which are opposed to each other. In this embodiment, the first plate-like body 1 has a flat shape and is provided with the gas-permeable portion 1A, which will be described later. The second plate-like body 2 includes portions protruding upward with respect to the stacking direction and portions recessed downward. Accordingly, when the first plate-like body 1 and the second plate-like body 2 are combined in a state of being opposed to each other, the portions of the second plate-like body 2 protruding upward come into contact with the first plate-like body 1. A space partitioned into the distribution portion A12, the supply buffer portion 144, the plurality of auxiliary passages A11, the discharge buffer portion 154, the confluence portion A13, and the like is formed by the portions of the second plate-like body 2 recessed downward and the first plate-like body 1.

A supply structure 140 is provided between the distribution portion A12 and the plurality of auxiliary passages A11 in a direction extending in the direction in which the fuel gas flows (the +X direction and −X direction (X direction)), which will be described in detail later. Due to the supply structure 140, the fuel gas is temporarily stored in the distribution portion A12, and supply of the fuel gas from the distribution portion A12 to the plurality of auxiliary passages A11 is limited.

A discharge structure 150 is provided between the plurality of auxiliary passages A11 and the confluence portion A13 in a direction extending in the direction in which the fuel gas flows. Due to the discharge structure 150, discharge of the fuel gas from the plurality of auxiliary passages A11 to the confluence portion A13 is limited.

The fuel gas flows in the first gas supply portion 61, the first annular sealing portion 42, the first penetrated portion 41, and the like, and is supplied to the distribution portion A12 of each electrochemical element A. The fuel gas supplied to the distribution portion A12 is temporarily stored in the distribution portion A12 due to the supply structure 140. Then, the fuel gas is introduced into the plurality of auxiliary passages A11 from the distribution portion A12.

The fuel gas that has entered the auxiliary passages A11 flows in the auxiliary passages A11, and enters the electrode layer 31 and the electrolyte layer 32 through the gas-permeable portion 1A. Moreover, the fuel gas further flows in the auxiliary passages A11 together with the fuel gas used in an electrochemical reaction. After reaching the ends of the plurality of auxiliary passages A11 in the flowing direction, the fuel gas flows into the confluence portion A13 in a state in which flowing into the confluence portion A13 is partially limited due to the discharge structure 150. The fuel gas that has entered the confluence portion A13 flows in the confluence portion A13, the second penetrated portion 51, and the second annular sealing portion 52, and the like. Then, the fuel gas is discharged to the outside from the first gas discharge portion 62 together with the fuel gas used in an electrochemical reaction in other electrochemical elements A.

On the other hand, the air supplied from the second gas supply portion 71 enters the flowing portions A2 via the distribution chamber 9, and then can enter the counter electrode layers 33 and the electrolyte layers 32. Moreover, the air further flows in the flowing portions A2 along the electrochemical reaction portions 3 together with air used in an electrochemical reaction, and is discharged from the second gas discharge portion 72 to the outside.

With this configuration, the electrochemical elements A are connected in series between the collectors 81 and 82 due to the contact between the second plate-like body 2 and the electrochemical reaction portion 3 of the adjacent electrochemical elements A, and thus power generated following the fuel gas flow and the air flow in the electrochemical reaction portions 3 is extracted from the output portion 8 as composite output.

The configuration of the electrochemical element stack S will be described later in detail.

(II) Configurations of Internal Passage and Second Plate-Like Body

The configuration of the internal passage A1 formed by arranging the first plate-like body 1 and the second plate-like body 2 in a state of being opposed to each other will be further described.

In this embodiment, the internal passage A1 is formed by the inner faces of the first plate-like body 1 having a flat shape and the second plate-like body 2 formed in an uneven shape including portions protruding upward (in the +Z direction) in the stacking direction or portions recessed downward (in the −Z direction) in the stacking direction, the first plate-like body 1 and the second plate-like body 2 being combined in a state of being opposed to each other. The internal passage A1 includes the distribution portion A12, the supply buffer portion 144, the plurality of auxiliary passage A11, the discharge buffer portion 154, and the confluence portion A13. Moreover, the internal passage A1 further includes supply passing portions 141 (portions of the supply structure 140) and discharge passing portions 151 (portions of the discharge structure 150) through which the first gas passes.

It should be noted that the structure on the supply passage 4 side on which the first gas supply portion 61, the first annular sealing portion 42, the first penetrated portion 41, and the like are provided and the structure on the discharge passage 5 side on which the first gas discharge portion 62, the second annular sealing portion 52, the second penetrated portion 51, and the like are provided are symmetrical to each other. FIGS. 23 to 25, FIGS. 27 to 30, and the like show cross-sectional views of the discharge passage 5 side on which the first gas discharge portion 62, the second annular sealing portion 52, the second penetrated portion 51, and the like are provided. On the other hand, FIGS. 31 to 37 and the like show cross-sectional views of the supply passage 4 side on which the first gas supply portion 61, the first annular sealing portion 42, the first penetrated portion 41, and the like are provided. In the cross-sectional views of the discharge passage 5 side shown in FIGS. 23 to 25, FIGS. 27 to 30, and the like, the first gas flows in the direction in which the first gas is discharged from the plurality of auxiliary passages A11 to the second penetrated portion 51 and the like via the confluence portion A13. On the other hand, in the cross-sectional views of the supply passage 4 side shown in FIGS. 31 to 37, the first gas flows in the direction in which the first gas is supplied from the distribution portion A12 to the plurality of auxiliary passages A11 via the first penetrated portion 41 and the like.

The distribution portion A12 is provided corresponding to each electrochemical element A. The distribution portion A12 is provided on the supply passage 4 side and serves as a buffer portion for supplying the first gas to each electrochemical element A. The distribution portion A12 is provided on the upstream side of the plurality of the auxiliary passages A11 in the internal passage A1 in the direction in which the first gas flows (in the direction from the +X side toward the −X side). As shown in FIG. 22, FIG. 39, and the like, the distribution portion A12 is provided with the first penetrated portion 41 that passes through the second plate-like body 2 at the substantially central portion in the direction intersecting the flowing direction (+Y direction and −Y direction (Y direction)) and in the flowing direction (+X direction and −X direction (X direction)). The first gas flows in the first gas supply portion 61, the first annular sealing portion 42, the first penetrated portion 41, and the like and is supplied to the distribution portion A12 of each electrochemical element A.

Figure 33:
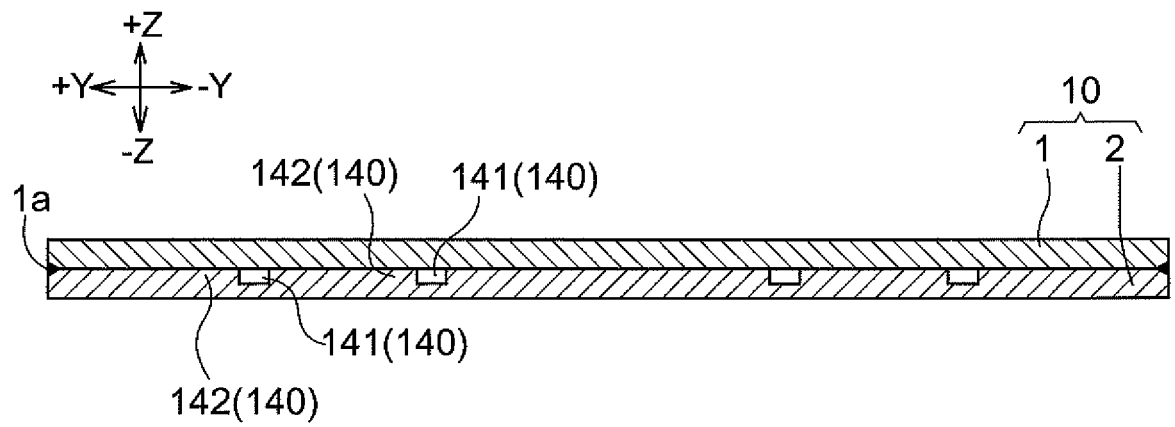
FIG. 33 is a cross-sectional view taken along line XXXIII-XXXIII in FIG. 22.
Figure 34:
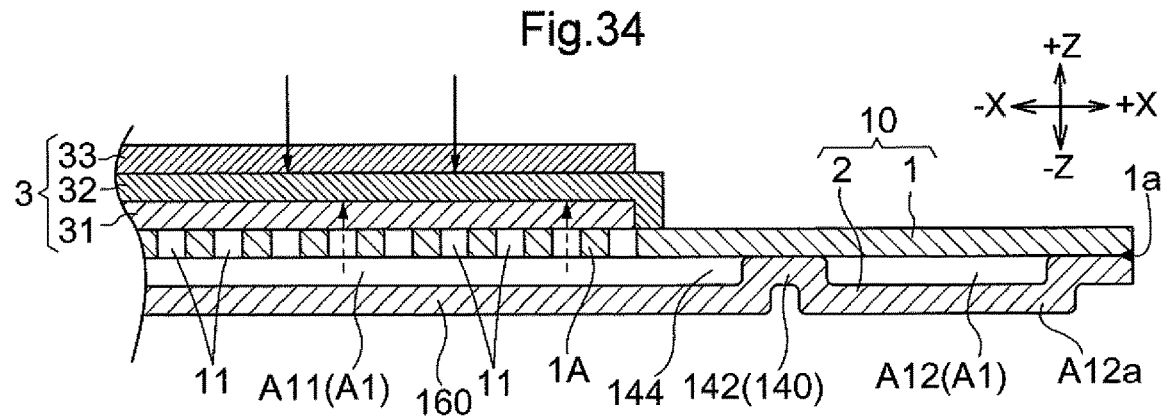
FIG. 34 is a cross-sectional view taken along line XXXIV-XXXIV in FIG. 22.
Figure 35:
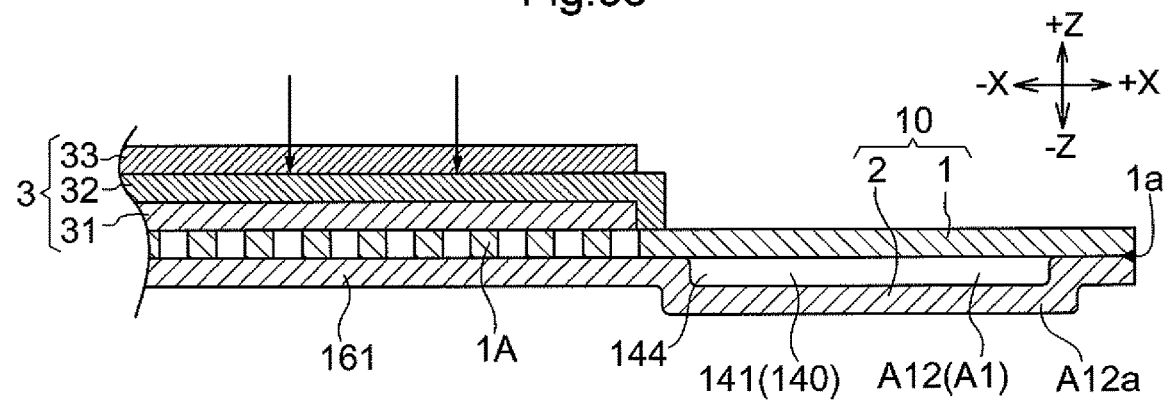
FIG. 35 is a cross-sectional view taken along line XXXV-XXXV in FIG. 22.
Figure 36:
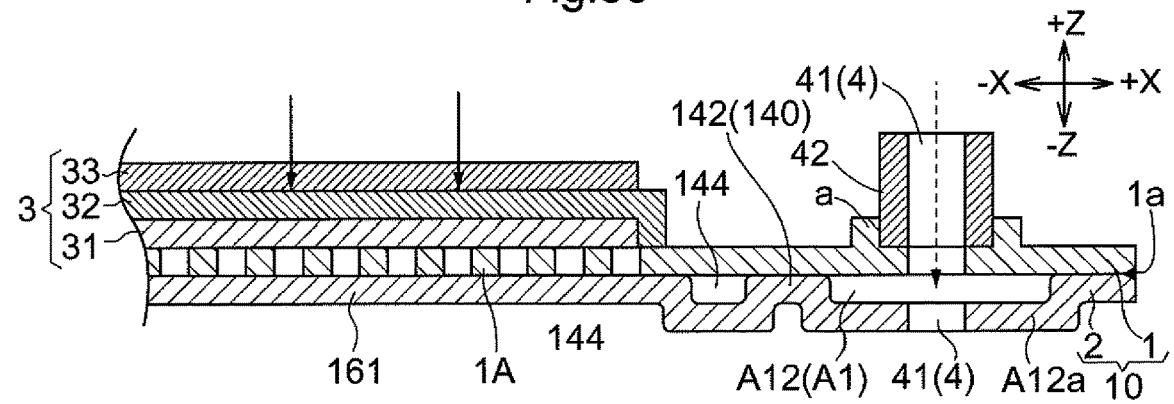
FIG. 36 is a cross-sectional view taken along line XXXVI-XXXVI in FIG. 22.
Figure 37:
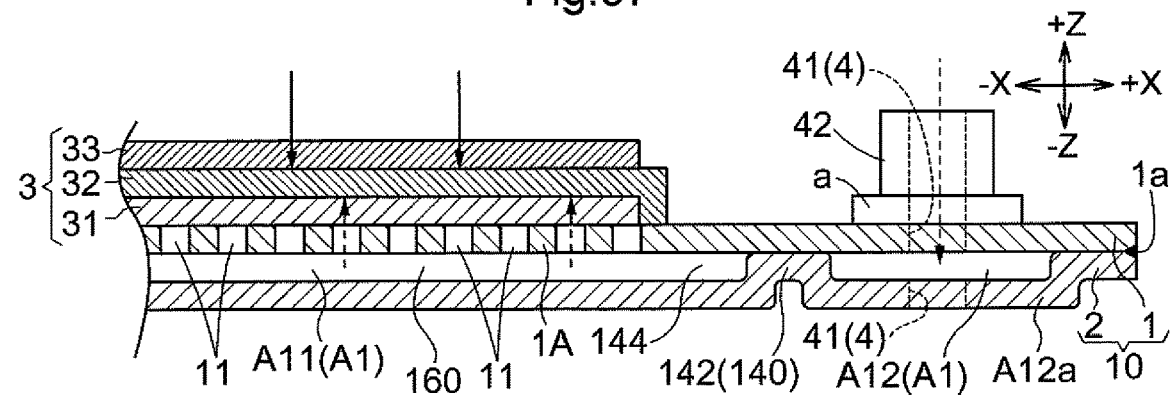
FIG. 37 is a cross-sectional view taken along line XXXVII-XXXVII in FIG. 22.

As shown in FIGS. 23 to 37 and the like, the first plate-like body 1 and the second plate-like body 2 are integrated by welding the edge portion at the peripheral portion 1a of the first plate-like body 1 and the edge portion at the peripheral portion 1a of the second plate-like body 2 to each other. The distribution portion A12 is formed by processing the second plate-like body 2 such that a portion thereof is recessed downward in the stacking direction (−Z direction) with respect to the peripheral portion 1a. More specifically, the distribution portion A12 is formed such that the location in the stacking direction changes at supply preventing portions 142 (portions of the supply structure 140). That is, as shown in FIG. 34 and the like, the top face of the distribution portion A12 is located below the top faces of the supply preventing portions 142 in the stacking direction. The top faces of the supply preventing portions 142 are in contact with the bottom face of the first plate-like body 1. Accordingly, discharge, from the distribution portion A12, of the first gas introduced into the distribution portion A12 is limited due to the supply preventing portions 142 protruding upward in the stacking direction, and the first gas is temporarily stored in the distribution portion A12 formed in a recessed shape.

As shown in FIG. 22 and the like, the distribution portion A12 is elongated in the +Y direction and −Y direction (Y direction) as viewed from above. The length in the Y direction of the distribution portion A12 corresponds to the length in the Y direction of the region provided with the plurality of auxiliary passages A11 that are arranged in parallel at intervals in the Y direction.

As shown in FIGS. 22 to 39, and the like, the plurality of auxiliary passages A11 in which the first gas flows extend in the flowing direction, namely the +X direction and −X direction (X direction). As described above, the plurality of auxiliary passages A11 are arranged in parallel at intervals in the Y direction. As shown in FIGS. 22 to 39, and the like, the second plate-like body 2 includes a plurality of auxiliary passage forming portions 160 for forming the plurality of auxiliary passages A11, and a plurality of partitioning portions 161 that are each provided between the adjacent auxiliary passage forming portions 160 to separate the adjacent auxiliary passages A11. As shown in FIG. 38 and the like, the auxiliary passage forming portions 160 are formed in a recessed shape with a bottom face, and the top faces of the partitioning portions 161 are located above the bottom faces of the auxiliary passage forming portions 160 in the stacking direction. The top faces of the partitioning portions 161 are in contact with the bottom face of the first plate-like body 1. Accordingly, the auxiliary passages A11 are separate from one another, and the first gas flows in each of the auxiliary passages A11 in the flowing direction.

It should be noted that, in FIG. 22 and the like, the auxiliary passages A11 extend in the flowing direction from the vicinity of the supply structure 140 to the vicinity of the discharge structure 150. However, there is no limitation to this configuration, and the auxiliary passages A11 may also be formed in only a portion of the region between the vicinity of the supply structure 140 and the vicinity of the discharge structure 150. That is, the auxiliary passage forming portions 160 for forming the auxiliary passages A11 may also be arranged in only a portion of the region between the vicinity of the supply structure 140 and the vicinity of the discharge structure 150.

As shown in FIGS. 38 and 39, in the +Y direction and −Y direction (Y direction; the intersection direction intersecting the flowing direction), the length L3 of each partitioning portion 161 is smaller than the length L4 of each auxiliary passage forming portion 160 (L3<L4). When L3 is smaller than L4, as shown in FIG. 38 and the like, the contact area between the top face of the partitioning portion 161 and the bottom face of the first plate-like body 1 can be reduced. That is, a space in the auxiliary passage A11 facing the first plate-like body 1 provided with the gas-permeable portion 1A can be increased, thus making it possible to increase the amount of the first gas flowing from the auxiliary passage A11 to the electrochemical reaction portion 3.

As shown in FIG. 22, FIGS. 31 to 39, and the like, the second plate-like body 2 includes the supply structure 140 between the distribution portion A12 and the plurality of auxiliary passages A11 in a direction extending in the flowing direction (+X direction and −X direction (X direction)). Due to the supply structure 140, the first gas is temporarily stored in the distribution portion A12, and supply of the first gas from the distribution portion A12 to the plurality of auxiliary passages A11 is limited.

The supply structure 140 includes a plurality of supply passing portions 141 and a plurality of supply preventing portions 142. The first gas flows from the distribution portion A12 to the plurality of auxiliary passages A11 through the supply passing portions 141. The supply preventing portions 142 prevent the first gas from flowing from the distribution portion A12 to the plurality of auxiliary passages A11. As shown in FIG. 33 and the like, the top faces of the supply preventing portions 142 are located above the top faces of the supply passing portions 141 in the stacking direction, and are in contact with the bottom face of the first plate-like body 1. Accordingly, while the supply preventing portion 142 prevents the first gas in the distribution portion A12 from flowing in the flowing direction, the first gas flows to the plurality of auxiliary passages A11 through the supply passing portions 141 in the flowing direction.

In this embodiment, as shown in, for example, FIGS. 22 and 39, the supply preventing portions 142 are formed in a substantially rectangular shape. The rectangular supply preventing portions 142 are arranged in the +Y direction and −Y direction (Y direction) such that the long sides extend in the Y direction. The supply passing portions 141 are each provided between the adjacent supply preventing portions 142. That is, the supply passing portions 141 are each provided in the interval between the short sides of the adjacent supply preventing portions 142 that are opposed to each other.

As shown in FIG. 39, in the +Y direction and −Y direction (Y direction; the intersection direction intersecting the flowing direction), the length L2 of each supply preventing portion 142 is larger than the length L1 of each supply passing portion 141 (L2>L1). It is preferable that the length L1 of each supply passing portion 141 is smaller than the length L3 of each partitioning portion 161 (L1<L3). This configuration allows the first gas ejected from the distribution portion A12 through the supply passing portions 141 to collide against the end portions on the +X side of the partitioning portions 161 and to be temporarily stored in the supply buffer portion 144, which will be described later.

The relationship between L1 and L2 is determined depending on, for example, the amount of the first gas supplied to the distribution portion A12 per unit time, the amount of the first gas to be supplied to the plurality of auxiliary passages A11 per unit time, the number of the supply preventing portions 142, the length L3 in the Y direction of each partitioning portion 161, the length L4 in the Y direction of each auxiliary passage A11, and the like.

As described above, the auxiliary passages A11 are separated by the partitioning portions 161. In the flowing direction (+X direction and −X direction (X direction)), the plurality of partitioning portions 161 are arranged such that any of the partitioning portions 161 corresponds to one supply passing portion 141.

Moreover, in the flowing direction, the plurality of auxiliary passages A11 are arranged such that at least one of the auxiliary passages A11 corresponds to one supply preventing portion 142.

The first gas is introduced into the plurality of auxiliary passages A11 from the distribution portion A12 through the supply passing portions 141. With the above-mentioned configuration, any of the partitioning portions 161 corresponds to one supply passing portion 141 in the flowing direction, the first gas ejected from the distribution portion A12 into the supply passing portions 141 flows in the flowing direction and thus collides against the partitioning portions 161 protruding upward in the stacking direction. Due to the collision with the partitioning portions 161, the first gas flows in the intersection direction intersecting the flowing direction. That is, the first gas flowing from the distribution portion A12 through the supply passing portions 141 is not immediately introduced into the plurality of auxiliary passages A11, but collides against the partitioning portions 161 on the upstream side of the auxiliary passages A11 and flows in the intersection direction. Furthermore, the first gas flowing in the intersection direction does not return to the distribution portion A12 due to the supply preventing portions 142 protruding upward in the stacking direction, and is temporarily stored between the supply structure 140 and the plurality of auxiliary passages A11. Thereafter, the first gas flows along the ejection from the distribution portion A12 and is introduced into the plurality of auxiliary passages A11 formed by the plurality of auxiliary passage forming portions 160.

It should be noted that the region between the supply structure 140 and the plurality of auxiliary passages A11 in which the first gas is temporarily stored is the supply buffer portion 144.

In this embodiment, one of the partitioning portions 161 corresponds to one supply passing portion 141 in the flowing direction. However, there is no limitation to this configuration, and a plurality of partitioning portions 161 may correspond to one supply passing portion 141. A configuration may also be employed in which no partitioning portion 161 is correspond to one supply passing portion 141, and one partitioning portion 161 corresponds to another supply passing portion 141.

The supply preventing portion 142 is provided corresponding to the first penetrated portion 41 in the flowing direction. This makes it possible to reduce a possibility that the first gas flows to the plurality of auxiliary passages A11 immediately after being introduced into the distribution portion A12 from the first penetrated portion 41. Accordingly, the first gas can be temporarily stored in the distribution portion A12.

The number of the supply preventing portion 142 is, for example, two or more, but is not limited thereto. It is preferable to set the number of the supply preventing portions 142 in accordance with the number of the plurality of auxiliary passages A11.

In the description above, the supply preventing portions 142 are lined up in a row in the direction intersecting the flowing direction. However, there is no limitation to this arrangement as long as the first gas can be temporarily stored in the distribution portion A12, and the first gas can be substantially uniformly supplied to the plurality of auxiliary passages A11. For example, a plurality of supply preventing portions 142 may deviate from the intersection direction. A plurality of supply preventing portions 142 may be arranged in the intersection direction or deviate from the intersection direction.

In the description above, the supply preventing portions 142 have a rectangular shape. However, the shape of the supply preventing portions 142 is not limited thereto as long as gas can be uniformly supplied from the distribution portion A12 to the plurality of auxiliary passages A11. For example, the supply preventing portions 142 may also be formed in various shapes such as a square shape, a circular shape, an elliptical shape, and a triangular shape.

It is preferable that, as in the case of the above-mentioned embodiment shown in FIG. 22, FIG. 39, and the like, two of the plurality of supply preventing portions 142 are respectively provided at a position corresponding to the end portion on the +Y side of the distribution portion A12 and a position corresponding to the end portion on the −Y side thereof, but there is no limitation to this configuration. The first gas is distributed over the distribution portion A12 from the first penetrated portion 41 in the distribution portion A12 so as to spread in the space in the distribution portion A12, and collides against the end faces of the distribution portion A12. Accordingly, the first gas that has collided against the end faces of the distribution portion A12 may change its direction at the end faces and flow toward the plurality of auxiliary passages A11. Therefore, providing the supply preventing portions 142 at positions corresponding to the end portions of the distribution portion A12 makes it possible to reduce a possibility that the first gas immediately flows out of the distribution portion A12 into the plurality of auxiliary passages A11. This makes it possible to substantially uniformly supply the first gas from the distribution portion A12 to the auxiliary passages A11 as described later.

Next, the confluence portion A13 and the discharge structure 150 will be described. The confluence portion A13 and the discharge structure 150 respectively have the same structures as those of the distribution portion A12 and the supply structure 140.

The confluence portion A13 is provided on the discharge passage 5 side and serves as a buffer portion for discharging the first gas flowing in the plurality of auxiliary passages A11. The confluence portion A13 is provided on the downstream side of the plurality of the auxiliary passages A11 in the internal passage A1 in the direction in which the first gas flows. As shown in FIG. 22, FIG. 39, and the like, the confluence portion A13 is provided with the second penetrated portion 51 that passes through the second plate-like body 2 at the substantially central portion in the flowing direction and the direction intersecting the flowing direction. The first gas that has passed through the plurality of auxiliary passages A11 is introduced into the confluence portion A13, and is discharged to the outside via the second penetrated portion 51, the second annular sealing portion 52, the first gas discharge portion 62, and the like.

Figure 27:
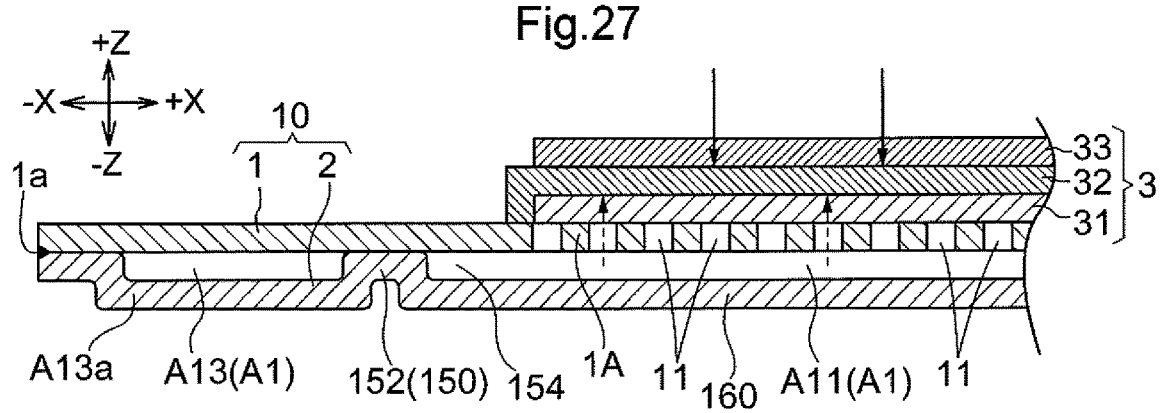
FIG. 27 is a cross-sectional view taken along line XXVII-XXVII in FIG. 22.
Figure 28:
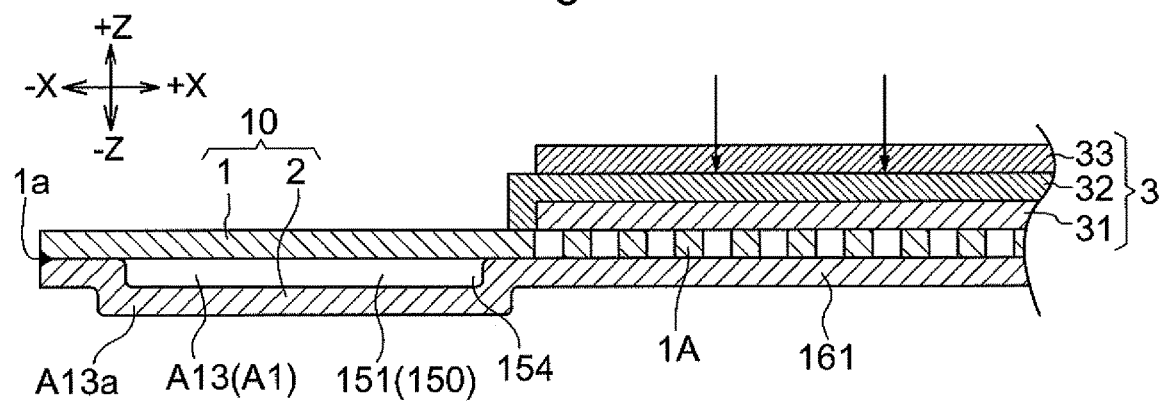
FIG. 28 is a cross-sectional view taken along line XXVIII-XXVIII in FIG. 22.
Figure 29:
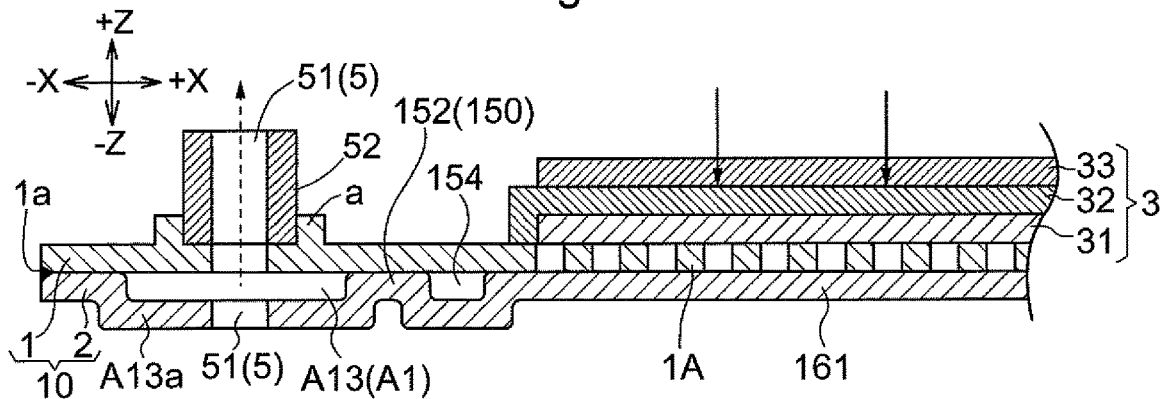
FIG. 29 is a cross-sectional view taken along line XXIV-XXIV in FIG. 22.
Figure 30:
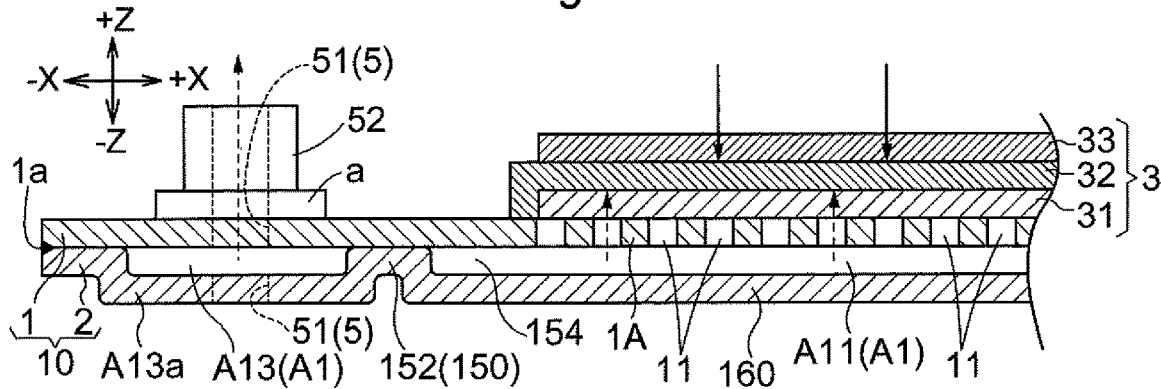
FIG. 30 is a cross-sectional view taken along line XXX-XXX in FIG. 22.
Figure 31:
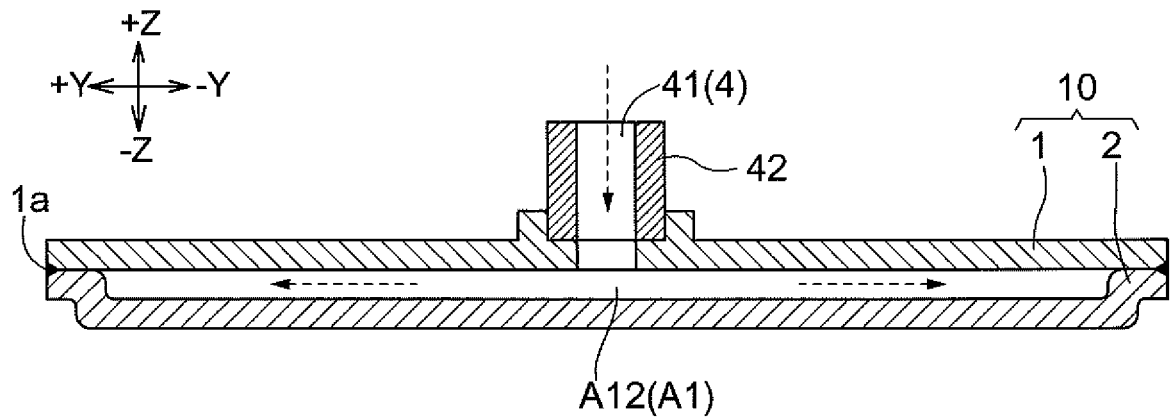
FIG. 31 is a cross-sectional view taken along line XXXI-XXXI in FIG. 22.
Figure 32:
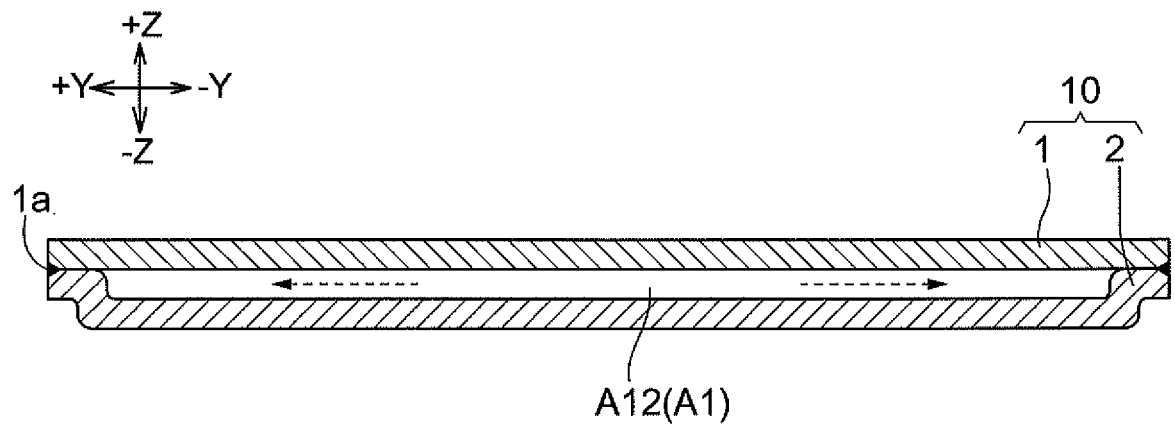
FIG. 32 is a cross-sectional view taken along line XXXII-XXXII in FIG. 22.

The confluence portion A13 is formed such that the location in the stacking direction changes at discharge preventing portions 152 (portions of the discharge structure 150). That is, as shown in FIG. 27 and the like, the top face of the confluence portion A13 is located below the top faces of the discharge preventing portions 152 in the stacking direction. The top faces of the discharge preventing portions 152 are in contact with the bottom face of the first plate-like body 1. Accordingly, discharge, from the confluence portion A13, of the first gas flowing from the plurality of auxiliary passages A11 to the confluence portion A13 is limited due to the discharge preventing portions 152 protruding upward in the stacking direction, and the first gas is temporarily stored in the plurality of auxiliary passages A11.

As shown in FIG. 22 and the like, the confluence portion A13 is elongated in the +Y direction and −Y direction (Y direction) as viewed from above. The length in the Y direction of the confluence portion A13 corresponds to the length in the Y direction of the region provided with the plurality of auxiliary passages A11 that are arranged in parallel at intervals in the Y direction.

As shown in FIG. 22, FIGS. 26 to 30, FIG. 39, and the like, the second plate-like body 2 includes the discharge structure 150 between the plurality of auxiliary passages A11 and the confluence portion A13 in a direction extending in the flowing direction (+X direction and −X direction (X direction)). Due to the discharge structure 150, discharge of the first gas from the plurality of auxiliary passages A11 to the confluence portion A13 is limited.

The discharge structure 150 includes a plurality of discharge passing portions 151 and a plurality of discharge preventing portions 152. The first gas flows from the plurality of auxiliary passages A11 to the confluence portion A13 through the discharge passing portions 151. The discharge preventing portions 152 prevent the first gas from flowing from the plurality of auxiliary passages A11 to the confluence portion A13. As shown in FIG. 27 and the like, the top faces of the discharge preventing portions 152 are located above the top faces of the discharge passing portions 151 in the stacking direction, and are in contact with the bottom face of the first plate-like body 1. Accordingly, while the discharge preventing portion 152 prevents the first gas in the plurality of auxiliary passages A11 from flowing in the flowing direction, the first gas flows to the confluence portion A13 through the discharge passing portions 151 in the flowing direction.

In this embodiment, as shown in FIGS. 22 and 39 for example, the discharge preventing portions 152 are formed in a substantially rectangular shape as in the case of the supply preventing portions 142. The rectangular discharge preventing portions 152 are arranged in the +Y direction and −Y direction (Y direction) such that the long sides extend in the Y direction. The discharge passing portions 151 are each provided between the adjacent supply preventing portions 152. That is, the discharge passing portions 151 are each provided in the interval between the short sides of the adjacent discharge preventing portions 152 that are opposed to each other.

As shown in FIG. 39, in the +Y direction and −Y direction (Y direction; the intersection direction intersecting the flowing direction), the length L12 of each discharge preventing portion 152 is larger than the length L11 of each discharge passing portion 151 (L12>L11). It is preferable that the length L12 of each discharge preventing portion 152 is larger than the length L4 of each auxiliary passage forming portion 160 (L12>L4). This configuration allows the first gas flowing from the plurality of auxiliary passages A11 to the confluence portion A13 to collide against the discharge preventing portions 152 and to be temporarily stored in the discharge buffer portion 154, which will be described later.

The relationship between L11 and L12 is determined depending on, for example, the amount of the first gas supplied to the plurality of auxiliary passages A11 per unit time, the amount of the first gas to be discharged from the confluence portion A13 per unit time, the number of the discharge preventing portions 152, the length L3 in the Y direction of each partitioning portion 161, the length L4 in the Y direction of each auxiliary passage A11, and the like.

In the flowing direction, the plurality of auxiliary passages A11 are arranged such that at least one of the auxiliary passages A11 corresponds to one discharge preventing portion 152.

Moreover, in the flowing direction, the plurality of partitioning portions 161 are arranged such that any of the partitioning portions 161 corresponds to one discharge passing portion 151.

With the above-mentioned configuration, the first gas ejected from the plurality of auxiliary passages A11 flows in the flowing direction and thus collides against the discharge preventing portions 152 protruding upward in the stacking direction. Due to the collision with the discharge preventing portions 152, the first gas flows in the intersection direction intersecting the flowing direction. That is, the first gas flowing from the plurality of auxiliary passages A11 is not immediately introduced into the confluence portion A13, but collides against the discharge preventing portions 152 on the upstream side of the confluence portion A13 and flows in the intersection direction. Thereafter, the first gas flows along the ejection from the plurality of auxiliary passages A11, passes through the discharge passing portions 151, and is introduced into the confluence portion A13.

It should be noted that the region between the plurality of auxiliary passages A11 and the discharge structure 150 in which the first gas is temporarily stored is the discharge buffer portion 154.

The discharge preventing portion 152 is provided corresponding to the second penetrated portion 51 in the flowing direction. This makes it possible to reduce a possibility that the first gas flowing in the plurality of auxiliary passages A11 is immediately introduced into the confluence portion A13 and is discharged from the second penetrated portion 51. Accordingly, the first gas can be temporarily stored in the plurality of auxiliary passages A11.

The shapes, sizes, arrangements, numbers, and the like of the discharge passing portions 151 and the discharge preventing portions 152 are the same as those of the supply passing portions 141 and the supply preventing portions 142. For example, in FIG. 39, in the +Y direction and −Y direction (Y direction; the intersection direction intersecting the flowing direction), the length L12 of each discharge preventing portion 152 and the length L11 of each discharge passing portion 151 are respectively the same as the length L2 of each supply preventing portion 142 and the length L1 of each supply passing portion 141, which are described hereinbefore.

However, the shapes, sizes, arrangements, numbers, and the like of the discharge passing portions 151 and the discharge preventing portions 152 may be different from those of the supply passing portions 141 and the supply preventing portions 142. For example, the discharge passing portions 151 may be larger in size than the supply passing portions 141. Due to this configuration, the discharge pressure applied during discharge of the first gas from the plurality of auxiliary passages A11 to the confluence A13 may be smaller than the supply pressure during supply of the first gas from the distribution portion A12 to the plurality of auxiliary passages A11. The first gas is supplied from the distribution portion A12 to the plurality of auxiliary passages A11 with a certain level of supply pressure to make the flow distribution constant among the plurality of auxiliary passages A11, and the first gas can be smoothly introduced into the confluence portion A13 when discharged.

(b) Functions of Supply Structure and Discharge Structure (b1) Functions of Supply Structure Next, the functions of the supply structure 140 will be described.

The supply preventing portions 142 of the supply structure 140 having the above-mentioned configuration are provided between the distribution portion A12 and the plurality of auxiliary passages A11, and serve as barriers for flow of the first gas from the distribution portion A12 to the plurality of auxiliary passages A11. Accordingly, pressure loss of the first gas increases when the first gas flows from the distribution portion A12 into the plurality of auxiliary passages A11, and the first gas introduced into the distribution portion A12 is distributed over the distribution portion A12 so as to fill the distribution portion A12, and is thus temporarily stored therein. Accordingly, the overall pressure in the distribution portion A12 is substantially uniform (equal pressure). That is, differences in pressure between the distribution portion A12 and the plurality of auxiliary passages A11 are substantially the same. Then, the first gas is supplied from the distribution portion A12 to the plurality of auxiliary passages A11 through the supply passing portions 141, and therefore, the first gas is supplied to the auxiliary passages A11 with substantially equal pressure. Accordingly, the flow distribution (including the flow rate, the flow amount, the pressure, and the like) in the flow direction is substantially uniform among the auxiliary passage A11.

Flow of the first gas from the distribution portion A12 is divided and introduced into the plurality of auxiliary passages A11. The flow distribution (including the flow rate, the flow amount, the pressure, and the like) of the first gas is also made substantially equal by a flow straightening effect due to the first gas flowing separately in a plurality of passages compared with the case where the first gas flows in an internal passage that is not provided with a plurality of passages.

As described above, the flow distribution of the first gas in the flowing direction is substantially uniform among the auxiliary passages A11. For example, when the auxiliary passages A11 are viewed at one position in the flowing direction, the flow rate, the flow amount, the pressure, and the like of the first gas in the intersection direction intersecting that position is substantially constant among the auxiliary passages A11. Accordingly, in the electrochemical reaction portion 3, a difference between a portion that is deficient in the first gas and a portion in which an excessive amount of the first gas flows can be reduced to improve the usage rate of the first gas in the overall electrochemical element A and thus improve the reaction efficiency of an electrochemical reaction.

It should be noted that, if the above-mentioned configuration including the distribution portion A12, the plurality of auxiliary passages A11, the supply structure 140, and the like is not employed, the auxiliary passages A11 differ in the flow distribution of the first gas. That is, the flow rate of the first gas may be fast in a certain auxiliary passage A11, and the flow rate of the first gas may be slow in another auxiliary passage A11. In an auxiliary passage A11 in which the flow rate of the first gas is slow, the first gas is consumed in an electrochemical reaction and becomes insufficient. Accordingly, the concentration of the first gas decreases, and thus there is a risk that the electrode layer of the electrochemical reaction portion 3 is deteriorated due to oxidation, and the electrode performance and the mechanical strength are thus impaired. On the other hand, in an auxiliary passage A11 in which the flow rate of the first gas is fast, the first gas is discharged before consumed in an electrochemical reaction. That is, in the case where the first gas is fuel gas such as hydrogen, the fuel usage rate decreases because high-concentration first gas is discharged. To address the shortage of the first gas in an auxiliary passage A11 in which the flow rate of the first gas is slow, it is conceivable that the supply amount of the first gas supplied to each auxiliary passage A11 is increased. However, in this case, the amount of the first gas discharged before consumed in an electrochemical reaction is further increased in an auxiliary passage A11 in which the flow rate of the first gas is fast, and thus the fuel usage rate further decreases. Accordingly, when the flow distribution varies among the auxiliary passages A11, the reaction efficiency of an electrochemical reaction decreases, and thus the power generation efficiency decreases.

(b2) Functions of Discharge Structure

Next, the functions of the discharge structure 150 will be described.

With the above-mentioned configuration, the supply structure 140 for supplying the first gas from the distribution portion A12 to the plurality of auxiliary passages A11 with substantially uniform flow distribution is provided, and in addition, the discharge structure 150 is provided at a position where the first gas enters the confluence portion A13 from the plurality of auxiliary passages A11. The plurality of auxiliary passages A11 are located between the supply structure 140 and the discharge structure 150, thus making it possible to make the flow distribution (including the flow rate, the flow amount, the pressure, and the like) substantially uniform among the plurality of auxiliary passages A11 and to improve the reaction efficiency of an electrochemical reaction.

The following is a more specific description. The discharge preventing portions 152 of the discharge structure 150 having the above-mentioned configuration are provided between the plurality of auxiliary passages A11 and the confluence portion A13, and serve as barriers for flow of the first gas from the auxiliary passages A11 to the confluence portion A13. Accordingly, pressure loss of the first gas increases when the first gas flows from the plurality of auxiliary passages A11 into the confluence portion A13. Therefore, the first gas introduced into the plurality of auxiliary passages A11 is less likely to be immediately introduced into the confluence portion A13 from the plurality of auxiliary passages A11, and is distributed over the plurality of auxiliary passages A11 so as to fill the auxiliary passages A11. This makes it possible to make the flow distribution (including the flow rate, the flow amount, the pressure, and the like) in the flowing direction substantially uniform among the plurality of auxiliary passages A11. Moreover, the first gas is distributed over the plurality of auxiliary passages A11 so as to fill the auxiliary passages A11, and therefore, an electrochemical reaction sufficiently occurs in the plurality of auxiliary passages A11. Accordingly, the reaction efficiency of an electrochemical reaction can be improved.

(12) In the above-mentioned embodiments, the electrochemical device includes the electrochemical module M including the plurality of electrochemical elements A. However, a configuration in which a single electrochemical element is included can be applied to the electrochemical device of the above-mentioned embodiment.

DESCRIPTION OF REFERENCE SIGNS

31: Electrode layer
32: Electrolyte layer
33: Counter electrode layer
100: Electrochemical device
101: Desulfurizer
102: Reformer
103: Fuel supply unit
104: Inverter
220: Plate-like member
230: Plate
245: Side insulator
320: Plate-like member
A: Electrochemical element
M: Electrochemical module
S: Electrochemical element stack
Z: Energy system

The invention claimed is:

1. An electrochemical module comprising:
a stack obtained by stacking, in a predetermined stacking direction, a plurality of electrochemical elements having a configuration in which an electrolyte layer, and a first electrode and a second electrode that are respectively arranged on two sides of the electrolyte layer, are formed along a substrate;
an elastic plate-like member arranged along at least one of a first flat face of the stack in the stacking direction and a second flat face of the stack on a side opposite to the first flat face; and
a clamp that includes a plate-like first clamping portion arranged along the first flat face and a plate-like second clamping portion arranged along the second flat face in the stacking direction, and clamps the stack via the plate-like member,
wherein the plate-like member has a thickness of 0.1 mm to 1 mm, has a wavelike shape as viewed in a direction intersecting the stacking direction of the stack, has a thermal expansion rate larger than thermal expansion rates of members included in the clamp, and is made of austenite-based stainless steel, and
wherein the clamp is made of ferrite-based stainless steel, martensite-based stainless steel, or a complex between ceramics and the ferrite-based stainless steel or the martensite-based stainless steel.

2. The electrochemical module according to claim 1, wherein the plate-like member is a thermally expandable member that thermally expands.

3. The electrochemical module according to claim 1, wherein the plate-like member is in contact with at least one of a flat face of the stack and a flat face of the clamp at a plurality of positions that are scattered.

4. The electrochemical module according to claim 1, wherein the elasticity of the plate-like member is utilized to receive a difference in thermal expansion between the stack and the clamp at a time when the electrochemical elements generate power and at a time when the electrochemical elements do not generate power.

5. The electrochemical module according to claim 4, wherein clamping pressure corresponding to clamping pressure to be applied to the stack by the plate-like member when the electrochemical elements do not generate power is applied in advance to such an extent that a required level of the clamping pressure can be ensured when the electrochemical elements generate power.

6. The electrochemical module according to claim 1, wherein at least one of the first clamping portion and the second clamping portion is a portion of a housing that surrounds the stack.

7. The electrochemical module according to claim 1, wherein the electrochemical elements are solid oxide fuel cells.

8. The electrochemical module according to claim 1, wherein the electrochemical elements are solid oxide electrolytic cells.

9. A method for assembling an electrochemical module comprising:
arranging a plate-like member along at least one of a first flat face of a stack in a predetermined stacking direction and a second flat face of the stack on a side opposite to the first flat face, the stack being obtained by stacking a plurality of electrochemical elements in the stacking direction, the electrochemical elements having a configuration in which an electrolyte layer, and a first electrode and a second electrode that are respectively arranged on two sides of the electrolyte layer, are formed along a substrate, the plate-like member having a thickness of 0.1 mm to 1 mm and having a wavelike shape as viewed in a direction intersecting the stacking direction of the stack;
arranging a plate-like first clamping portion along the first flat face and a plate-like second clamping portion along the second flat face; and
pressing the first clamping portion and the second clamping portion in the stacking direction to apply, in advance, clamping pressure corresponding to clamping pressure applied to the stack by the plate-like member when the electrochemical elements do not generate power to such an extent that a required level of clamping pressure applied to the stack by the plate-like member can be ensured when the electrochemical elements generate power,
wherein the plate-like member has a thermal expansion rate larger than thermal expansion rates of members included in the first clamping portion and the second clamping portion and is made of austenite-based stainless steel, and
wherein the first clamping portion and the second clamping portion are made of ferrite-based stainless steel, martensite-based stainless steel, or a complex between ceramics and the ferrite-based stainless steel or the martensite-based stainless steel.

10. An electrochemical device comprising at least an electrochemical module according to claim 1 and a fuel converter, and comprising a fuel supply unit that allows reducing component gas to flow from the fuel converter to the electrochemical module or from the electrochemical module to the fuel converter.

11. An electrochemical device comprising at least the electrochemical module according to claim 1 and a power converter that extracts power from the electrochemical module or supplies power to the electrochemical module.

12. An energy system comprising:
the electrochemical device according to claim 10; and
a waste heat utilization system that reuses heat discharged from the electrochemical device or a fuel converter.

13. An energy system comprising:
the electrochemical device according to claim 11; and
a waste heat utilization system that reuses heat discharged from the electrochemical device or a fuel converter.

* * * * *